US012056990B2

(12) United States Patent
Uberuaga et al.

(10) Patent No.: US 12,056,990 B2
(45) Date of Patent: Aug. 6, 2024

(54) TRANSFERRING TARGET SYMBOLS BETWEEN WINDOWS OF ELECTRONIC GAMING DEVICE

(71) Applicant: Aristocrat Technologies Australia Pty Limited, North Ryde (AU)

(72) Inventors: Christmas Uberuaga, Reno, NV (US); Allon Englman, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 17/578,283

(22) Filed: Jan. 18, 2022

(65) Prior Publication Data

US 2022/0139172 A1 May 5, 2022

Related U.S. Application Data

(63) Continuation of application No. 16/565,212, filed on Sep. 9, 2019, now Pat. No. 11,244,542.

(60) Provisional application No. 62/894,591, filed on Aug. 30, 2019.

(51) Int. Cl.
*G07F 17/34* (2006.01)
*G07F 17/32* (2006.01)

(52) U.S. Cl.
CPC .......... *G07F 17/34* (2013.01); *G07F 17/3209* (2013.01); *G07F 17/3213* (2013.01); *G07F 17/3225* (2013.01); *G07F 17/3244* (2013.01); *G07F 17/3267* (2013.01)

(58) Field of Classification Search
None
See application file for complete search history.

(56) References Cited

U.S. PATENT DOCUMENTS 6,159,095 A 12/2000 Frohm
7,753,777 B1 7/2010 Giuffria
8,388,435 B2 3/2013 Anderson
(Continued)

OTHER PUBLICATIONS

"Aristocrat Mighty Cash Slot Machine I Long Teng Hu Xiao I Bonus Live Play I Choctaw Casino Durant," including screenshots showing relevant feature, downloaded from https://www.youtube.com/watch?v=X2mLJAR1Zdk, 4 pp. (Jul. 2019).
(Continued)

*Primary Examiner* — Jay Trent Liddle
(74) *Attorney, Agent, or Firm* — Blank Rome LLP

(57) ABSTRACT

Innovations in user interface ("UI") features of an electronic gaming device, and in features of backend processing to implement the UI features, are presented. For example, an electronic gaming machine ("EGM") can selectively transfer target symbols between multiple windows. Each of the windows uses a set of reels, which spin in the respective windows. When at least a threshold count of target symbols lands for a reel in a window, a stack of target symbols is transferred to a corresponding reel in each of one or more other windows. After target symbols are transferred, a bonus feature, special mode, or other supplemental feature can be triggered depending on the counts of target symbols in the respective windows. As another example, an EGM can selectively start a supplemental feature (such as a bonus feature or special mode) in multiple windows depending on a count of target symbols in the windows, collectively.

20 Claims, 20 Drawing Sheets

(56) References Cited

U.S. PATENT DOCUMENTS

| | | | | |
|---|---|---|---|---|
| 10,403,093 | B1 | 9/2019 | Halvorson | |
| 2003/0060268 | A1 | 3/2003 | Falconer | |
| 2011/0218042 | A1 | 9/2011 | Anderson | |
| 2014/0274294 | A1 | 9/2014 | Baerlocher | |
| 2015/0348358 | A1 | 12/2015 | Comeau | |
| 2016/0027238 | A1 | 1/2016 | Zurawski | |
| 2016/0284158 | A1 | 9/2016 | Singer | |
| 2017/0046914 | A1 | 2/2017 | Rodgers | |
| 2017/0103613 | A1 | 4/2017 | Berman | |
| 2018/0061186 | A1 | 3/2018 | Berman | |
| 2018/0130286 | A1 * | 5/2018 | Berman | G07F 17/3244 |
| 2019/0051109 | A1 | 2/2019 | Marks | |
| 2019/0102972 | A1 | 4/2019 | Watkins | |
| 2019/0122485 | A1 | 4/2019 | Singer | |
| 2019/0130704 | A1 | 5/2019 | Cormack | |
| 2019/0325693 | A1 | 10/2019 | McLeneghan | |
| 2020/0013257 | A1 | 1/2020 | Watkins | |
| 2020/0111294 | A1 | 4/2020 | Halvorson | |

OTHER PUBLICATIONS

Office Action dated Nov. 4, 2020 for U.S. Appl. No. 16/565,212 (pp. 1-12).

Office Action dated May 24, 2021 for U.S. Appl. No. 16/565,212 (pp. 1-16).

4 Office Action (Notice of Allowance and Fees Due (PTOL-85)) dated Sep. 29, 2021 for U.S. Appl. No. 16/565,212 (pp. 1-7).

* cited by examiner

FIG. 5

510

520 530

| Pos | Reel 1 (symbol) | Weight |
|---|---|---|
| 1 | SYM1 | $w_{a,b,1}$ |
| 2 | SYM6 | $w_{a,b,2}$ |
| 3 | SYM7 | $w_{a,b,3}$ |
| 4 | SYM8 | $w_{a,b,4}$ |
| 5 | SYM2 | $w_{a,b,5}$ |
| 6 | SYM3 | $w_{a,b,6}$ |
| 7 | SYM6 | $w_{a,b,7}$ |
| 8 | SYM8 | $w_{a,b,8}$ |
| 9 | **TARGET** | $\boldsymbol{w_{a,b,9}}$ |
| 10 | **TARGET** | $\boldsymbol{w_{a,b,10}}$ |
| 11 | **TARGET** | $\boldsymbol{w_{a,b,11}}$ |
| ... | | |
| $x$ | SYM6 | $w_{a,b,x}$ |

540 example lookup table indicating options for symbol stop positions for reel $b$ in window $a$

FIG. 6

610

620 630

| Value | Weight |
|---|---|
| VAL1 | $w_{a,1}$ |
| VAL2 | $w_{a,2}$ |
| VAL3 | $w_{a,3}$ |
| VAL4 | $w_{a,4}$ |
| VAL5 | $w_{a,5}$ |
| VAL6 | $w_{a,6}$ |
| ... | |
| VALN | $w_{a,N}$ |

example lookup table indicating options for target symbols for window $a$

FIG. 8c 803 (example of 810)
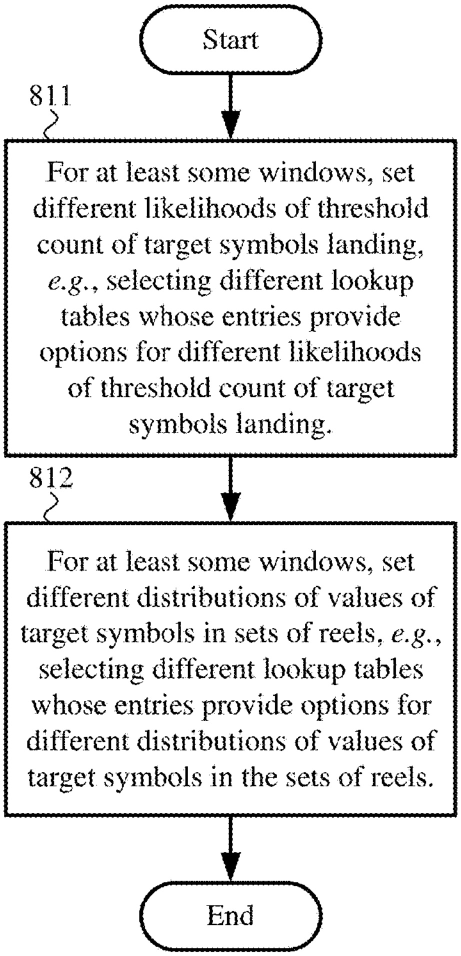
FIG. 8d 804 (example of 810)
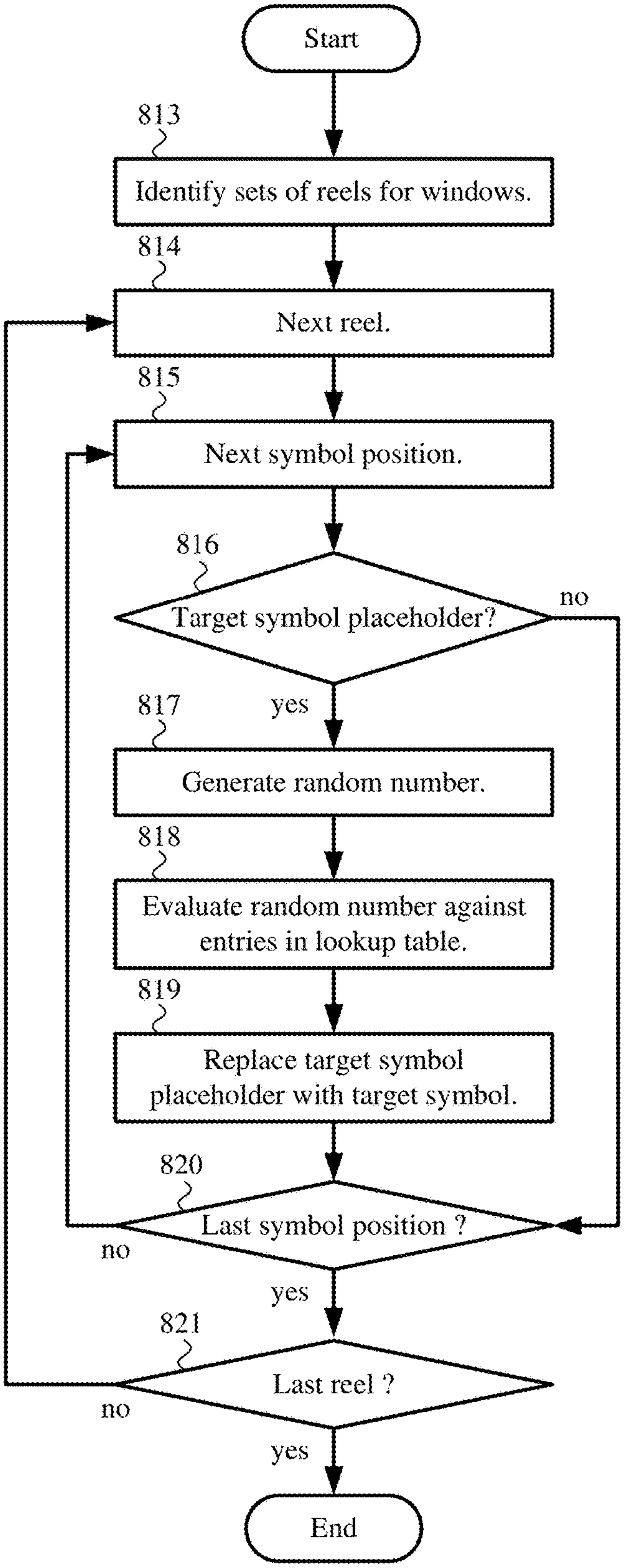

807 (example of 830, 840)

808 (example of 834)

809 (example of 842)

TRANSFERRING TARGET SYMBOLS BETWEEN WINDOWS OF ELECTRONIC GAMING DEVICE

CROSS REFERENCE TO RELATED APPLICATION

This patent application is a continuation of U.S. patent application Ser. No. 16/565,212, filed Sep. 9, 2019, the disclosure of which is hereby incorporated by reference. U.S. patent application Ser. No. 16/565,212 claims the benefit of U.S. Provisional Pat. App. No. 62/894,591, filed Aug. 30, 2019, the disclosure of which is hereby incorporated by reference.

TECHNICAL FIELD

User interface ("UI") features of electronic gaming devices are described herein, along with features of backend processing to implement the UI features. For example, electronic gaming machines ("EGMs") selectively transfer target symbols between windows and/or selectively start a supplemental feature in windows based at least in part on a count of target symbols.

BACKGROUND

EGMs provide a variety of wagering games such as slot games, video poker games, video blackjack games, roulette games, video bingo games, keno games and other types of games, which are frequently offered at casinos and other locations for use by players. Play on an EGM typically involves a player establishing a credit balance by inputting money, or another form of monetary credit, and placing a wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

A "slot" type game is often presented to a player in the form of various symbols arrayed in a row-by-column grid (matrix). Specific matching combinations of symbols along predetermined paths (or "pay lines") through the matrix indicate the outcome of the game. The display typically highlights winning combinations/outcomes for ready identification by the player. Matching combinations and their corresponding awards are usually shown in a "pay table," which is available to the player for reference. Often, the player may vary his/her wager to include differing numbers of pay lines and/or the amount bet on each line. By varying the wager, the player may sometimes alter the frequency or number of winning combinations, frequency or number of secondary games, and/or the amount awarded.

Typically, a game uses a random number generator ("RNG") to randomly determine the outcome of the game. A game is designed to return a certain percentage of the amount wagered back to a player over the course of many plays or instances of the game, which is generally referred to as return to player ("RTP"). The RTP and randomness of the RNG ensure the fairness of games and are highly regulated. For example, upon initiation of play, an RNG may randomly determine a game outcome, and symbols are selected which correspond to that outcome. Notably, some games may include an element of skill on the part of the player and are therefore not entirely random.

EGMs depend on usability to enhance the user experience and extend player time on the EGMs. Although previous EGMs include various UI features, and backend operations associated with the UI features, that improve usability and enhance the user experience, there is room for further improvement to EGMs.

SUMMARY

In summary, the detailed description presents innovations in user interface ("UI") features of electronic gaming devices, as well as innovations in features of backend processing to implement the UI features. For example, the detailed description presents processes for electronic gaming machines ("EGMs") that selectively transfer target symbols between multiple windows, which can be shown on one display screen of an EGM or be split among multiple display screens of the EGM. Each of the windows uses a set of reels, which spin in the respective windows. When at least a threshold count of target symbols lands for a reel in a window, a stack of one or more target symbols is transferred to a corresponding reel in each of one or more other windows. In some example implementations, after the target symbols are transferred, a bonus feature, special mode, or other supplemental feature can be triggered based at least in part on the counts of target symbols in the respective windows. In addition, the target symbols can add credits or other awards in the supplemental feature. As another example, the detailed description presents processes for EGMs that selectively start a bonus feature, special mode, or other supplemental feature in multiple windows based at least in part on a count of target symbols in the windows, collectively. In some example implementations, the innovations improve usability of the EGMs by enhancing the user experience for players, extending player time on the EGMs, and maintaining the interest of current players in the EGMs.

For example, according to a first set of innovations described herein, a computer system is configured to perform UI-focused operations to control the UI of an electronic gaming device. The UI-focused operations include, in each of multiple windows of the electronic gaming device, spinning a set of reels. The operations further include selectively transferring target symbols between at least some of the windows. In particular, a stack of target symbol(s) is transferred from a focus window (among the windows) to each of one or more other windows (among the windows) when at least a first threshold count of target symbols lands for one or more of the reels within the focus window. The operations further include selectively performing operations of a supplemental feature (such as a bonus feature or special mode) for any of the windows that encloses a second threshold count of target symbols (including any transferred target symbols) in the window. Finally, the operations include outputting an indication of an outcome, if any, of the supplemental feature for the any of the windows that encloses the second threshold count of target symbols. Transferring target symbols between windows in this way provides a way to achieve a target level of game volatility while maintaining a designated level of return to player ("RTP") for a game.

As another example, according to a second set of innovations described herein, a computer system is configured to perform backend operations to control the UI of an electronic gaming device. The backend operations include managing transfer of target symbols between multiple windows, which have sets of reels. The operations also include determining symbol stop positions for at least some of the reels and determining whether to transfer target symbols between at least some of the windows. In particular, the operations include determining whether to transfer a stack of target symbol(s) from a focus window (among the windows) to each of one or more other windows (among the windows) based at least in part on whether at least a first threshold count of target symbols lands for one or more of the reels within the focus window. The operations further include, for each of the windows, determining whether to perform operations of a supplemental feature (such as a bonus feature or special mode), including determining whether the window encloses a second threshold count of target symbols (including any transferred target symbols) in the window. Finally, the operations include determining an outcome, if any, of the supplemental feature for any of the windows that encloses the second threshold count of target symbols. By transferring target symbols between windows, game play can be kept fair and consistent with regulations while also providing variety that achieves a target level of game volatility for a designated level of RTP for a game.

As another example, according to a third set of innovations described herein, a computer system is configured to perform UI-focused operations to control the UI of an electronic gaming device. The UI-focused operations include, in each of multiple windows of the electronic gaming device, spinning a set of reels. The operations further include selectively transferring target symbols between at least some of the windows. In particular, a stack of target symbol(s) is transferred from a focus window (among the windows) to each of one or more other windows (among the windows) when at least a threshold count of target symbols lands for one or more of the reels within the focus window. For at least some of the windows, there can be different likelihoods of at least the threshold count of target symbols landing (e.g., set according to different lookup tables for symbol stop positions). Also, for at least some of the windows, there can be different distributions of values of target symbols in the sets of reels (e.g., set according to different lookup tables for target symbols). In this way, game volatility and RTP can be balanced between the windows. Finally, the operations include outputting an indication of an outcome that is based at least in part on counts of target symbols enclosed in the windows, respectively.

As another example, according to a fourth set of innovations described herein, a computer system is configured to perform backend operations to control the UI of an electronic gaming device. The backend operations include managing transfer of target symbols between multiple windows, which have sets of reels. For example, the managing can include, for at least some of the windows, setting different likelihoods of at least a threshold count of target symbols landing (e.g., using different lookup tables indicating symbol stop positions for the respective windows). As another example, the managing can include, for at least some of the windows, setting different distributions of values of target symbols in the sets of reels (e.g., using different lookup tables indicating target symbols for the respective windows). The operations further include determining symbol stop positions for at least some of the reels and determining whether to transfer target symbols between at least some of the windows. In particular, the operations include determining whether to transfer a stack of target symbol(s) from a focus window (among the windows) to each of one or more other windows (among the windows) based at least in part on whether at least a threshold count of target symbols lands for one or more of the reels within the focus window. Finally, the operations include determining an outcome based at least in part on counts of target symbols enclosed in the windows, respectively. By using different likelihoods of at least the threshold count of target symbols landing and/or using different distributions of values of target symbols in the sets of reels, game volatility and RTP can be balanced between the windows.

As another example, according to a fifth set of innovations described herein, a computer system is configured to perform UI-focused operations to control the UI of an electronic gaming device. The UI-focused operations include, in each of multiple windows of the electronic gaming device, spinning a set of reels. The operations further include selectively performing operations of a supplemental feature (such as a bonus feature or special mode) for all of the windows depending on whether the windows, collectively, enclose at least a threshold count of target symbols. In this way, even if a supplemental feature is not performed for an individual window (e.g., because a threshold count of target symbols is not reached for that individual window), a supplemental feature may be performed if the windows, collectively, enclose enough target symbols. This provides another way to achieve a target level of game volatility while maintaining a designated level of RTP for a game. Finally, the operations include outputting an indication of an outcome, if any, of the supplemental feature.

As another example, according to a sixth set of innovations described herein, a computer system is configured to perform backend operations to control the UI of an electronic gaming device. The backend operations include configuring sets of reels for multiple windows, respectively, of the electronic gaming device, then determining symbol stop positions for at least some of the reels. The operations further include determining whether to perform operations of a supplemental feature (such as a bonus feature or special mode) for all of the windows, including determining whether the windows, collectively, enclose at least a threshold count of target symbols. Finally, the operations include determining an outcome, if any, of the supplemental feature. Checking whether all windows, collectively, enclose at least a threshold count of target symbols provides another way to achieve a target level of game volatility while maintaining a designated level of RTP for a game.

The innovations can be implemented as part of a method, as part of an electronic gaming device such as an EGM or electronic gaming server configured to perform the method, or as part of non-transitory computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations. The drawings are not necessarily drawn to scale.

FIG. 5 is a chart illustrating an example lookup table that indicates options for symbol stop positions for reels of a window, in accordance with some embodiments.

FIG. 6 is a chart illustrating an example lookup table that indicates options for target symbols for reels of a window, in accordance with some embodiments.

FIGS. 8*c*-8*i* are flowcharts illustrating example techniques for selected operations shown in FIGS. 8*a* and 8*b*, or other related operations.

DETAILED DESCRIPTION

Figure 1:
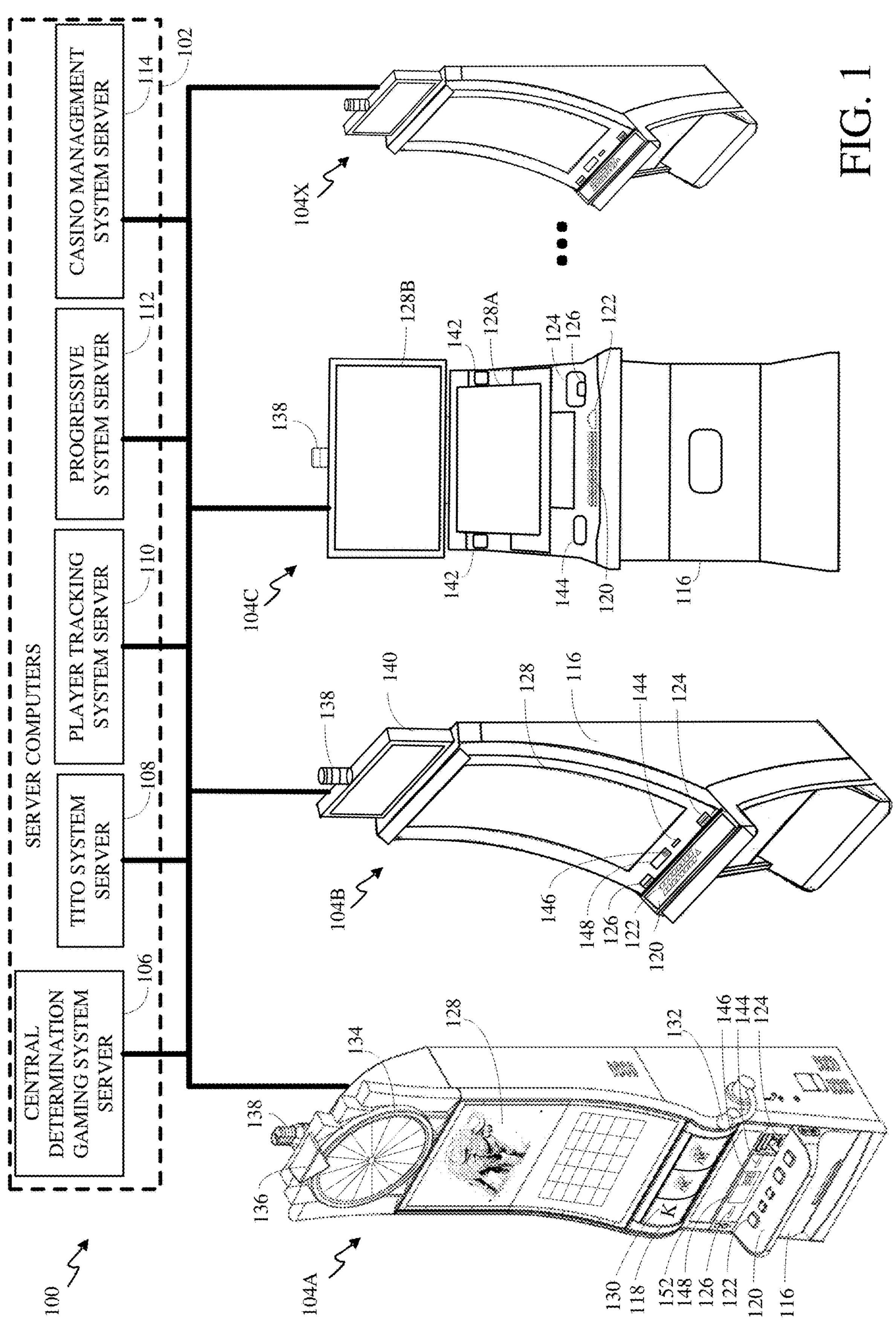
FIG. 1 is a perspective diagram of example EGMs according to some embodiments.

The detailed description presents innovations in user interface ("UI") features of electronic gaming devices, as well as innovations in features of backend processing to implement the UI features. For example, an electronic gaming machine ("EGM") can selectively transfer target symbols between multiple windows, which can be shown on one display screen of an EGM or be split among multiple display screens of the EGM. Each of the windows uses a set of reels, which spin in the respective windows. When at least a threshold count of target symbols lands for a reel in a window, a stack of one or more target symbols is transferred to a corresponding reel in each of one or more other windows. In some example implementations, after the target symbols are transferred, a bonus feature, special mode, or other supplemental feature can be triggered based at least in part on the counts of target symbols in the respective windows. In addition, the target symbols can add credits or other awards in the supplemental feature. Transferring target symbols between windows provides a way to achieve a desired game volatility (e.g., increase game volatility) while maintaining a designated level of RTP for a game. Furthermore, by managing the likelihood of at least a threshold count of target symbols landing in the respective windows, and by managing values of target symbols in the respective windows, game play can be kept fair and consistent with regulations while also enabling variation of game volatility for a designated level of RTP for a game.

As another example, an EGM can selectively start a supplemental feature (such as a bonus feature or special mode) in multiple windows based at least in part on a count of target symbols in the windows, collectively. When at least a threshold count of target symbols lands in the windows, collectively, the supplemental feature is performed. Checking whether windows, collectively, enclose at least a threshold count of target symbols provides another way to achieve a desired game volatility while maintaining a designated level of RTP for a game.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense.

I. EXAMPLE ELECTRONIC GAMING SERVERS AND ELECTRONIC GAMING MACHINES

FIG. 1 illustrates several different models of EGMs which may be networked to various gaming-related servers. Shown is a system 100 in a gaming environment including one or more server computers 102 (e.g., slot servers of a casino) that are in communication, via a communications network, with one or more gaming devices 104A-104X that have communication interfaces with the network. The server computers 102 and/or gaming devices 104A-104X can implement one or more aspects of the present disclosure.

The gaming devices 104A-104X may be EGMs such as slot machines, video poker machines, bingo machines, etc. The gaming devices 104A-104X may alternatively be portable and/or remote gaming devices such as, but not limited to, a smartphone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency ("RF") (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. In this case, functions normally performed by a server computer or data normally stored on a server computer may instead be performed by or stored on a gaming device. The stand-alone gaming device may be in communication with one or more other gaming devices (but not a server computer). However, it is typical to find multiple EGMs connected to networks implemented with one or more of the different server computers 102 described herein.

A. Example Server Computers.

Server computers 102 can include one or more servers that combine to form a casino management system, which manages one or more gaming devices 104A-X. Each of the servers includes at least one processor, memory, and a network interface, which enables communication over one or more networks between the server computers 102 and the gaming devices 104A-X. In general, the casino management system is configured to receive gaming data from the gaming devices 104A-X as the gaming devices 104A-X conduct rounds of play of one or more wagering games.

As shown in FIG. 1, the server computers 102 may include a central determination gaming system server 106 (also called a gaming server), a ticket-in-ticket-out ("TITO") system server 108, a player tracking system server 110, a progressive system server 112, and/or a casino management system server 114. Gaming devices 104A-104X may include features to enable operation of any or all server computers 102 for use by the player and/or operator (e.g., the casino, resort, gaming establishment, tavern, pub, etc.). For example, game outcomes may be generated on a central determination gaming system server 106 and then transmitted over a network to any of a group of remote terminals or remote gaming devices 104A-104X that utilize the game outcomes and display the results to the players.

FIG. 1 shows different servers that perform different sets of functions. Alternatively, one or more of the different servers shown in FIG. 1 can be combined.

B. Example Gaming Devices.

Still referring to FIG. 1, the gaming devices 104A-C illustrated are specific exemplary embodiments of EGMs, and the same or similar elements shown in gaming devices 104A-C may be included in any gaming device 104X. More generally, an EGM may be any type of gaming machine and may include, without limitation, different structures than those shown in FIG. 1. A gaming device may use specially-configured computer hardware that implements game functionality, or a gaming device may use general-purpose computer hardware that has been programmed to implement game functionality. For example, an EGM can be implemented using a personal computer, tablet computer, smartphone, personal digital assistant, or any other computing device.

Gaming device 104A is often of a cabinet construction which may be aligned in rows or banks of similar devices for placement and operation on a casino floor. The gaming device 104A often includes a main door which provides access to the interior of the cabinet 116. Gaming device 104A typically includes a button area or button deck 120 accessible by a player that is configured with input switches or buttons 122, an access channel for a bill validator 124, and/or an access channel for a ticket-out printer 126. The input switches or buttons 122, along with other input devices, provide at least part of a player interface through which a player controls operation of a game. For example, buttons 122 may be used to start play of a primary game or secondary game. Alternatively, instead of having separate buttons that can be actuated physically, one or more of the buttons 122 can be presented on a touchscreen.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube ("CRT"), or other conventional electronically controlled video monitor. Alternatively, the main display 128 can be a touchscreen display. The main display 128 is an interface component used to play a game on the gaming device 104A.

In some embodiments, the bill validator 124 may also function as a "ticket-in" reader that allows the player to use a casino issued credit ticket to load credits onto the gaming device 104A (e.g., in a cashless ticket (TITO) system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152, which may be a back-lit, silkscreened glass panel with lettering to indicate general game information including, for example, a game denomination (e.g., $0.25 or $1), pay lines, pay tables, and/or various game-related graphics. In some embodiments, the information panel(s) 152 may be implemented as an additional video display.

Gaming devices 104A have traditionally also included a handle 132 typically mounted to the side of main cabinet 116, which may be used to initiate game play. In general, a "handle pull" or "spin" of a game may refer to a single play at a gaming device, whether or not a handle is involved in the play, and whether or not a handle is even included in the gaming device. Thus, a play can be initiated by a press of a physical or virtual button, or via another activation mechanism.

Figure 2:
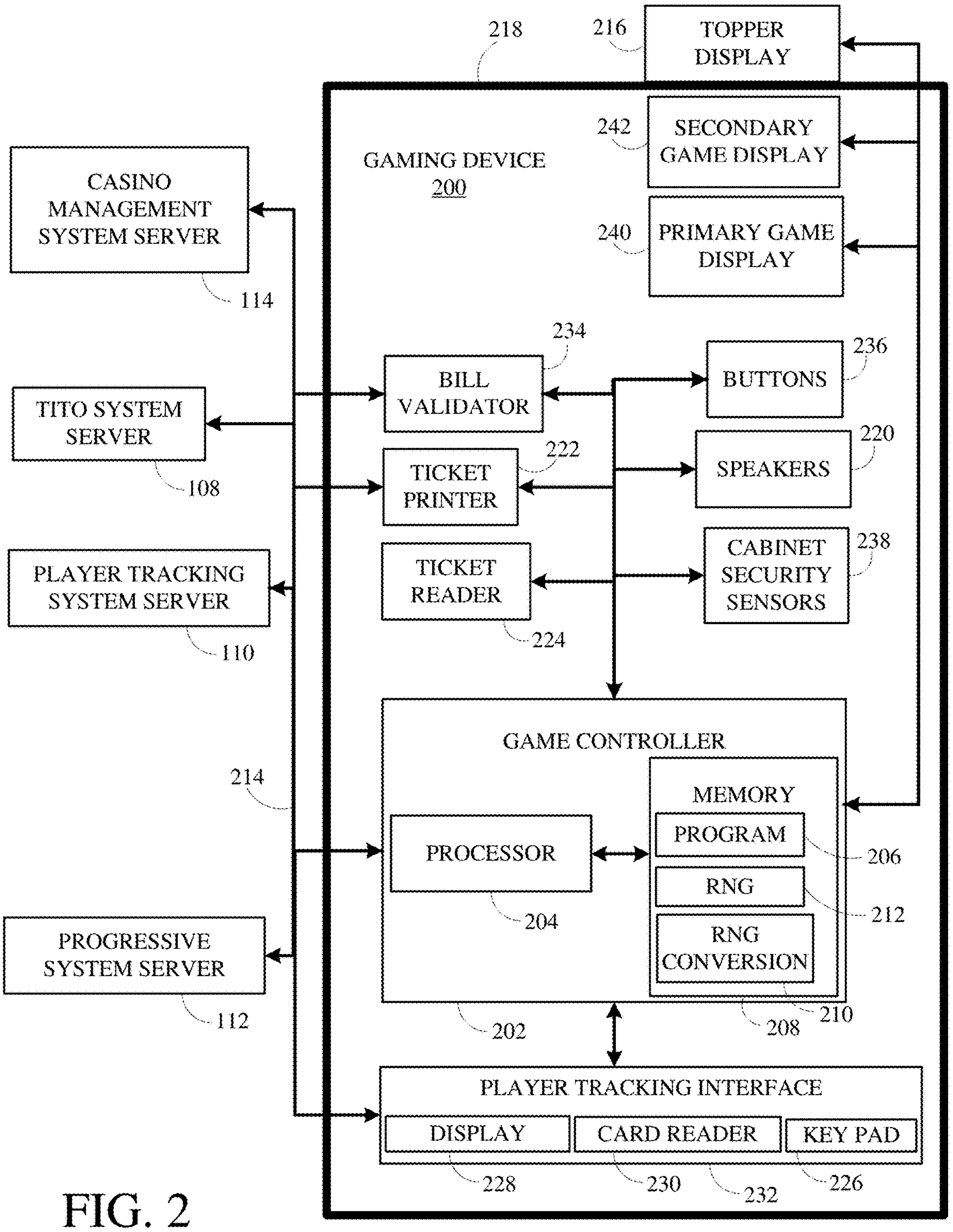
FIG. 2 is a block diagram illustrating an example of a networked EGM according to some embodiments.

Many or all the above described components can be controlled by circuitry (e.g., a gaming controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. The main display 128 is in a portrait orientation with curvature radius from top to bottom. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Where possible, reference numerals identifying similar features of the embodiments of gaming devices 104A and 104B are used to identify corresponding features of gaming device 104C.

Gaming device 104C does not include physical reels and instead shows game play functions on main display 128A and a secondary display 128B. Gaming device 104C includes a main display 128A that is in a landscape orientation. The main display 128A or secondary display 128B can be a high-resolution LCD, plasma, LED, OLED, or SED panel, Although not illustrated by the front view provided, the landscape display 128A may have a curvature radius from top to bottom, or alternatively from side to side. In some embodiments, display 128A is a flat panel display. Alternatively, the main display 128A can be a touchscreen display. Main display 128A is typically used for primary game play while secondary display 128B is typically used for bonus game play, to show game features or attraction activities while the game is not in play or any other information or media desired by the game designer or operator. The secondary display 128B may be in a landscape orientation with curvature radius from top to bottom, or may be flat. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

C. Example Components of Gaming Device.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1.

As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smartphone enabling player tracking. FIG. 2 also depicts utilizing a ticket printer 222 to print tickets for a TITO system server 108. Gaming device 200 may further include a bill validator 234, player-input buttons 236 for player input, and cabinet security sensors 238 to detect unauthorized opening of the cabinet 218, each coupled to and operable under the control of game controller 202. The game controller 202 may be a circuit (e.g., an electronic circuit board, a programmable computer chip, etc.) within a gaming device that, in addition to controlling other components, includes one or more processors that process game play instructions in accordance with game play rules, and outputs or generates game play outcomes to one or more displays.

The gaming device 200 includes several display screens, each coupled to and operable under the control of the game controller 202. A primary game display 240 acts as a main display 128, 128A as described with reference to FIG. 1. A secondary game display 242 acts as a secondary display 128B as described with reference to FIG. 1. The gaming device 200 can include a credit display that displays a player's current number of credits, cash, account balance, or the equivalent. The gaming device 200 can also include a bet display that displays a player's amount wagered. The credit display and/or bet display may be standalone displays, independent of the primary game display 240 and secondary game display 242. Alternatively, the credit display and/or bet display can be incorporated into the primary game display 240 or secondary game display 242. Any of the display screens can be implemented as a touchscreen, with an associated touchscreen controller. In this case, such display screens may be operated as input devices in addition to presenting information, to provide input game play decisions (e.g., actions on and selection of game presentation objects).

The games available for play on the gaming device 200 are controlled by a game controller 202. In general, the game controller 202 conducts a wagering game, generates gaming data (e.g., for wagers, game outcomes, payouts, player ratings, duration of play, and time between rounds of play), and, for each round of play of the wagering game, awards a payout or win amount according to a pay table. A base game can include a bonus game that the game controller 202 also conducts. In some example implementations, the game controller 202 processes game play instructions to perform operations as described in Section II and/or Section III. Alternatively, the game controller 202 can process game play instructions to perform other and/or additional operations.

The game controller 202 includes one or more processors 204. Processor 204 represents a general-purpose processor, a specialized processor intended to perform certain functional tasks, or a combination thereof. As an example, processor 204 can be a central processing unit ("CPU") that has one or more multi-core processing units and memory mediums (e.g., cache memory) that function as buffers and/or temporary storage for data. Alternatively, processor 204 can be a specialized processor, such as an application specific integrated circuit ("ASIC"), graphics processing unit ("GPU"), field-programmable gate array ("FPGA"), digital signal processor ("DSP"), or another type of hardware accelerator. In another example, processor 204 is a system on chip ("SoC") that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory ("RAM"), read-only memory ("ROM"), hard disk drives, solid-state drives, universal serial bus ("USB") flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory ("SRAM"), dynamic random access memory ("DRAM"), magnetic random access memory ("MRAM"), and other such devices. Examples of ROM include a programmable read-only memory ("PROM"), an erasable programmable read-only memory ("EPROM"), an electrically erasable programmable read-only memory ("EEPROM"), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a UI) to a player. Output for the game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a ROM) or from the central determination gaming system server 106 to memory 208.

When games are implemented in an online environment, at least a portion of the game software can be stored in a remote gaming server or in a cloud computing service. Game transactions such as adding money to the game (i.e., cash in) and withdrawing money from the game (i.e., cash out) are substituted by implementing electronic fund transfers. A player deposits money into his online gaming account via checks, debit cards, wire and the like. Once funded, the player can move a portion of the cash in his account into the game he wants to play. This process is referred to as account-based wagering. Account-based wagering is a convenient monetary transaction system for online and mobile wagering environments since the physical bill acceptor and ticket printer are not available. In addition to the accounting meters' separation, detection of the location where the wagering transaction take place is also performed in order to enforce local gaming regulations and properly calculate revenue, profit, and tax withholdings, for example. Thus, a remote gaming device can access a casino via a computer network and participate in a game of chance. The remote gaming device may be a PC, smartphone, or other computing device coupled to the Internet via a wired or wireless link (and, e.g., connecting to a casino management system via a virtual private network). The remote gaming device may be a terminal-based machine, where the actual game (including RNG and outcome determination) is hosted at a gaming server, with the terminal-based machine displaying results of the game via one or more display screens.

The game controller 202 can communicate over a network with one or more other gaming devices or other devices via a communication interface. The communication interface may operate as an input device (e.g., by receiving data from another device) and/or as an output device (e.g., by transmitting data to another device). The gaming device 200 can also include one or more communication ports that enable the game controller 202 to communicate with peripheral devices, external video sources, expansion buses, or display screens.

FIG. 2 depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or selecting various items during a bonus feature). The player may make these selections using the player-input buttons 236, the primary game display 240 which may be a touchscreen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Some embodiments described herein represent improvements in the technical area of EGM software and provide new technology, in that they improve usability of EGMs by enhancing the user experience for players, extending player time on the EGMs, and maintaining the interest of current players in the EGMs. In particular, the staging of operations may provide a build up to higher award amounts, which may occur as a reward to players for extended play on the gaming device 200. These embodiments are thus not merely new game rules or new display patterns.

Gaming devices such as gaming device 200 (as a generalized example of devices 104A-X) typically include special features and/or additional circuitry that differentiates them from general-purpose computers (e.g., desktop computers and laptops). Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness (e.g., that outcomes will be statistically independent, uniformly distributed over their range, unpredictable and pass statistical tests such as chi-square test, equi-distribution test, gap test, runs test, serial correlation test, etc.). Typically, gaming jurisdictions mandate that gaming devices 200 satisfy a minimum level of randomness without specifying how a gaming device 200 should achieve this level of randomness. To comply, FIG. 2 illustrates that gaming device 200 includes a random number generator ("RNG") 212 that utilizes hardware and/or software to generate RNG outcomes that lack any pattern. The RNG 212 can be integrated into the game controller 202 or processor 204. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. (Gaming regulations may require that each reel outcome be independent of each other reel outcome, such that no reel outcome depends on any other reel outcome.) In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP for a game. Similar to the randomness requirement discussed above, numerous gaming jurisdictions also mandate that gaming device 200 provides a minimum level of RTP (e.g., RTP of at least 75%).

A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP for a game. (In general, volatility refers to the frequency or probability of an event such as a special mode, payout, etc. For example, for a target level of RTP for a game, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP for a game, a game developer can setup the RNG conversion engine 210 to utilize one or more lookup tables (e.g., weighted tables) to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

As noted, gaming devices 200 are specially-configured computer systems and not merely general-purpose computers. For example, one difference between a gaming device 200 and common processor-based computer system is that gaming device 200 is designed to be a state-based system. In a state-based system, the system stores and maintains its current state in non-volatile memory, which can be implemented using battery-backed RAM, flash memory, a solid-state drive, or other persistent memory. Different functions of a game (e.g., bet, play, result, points in the graphical presentation, etc.) may be defined as a state. When a game moves from one state to another, data regarding the game state is stored in a custom non-volatile memory subsystem. In some cases, the gaming device 200 does not advance from a current state to a subsequent state until information that allows the current state to be reconstructed is stored. In the event of a power failure or other malfunction, the gaming device 200 will return to its current state when the power is restored by recovering state information from non-volatile memory. The restored state may include metering information and graphical information that was displayed on the gaming device 200 in the state prior to the malfunction. For instance, if a player was shown an award for a game of chance and, before the award could be provided to the player, the power failed, the gaming device 200, upon the restoration of power, would return to the state where the award is indicated. More generally, the gaming device 200 records, in non-volatile memory, the values of game parameters assigned during play, such as variables determined by an RNG or internal counters. (A game parameter, in general, can be one or more variables whose values govern play at the gaming device and depend on a random selection process.) The value of a game parameter can be recorded periodically, in response to some event such as user input, or whenever the value of the game parameter changes. This way, the gaming device 200 can recover its state in case of a power failure or "tilt" event, allowing the gaming device 200 to reconstruct events that have taken place before the power failure or "tilt" event. In contrast, PCs are not state machines to the same extent, and a majority of data is usually lost when a malfunction occurs. This requirement affects the software and hardware design on a gaming device 200. Game history information regarding previous games played, such as an amount wagered, the outcome of the game and so forth, may also be stored in a non-volatile memory device.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface).

Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Those of skill in the art will appreciate that embodiments of the present disclosure could be implemented with more or fewer elements than are depicted in FIG. 2. The pictured example embodiments of a gaming device 200, as well as example gaming devices 104A-C, are merely a few examples from a wide range of possible gaming device designs on which embodiments of the present disclosure may be implemented. Depending on implementation and the type of processing desired, components of the gaming device 200 can be added, omitted, split into multiple components, combined with other components, and/or replaced with like components. In alternative embodiments, gaming devices with different components and/or other configurations of components perform one or more of the described techniques. Specific embodiments of gaming devices typically use a variation or supplemented version of the gaming device 200. The relationships shown between components within the gaming device 200 indicate general flows of information in the gaming device 200; other relationships are not shown for the sake of simplicity. In general, the game controller 202 can be implemented by software executable on a CPU, by software controlling special-purpose hardware, or by special-purpose hardware (e.g., in an ASIC).

D. Example Game Processing Architecture.

Figure 3:
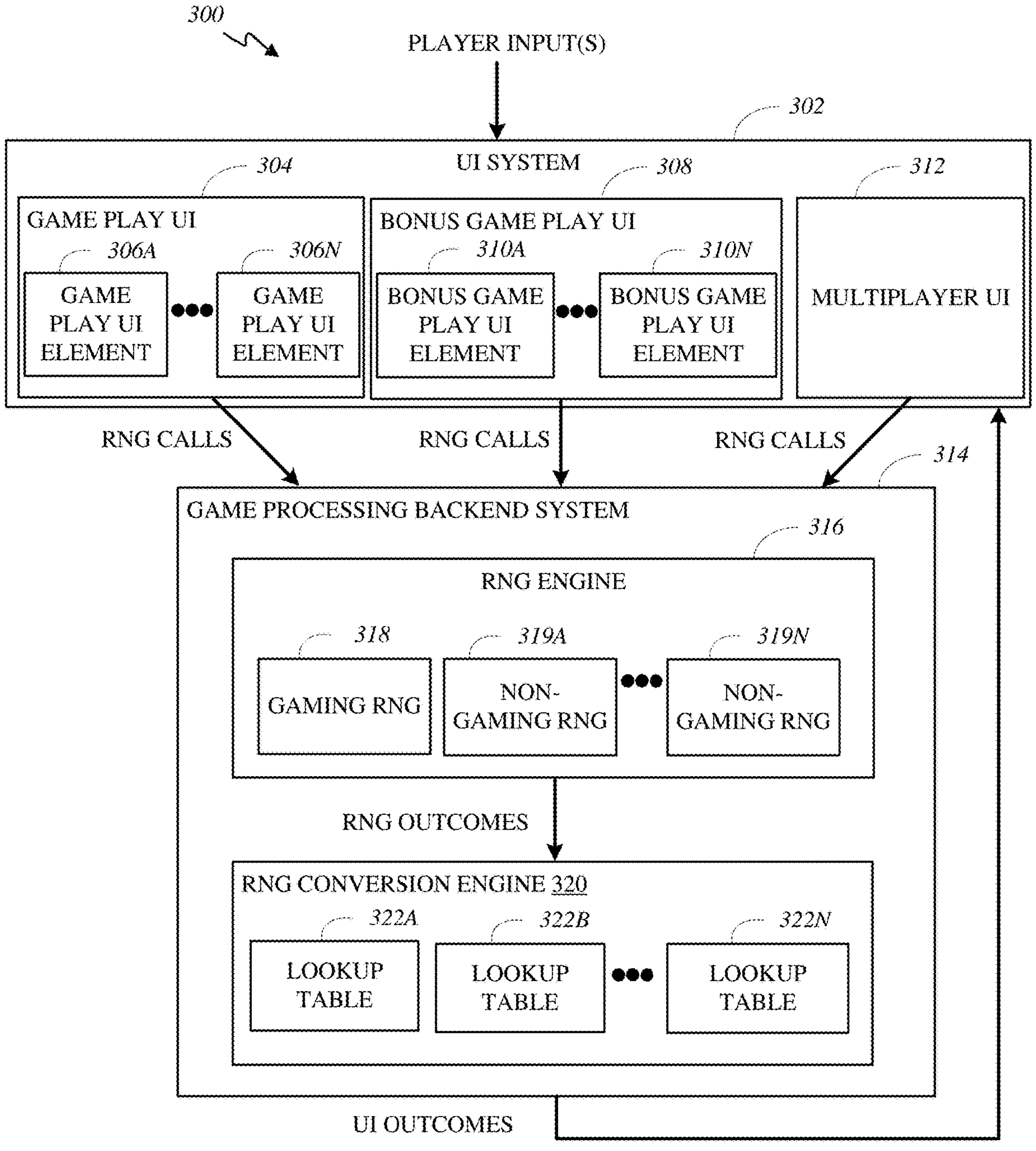
FIG. 3 is a block diagram illustrating an example game processing architecture that implements a game processing pipeline for the play of a game in accordance with some embodiments.

FIG. 3 illustrates, in block diagram form, an example game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes, based on the RNG outcomes, for the UI system 302 to use to control game play (e.g., a display to a player). The game processing architecture 300 can implement the game processing pipeline using a gaming device, such as one of the gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 306, where each UI type includes one or more mechanical UIs and/or graphical UIs ("GUIs"). In other words, the game play UI 304, bonus game play UI 308, and multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a player. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or present game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces ("APIs") to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator ("PRNG") (e.g., Fortuna PRNG) that securely produces random numbers for one or more game features. To generate random numbers, gaming RNG 318 could collect random data from various sources of entropy, such as from an operating system ("OS"). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for purposes such as generating random messages that appear on the gaming device.

The RNG conversion engine 320 processes each RNG outcome from RNG engine 316 and converts the RNG outcome to a UI outcome that is fed back to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. For example, RNG conversion engine 320 utilizes one or more lookup tables 322A-322N (weighted tables) to regulate a prize payout amount for each RNG outcome and how often the gaming device pays out the derived prize payout amounts. In one example, the RNG conversion engine 320 could utilize one lookup table to map the RNG outcome to a game outcome displayed to a player and utilize a second lookup table as a pay table for determining the prize payout amount for each game outcome. In this example, the mapping from the RNG outcome to the game outcome can affect the level of volatility for the game, e.g., by regulating the frequency of occurrence of a game feature such as hitting certain prize payout amounts, triggering a bonus game or special mode, winning a progressive jackpot, etc. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

The example game processing architecture 300 shown in FIG. 3 can be used to process game play instructions and generate outcomes as described in Section II and/or Section III.

E. Example Reel Games.

Depending on implementation, various form factors of EGMs can incorporate the innovations described herein into reel games. For example, for a "thick client" implementation, an EGM (such as a gaming device 104A-X in FIG. 1 or gaming device 200 in FIG. 2) stores computer-executable instructions for controlling one or more reel games in local memory of the EGM and executes those instructions in one or more local processors of the EGM. The computer-executable instructions for controlling the game(s) may be stored within the EGM (e.g., at a factory) prior to installation of the EGM at a gaming establishment. Or, the computer-executable instructions for controlling the game(s) may be stored within the EGM after installation of the EGM at a gaming establishment (e.g., by downloading the instructions to the EGM over a network, or by installing memory that stores the instructions into the EGM, then configuring the EGM). In such a "thick client" implementation, a game controller of the EGM conducts one of the reel game(s) and manages various interfaces of the EGM to receive player inputs and commands Or, as another example, for a "thin client" implementation, computer-executable instructions for controlling one or more reel games are stored in memory of a gaming server (e.g., central determination gaming system server or other remote host) and executed in one or more processors of the gaming server. The gaming server remotely controls one of the reel game(s) over a network, and the EGM displays screens for the reel game and manages interfaces to receive player inputs and commands.

The reel games can include base reel games as well as bonus reel games. A "base" or "primary" reel game includes play that involves spinning reels. A "bonus" or "secondary" reel game/feature can add the possibility of winning a relatively large payout. A bonus reel game/feature may require an additional wager, but typically does not. A single play of a reel game can constitute a single complete game or wager, e.g., a single spin of the reels or a series of spins which culminate in a final aggregate outcome.

In some example implementations, the EGM or gaming server can conduct a base reel game (for regular play or free spins), a bonus reel game, and a gateway wheel game. The base reel game and bonus reel game use spinning reels and one or more game windows (reel areas) on a display screen. As in a typical reel game, the reels of the base reel game or bonus reel game "spin" graphically through a game window on the display screen when a player actuates a "spin" or "play" button, which acts as a "handle pull" event. A game controller randomly selects symbol stop positions in the respective reels, and the respective reels stop at the selected symbol stop positions, with some number of symbols visible in the game window for each of the reels. For example, for a given reel, the game controller generates a random number and determines a symbol stop position on the reel strip of the reel using the random number (e.g., with a lookup table). The game controller generates different random numbers for the respective reels that are spun. In this way, the game controller determines which symbols of the respective reels are visible in the game window (reel area) on the display screen.

In general, a display screen (or simply "display" or "screen") is an area that conveys information to a viewer. The information may be dynamic, in which case, the display screen may use LCD technology, LED technology, CRT technology, or some other display technology. A main display screen (also called a primary game screen or main display) can be a display screen or an area of a display screen used to display game information related to a base reel game, such as a video representation of one or more spinning reels. A secondary display screen (also called a secondary game screen or bonus display) can be a display screen or an area of a display screen used to display secondary game information, such as animations and other graphics associated with a bonus reel game.

A base reel game or bonus reel game may award a special mode or other supplemental feature to a player. A supplemental feature may enhance an EGM and the experience of players by adding elements of excitement and chance. The supplemental feature can utilize a different set of reels, display screens, controls, symbols, etc. than the base reel game or bonus reel game in normal operation. Alternatively, the supplemental feature can reuse or reconfigure at least some of the reels, display screens, symbols, etc. of a base reel game or bonus reel game. The supplemental feature for a base reel game or bonus reel game can be started in response to satisfaction of a start condition. For example, the supplemental feature can be randomly triggered. Alternatively, the supplemental feature can be triggered in some other way (e.g., a combination of symbols in a previous play).

II. TRANSFERRING TARGET SYMBOLS BETWEEN WINDOWS

This section describes various innovations in user interface ("UI") features of electronic gaming machines ("EGMs"), as well as innovations in features of backend processing for EGMs to implement the UI features. For example, an EGM can transfer target symbols between multiple windows. Each of the windows uses a set of reels, which spin in the respective windows. When at least a threshold count of target symbols lands for a reel in a window, a stack of one or more target symbols is transferred to a corresponding reel in each of one or more other windows. In some example implementations, after the target symbols are transferred, a supplemental feature (e.g., bonus feature, special mode) can be triggered based at least in part on the counts of target symbols in the windows, respectively. In addition, the target symbols can add credits or other awards in the supplemental feature. Transferring target symbols between windows provides a way to achieve a desired game volatility (e.g., increase game volatility) while maintaining a designated level of RTP for a game. Furthermore, by managing the likelihood of at least a threshold count of target symbols landing in the respective windows, and by managing values of target symbols in the respective windows, game play can be kept fair and consistent with regulations while also enabling variation of game volatility for a designated level of RTP for a game.

For example, in one implementation, a base reel game uses three sets of reels in three windows, respectively, on a display screen of an EGM. Each set of reels has 5 reels, with 3 full symbols of a reel being visible in a window at a time. The three windows—top, middle, and bottom—are arranged vertically. The EGM selectively transfers target symbols that represent credits between windows during the base reel game. When a wager is placed for the base reel game, the sets of reels in all three windows spin. The reels in the top window land successively. While the reels are still spinning in the middle window and bottom window, any "full stack" of target symbols (representing credit values) that has landed in the top window transfers downward to the corresponding reel in the middle window and corresponding reel in the bottom window. In this way, the full stack of target symbols from the top window is replicated in the middle window and the bottom window, such that credit values associated with the target symbols are also transferred to the middle window and bottom window. After the transfer of target symbols from the top window, any of the reels in the middle window that are still spinning land successively (not any transferred stacks of target symbols, which do not spin). While the reels in bottom window are still spinning, any full stack of target symbols that has landed in the middle window transfers downward to the corresponding reel in the bottom window. In this way, any additional full stack of target symbols from the middle window is replicated in the bottom window, such that credit values associated with the target symbols are also transferred to the bottom window. After the transfer of target symbols from the middle window, any of the reels in the bottom window that are still spinning land successively (not any transferred stacks of target symbols, which do not spin). After all reels have landed, a supplemental feature (specifically, a hold-and-spin feature) is selectively started (that is, activated, triggered, etc.) in each of the three windows depending on count of target symbols. For each of the three windows, if the window encloses at least a threshold count of target symbols (e.g., at least 6 target symbols), the supplemental feature is started within the window. Thus, if two full stacks of target symbols land in the top window, the hold-and-spin feature is activated in the top window. In this case, since the two full stacks of target symbols are also transferred down to the middle window and bottom window, the hold-and-spin feature is also activated in the middle window and in the bottom window, which creates the possibility of a huge win.

RTP and/or volatility can be managed in various ways. The average credit value for target symbols can be set to a different value for the three windows. For example, when stacks of target symbols are selectively transferred in a downward direction, target symbols in the top window can be set to have a high average credit value, followed by target symbols in the middle window, with target symbols in the bottom window having a low average credit value. Since the bottom window is more likely to have target symbols (due to downward transfers), decreasing the average value for target symbols in the set of reels for the bottom window can help equalize volatility and/or RTP between the windows. Or, the likelihood of a full stack of target symbols landing can be set to a different value for the three windows. For example, when stacks of target symbols are selectively transferred in a downward direction, the chance of a full stack of target symbols landing in the top window can be set to a low value (less likely), followed by the chance of a full stack of target symbols landing in the middle window, with the chance of a full stack of target symbols landing in the bottom window being set to a high value (more likely). Since any full stack that lands in the top window is transferred to the other two windows, decreasing the chance of a full stack landing in the top window can help equalize volatility and/or RTP between the windows.

The target symbol transfer mechanism can be implemented in many other ways. For example, the transfer mechanism can be part of a bonus reel game, bonus feature, or special mode. The transfer mechanism can use some other number of windows (e.g., 2, 4, or 5). Instead of full stacks of target symbols, partial stacks of target symbols can be transferred between windows. Or, individual target symbols (a stack of one symbol) can be transferred between windows. In this case, multiple single-symbol stacks in a given reel (separated by one or more other symbols) can be transferred. Stacks (e.g., full stacks, partial stacks, single-symbol stacks) in different reels of a window can be transferred. Windows can be arranged horizontally instead of vertically. Instead of vertical stacks of target symbols, horizontal stacks (rows) of target symbols can be transferred. Windows can be split across multiple display screens instead of being displayed on a single display screen. Target symbols can be transferred between windows in a given direction (e.g., down), in the opposite direction (e.g., up), or in both directions. Target symbols can be transferred to a reel that is still spinning or transferred to a reel that has already stopped (so long as the transfer avoids "taking away" a win that uses any symbol of the stopped reel). Target symbols can be transferred to a single adjacent window (but no further) or transferred to all other windows. Different likelihoods of at least a threshold count of target symbols landing and/or different values of target symbols for different windows can be set in various ways. These variations and many other variations of the transfer mechanism are described herein.

A. Example Game Windows and Transfer Operations.

FIGS. 4*a*-4*d* are diagrams that represent example screen shots of a display screen of an electronic gaming device such as an EGM, during stages of transfer of target symbols between windows, according to some example implementations. The screen shots may be rendered on a main display screen, secondary display screen, or other display screen of an electronic gaming device such as an EGM. In FIGS. 4*a*-4*d*, the display screen includes three windows 410, 420, 430.

1. Simplified Example.

Figure 4A:
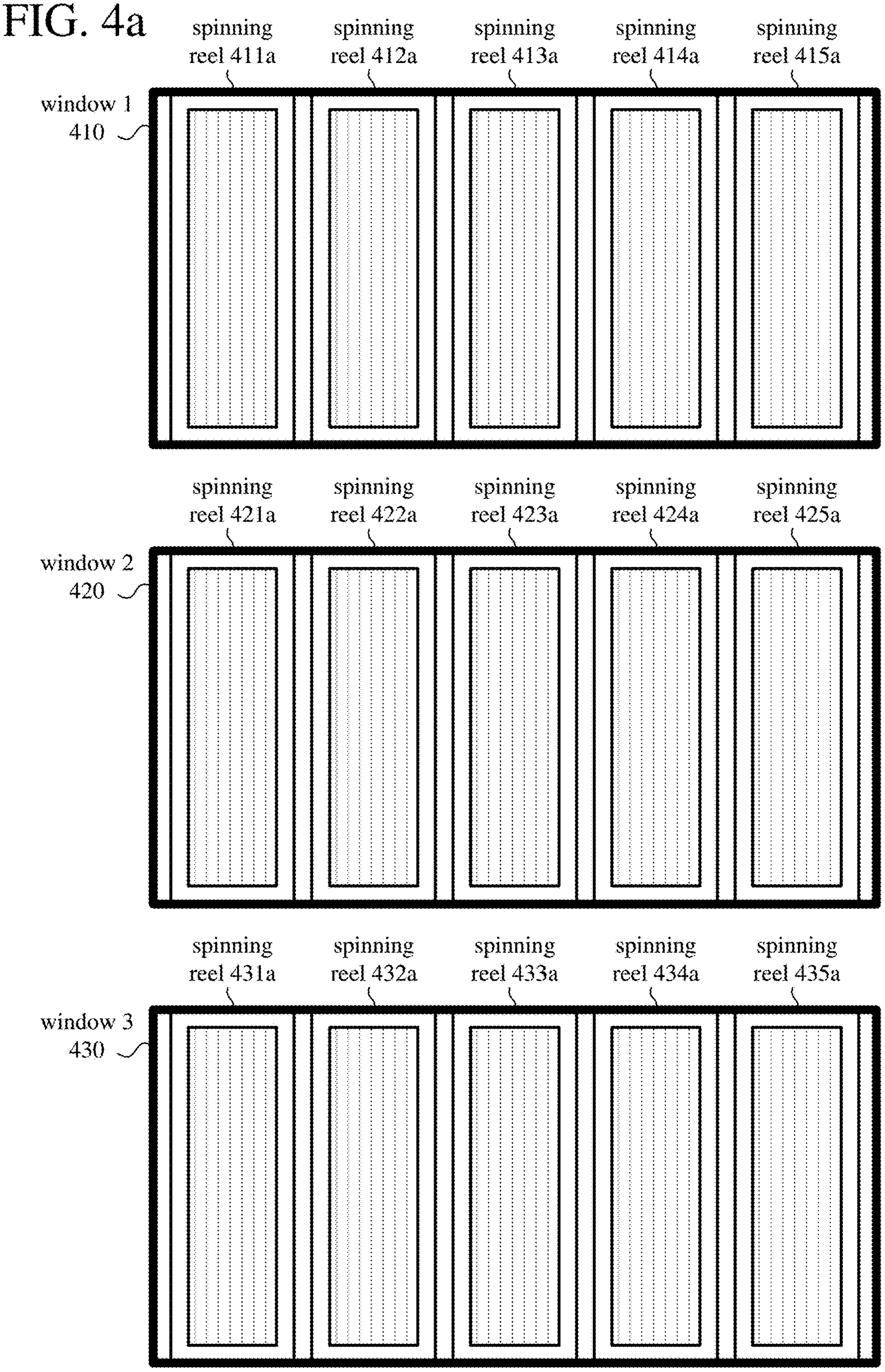
FIGS. 4*a*-4*d* are diagrams illustrating example screen shots of a display screen of an EGM, during stages of transfer of target symbols between windows, according to some example implementations.

FIG. 4*a* shows the windows 410, 420, 430 after initiation of a play, with all reels spinning in the three windows 410, 420, 430. Window 1 has five spinning reels 411*a*, 412*a*, 413*a*, 414*a*, and 415*a*. Window 2 has five spinning reels 421*a*, 422*a*, 423*a*, 424*a*, 425*a*, and window 3 has five spinning reels 431*a*, 432*a*, 433*a*, 434*a*, and 435*a*.

Figure 4B:
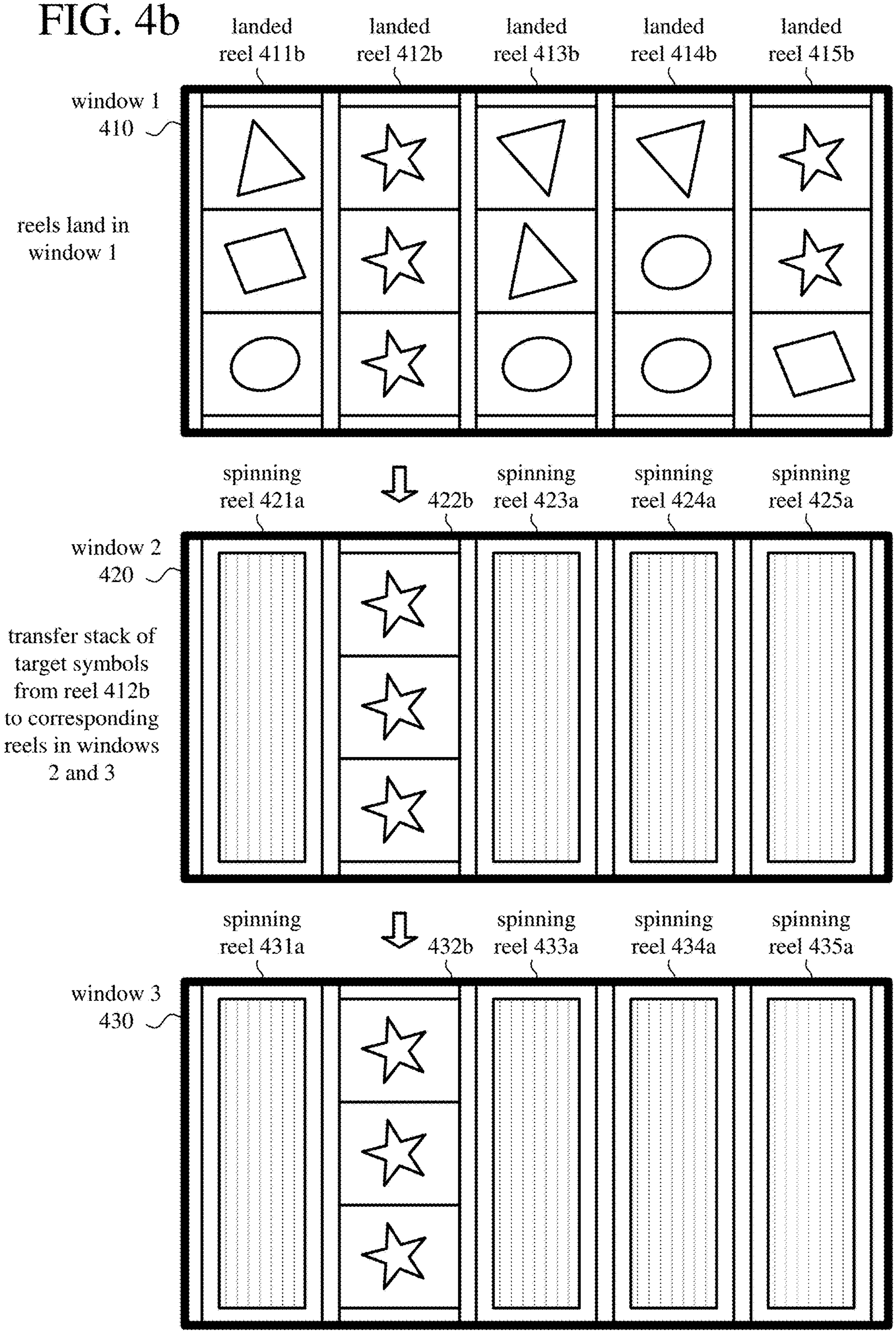

FIG. 4*b* shows the windows 410, 420, 430 after reels have landed in window 1. Window 1 has five landed reels 411*b*, 412*b*, 413*b*, 414*b*, 415*b*. Of the five landed reels for window 1, one landed reel 412*b* shows a full stack of target symbols in window 1. The full stack of target symbols is transferred downward to corresponding reels in windows 2 and 3. After the transfer, window 2 has four spinning reels 421*a*, 423*a*, 424*a*, 425*a* and a transferred stack 422*b* of target symbols as its fifth reel, and window 3 has four spinning reels 431*a*, 433*a*, 434*a*, and 435*a* and a transferred stack 432*b* of target symbols as its fifth reel.

Figure 4C:
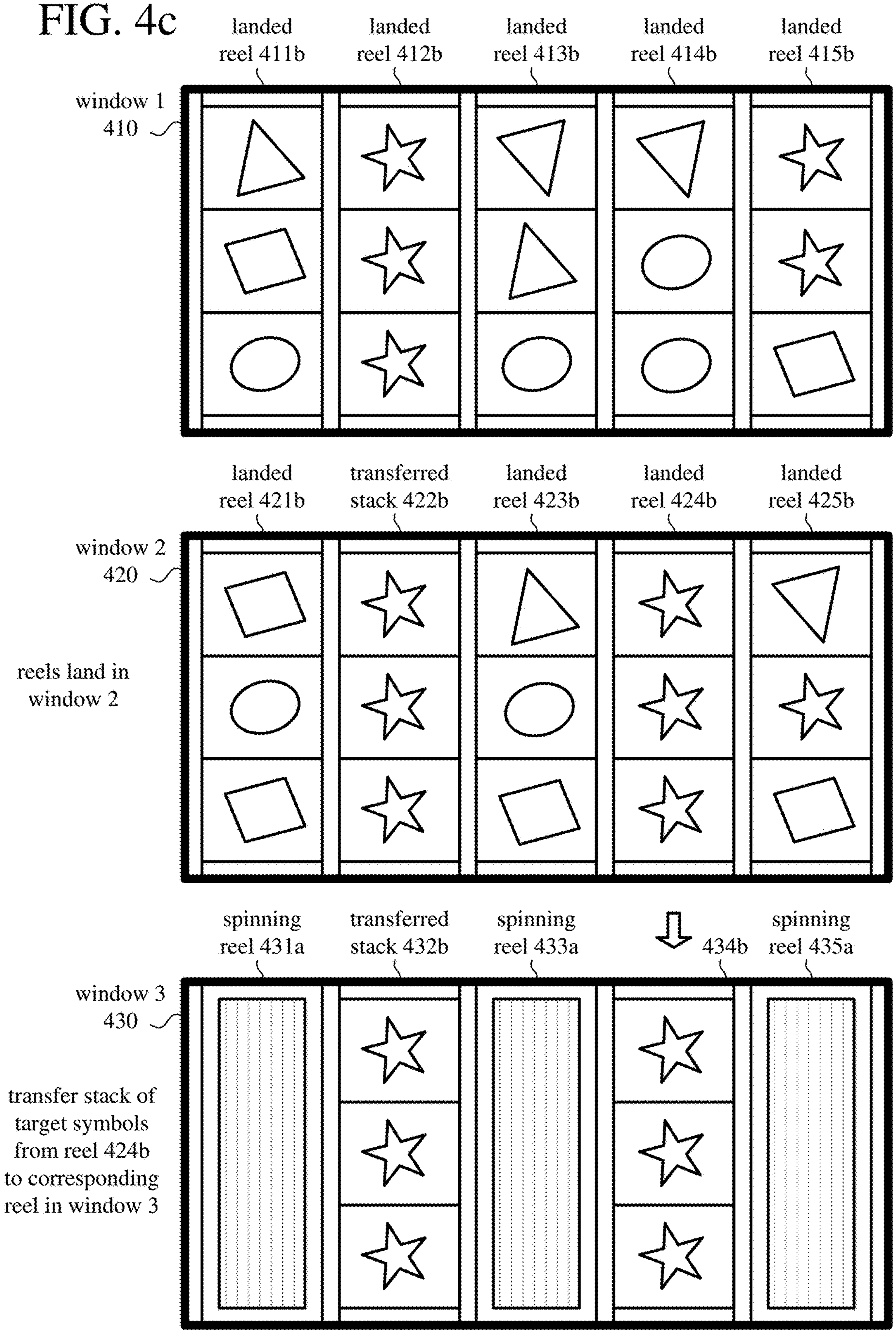

FIG. 4*c* shows the windows 410, 420, 430 after reels have landed in window 2. Window 1 still has five landed reels 411*b*, 412*b*, 413*b*, 414*b*, 415*b*. Window 2 now has four landed reels 421*b*, 423*b*, 424*b*, 425*b* along with the transferred stack 422*b* of target symbols. Of the four landed reels for window 2, one landed reel 424*b* shows a full stack of target symbols in window 2. The full stack of target symbols is transferred downward to a corresponding reel in window 3. After the transfer, window 3 has three spinning reels 431*a*, 433*a*, and 435*a* and two transferred stacks 432*b*, 434*b* of target symbols as its other reels.

Figure 4D:
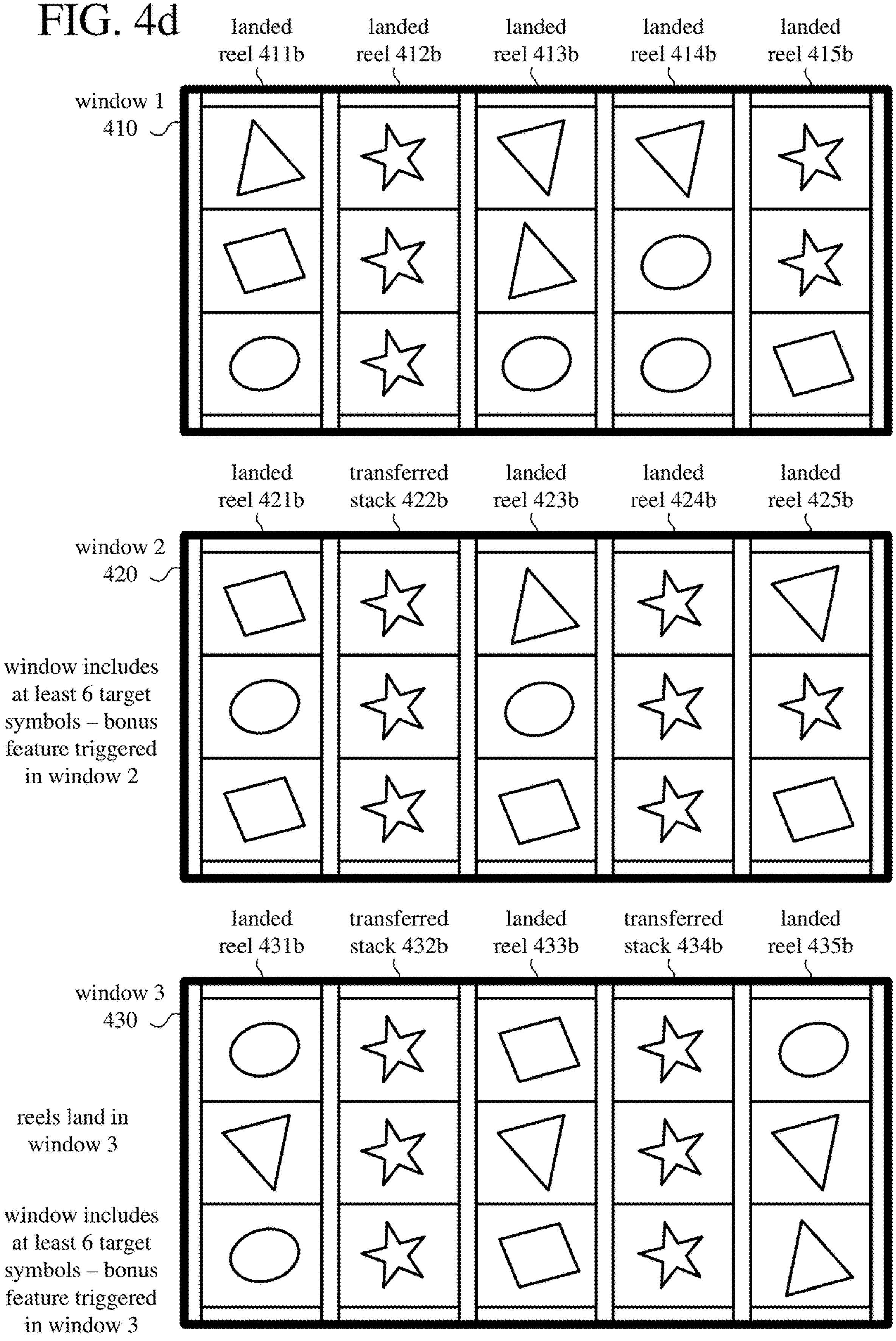

FIG. 4*d* shows the windows 410, 420, 430 after reels have landed in window 3. Window 1 still has five landed reels 411*b*, 412*b*, 413*b*, 414*b*, 415*b*, and window 2 still has four landed reels 421*b*, 423*b*, 424*b*, 425*b* along with the transferred stack 422*b* of target symbols. Window 3 now has three landed reels 431*b*, 433*b*, 435*b* along with two transferred stacks 432*b*, 434*b* of target symbols.

In the example shown in FIGS. 4*a*-4*d*, the threshold count of target symbols to start a supplemental feature is 6 target symbols. After all reels have landed, window 1 encloses 5 target symbols. The supplemental feature is not started for window 1. Window 2 encloses 7 target symbols, including transferred target symbols, so the supplemental feature is started for window 2. Window 3 encloses 6 target symbols, including transferred target symbols, so the supplemental feature is also started for window 3.

2. Options for Windows, Reels, and Symbols.

Each of the three windows 410, 420, 430 encloses viewable portions of a set of reels associated with the window. Each of the windows 410, 420, 430 can be associated with a different set of reels or the same set of reels. In FIGS. 4*a*-4*d*, each of the windows encloses viewable portions of five reels. For each of the five reels, the viewable portion of the reel include three positions of symbols, which span a window. Thus, each window 410, 420, 430 is a matrix of symbols on the display screen, and may be highlighted graphically to emphasize reels and symbols within the window. More generally, the number of windows depends on implementation and can be 2, 4, 5, or some other number of windows. Similarly, the number of reels and dimensions of a window depend on implementation. In general, a window has an m×n configuration, with m reels and with n symbols visible per reel. In FIGS. 4*a*-4*d*, each window has a 5×3 configuration—five reels per window, with three symbols showing in the window for each of the reels. Alternatively, a window can have another configuration. For example, a window can have different numbers of symbols visible for different reels (e.g., going left to right in a window, two symbols visible for a leftmost reel, three symbols visible for a second reel, four symbols visible for a center reel, three symbols visible for a fourth reel, and two symbols visible for a rightmost reel).

In the example shown in FIGS. 4*a*-4*d*, windows are arranged vertically. Alternatively, windows can be arranged horizontally or in some other configuration.

For each of the reels, a reel strip includes x positions along a one-dimensional strip of symbols, where x depends on implementation. For example, x is 30, 80, 100, 200, or some other number of positions. The value of x can be the same or different for different reels (thus, different reels can have different numbers of positions). Each reel can have a data structure (e.g., array, linked list) that tracks the symbols at the respective positions of the reel strip for the reel. In some example implementations, the configuration of the symbols at the positions of the reel strips for the reels of a base reel game is fixed after the base reel game boots, although limited reconfiguration operations may be permitted. In other example implementations, the configuration of the symbols at the positions of the reel strips for the reels of a base reel game can change dynamically after the base reel game boots (e.g., depending on bet level or some other factor). Similarly, the configuration of symbols at positions of reel strips for reels of a supplemental feature can change for each instance of the supplemental feature. Different sets of reels can be used for a base reel game and supplemental feature.

The symbol set for the reels has various types of symbols, including target symbols (shown as star symbols) and other symbols. The symbols can be static or animated. In some example implementations, the symbol set for the reel(s) includes a target symbol type, at least one jackpot symbol type, a wild symbol type, some number of picture symbol types, some number of minor/low symbol types, and a scatter symbol type (which triggers bonuses). Alternatively, the symbol set for the reels can include other and/or additional symbols. The symbol set can be the same or different between a base reel game and supplemental feature. In some example implementations, some types of symbols are dimmed out (not active) at times (e.g., symbols other than target symbols are dimmed out during a supplemental feature).

3. Options for Transfer Operations.

In the example shown in FIGS. 4*a*-4*d*, target symbols are transferred downward. Alternatively, target symbols can be transferred upward (e.g., from window 3, if reels land in window 3 before reels land in the other windows) or transferred upward and downward (e.g., from window 2, if reels land in window 2 before reels land in the other windows). Or, if target symbols can transfer to a window with stopped reels (as explained below), target symbols can be transferred upward and/or downward from the respective windows.

In the example shown in FIGS. 4*a*-4*d*, a full stack of target symbols is transferred between windows. Alternatively, the threshold count for transferring target symbols can be smaller (e.g., 2 symbols, 1 symbol), and a partial stack or even individual target symbols are transferred.

In the example shown in FIGS. 4*a*-4*d*, a vertical stack (column) of target symbols is transferred. Alternatively, a horizontal stack (row) of target symbols is transferred.

In the example shown in FIGS. 4*a*-4*d*, a count of target symbols (and threshold count of target symbols) is calculated in terms of number of target symbols. Alternatively, a count of target symbols (and threshold count of target symbols) can be calculated in terms of total value of the target symbols (e.g., total value of credits when target symbols have associated credit values).

The example shown in FIGS. 4*a*-4*d* illustrates an advantage according to the timing of operations in some example implementations. Target symbols are transferred to a window while reels are still spinning in that window, rather than after the reels in that window have stopped. In this way, the transfer of target symbols avoids nullifying a winning combination of symbols that uses a symbol that has already landed in the window. (Nullifying a win that has been awarded to a player may violate gaming regulations.)

Alternatively, target symbols can be transferred to a window after reels in that window have stopped. To avoid nullifying a winning combination of symbols that uses a symbol in one of the reels that have already landed in the window, any of several alternative approaches can be adopted.

- In a first alternative approach, two stages of evaluations are conducted. In the first stage of evaluations, win conditions are evaluated for symbols of reels that have landed prior to any transfers of target symbols. Thus, even if symbols are later replaced, win conditions are counted. In a second stage of evaluations, after target symbols are transferred, conditions that depend on the target symbols are evaluated.
- In a second alternative approach, target symbols are handled as wild symbols. If a transferred target symbol replaces a symbol that contributed to a winning combination of symbols, the winning combination still occurs using the transferred target symbol.
- In a third alternative approach, target symbols land first and are selectively transferred. After that, the remaining reels land.

Alternatively, reels can be linked between windows. If a reel lands with a stack of target symbols in one window, the corresponding reels in the other windows stop at the same symbol stop position, so that they also show stacks of target symbols.

B. Example Lookup Tables.

The likelihood of at least a threshold count of target symbols landing for a reel can be managed using a lookup table. Different windows can use different lookup tables, so as to vary the likelihood of at least a threshold count of target symbols landing for the different windows. One or more lookup tables can also be used to manage which values of target symbols appear in reels. This section describes examples of various types of lookup tables.

1. Lookup Tables, in General.

FIG. 3 shows examples of lookup tables 322A . . . 322N, which are also called weighted tables. In general, a lookup table can be implemented as any data structure that assigns probabilities to different options, in order for one of the different options to be selected using a random number. Different options are represented in different entries of a lookup table. The probabilities for different options can be reflected in threshold values (e.g., 1<RND<=40 for option 1, 40<RND<=70 for option 2, 70<RND<=90 for option 3, and 90<RND<=100 for option 4, given four options and a random number RND where 0<RND<=100). The threshold values can represent percentages or, more generally, subranges within the range for a random number. In some example implementations, the threshold values for a lookup table are represented as count values (weights) for the respective entries of the lookup table. For example, the following table shows count values for the four options described above:

TABLE 1

Example Lookup Table

| count value | entry |
|---|---|
| 40 | <value a1, value a2, . . . > |
| 30 | <value b1, value b2, . . . > |
| 20 | <value c1, value c2, . . . > |
| 10 | <value d1, value d2, . . . > |

The sum total of the count values (weights) indicates the range of the options. The backend system 314 can use a random number, generated between 1 and the sum total of the count values, to select one of the entries in the lookup table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected.

The threshold values for a lookup table can be fixed and pre-determined. Or, the threshold values for a lookup table can vary dynamically (e.g., depending on bet level). Or, a lookup table can be dynamically selected (e.g., depending on bet level, depending on window) from among multiple available lookup tables. Different parameters or choices during game play can use different lookup tables. Or, different combinations of parameters or choices can be combined in entries of a given lookup table.

2. Example Lookup Tables for Symbol Stop Positions.

FIG. 5 shows an example lookup table 510 that indicates options for symbol stop positions for a window. In general, a game processing backend system can select and use lookup tables such as the example lookup table 510 as described with reference to the lookup tables 322A . . . 322N of FIG. 3.

The example lookup table 510 includes multiple entries. Each entry has a count (weight), which corresponds to the weight given to that entry compared to all of the entries of the lookup table. A lower count (smaller weight) indicates a less likely option. A higher count (larger weight) indicates a more likely option. The counts depend on implementation. In FIG. 5, each of the counts (weights) is represented as a value $w_{a,b,c}$, for a window a, reel b, and symbol position c. For example, each value $w_{a,b,c}$ is an integer greater than or equal to 1. The counts can be different for different entries or, in some cases, the same for different entries.

For the sake of presentation, FIG. 5 shows the symbols assigned to the respective symbol stop positions (in a column). In practice, the symbols assigned to the respective symbol stop positions can be tracked in a separate structure. In this case, a lookup table only includes columns for symbol stop positions and corresponding counts (weights).

FIG. 5 shows symbol stop positions for a reel that has x symbols. The number of symbols in the respective reels depends on implementation. Although symbol stop positions are not shown for all reels, the reel has symbol stop positions for at least three contiguous target symbols 540 in the reel. (In this example, the threshold count of target symbols is 3.)

In the lookup table 510, symbol stop positions 520 and corresponding weights 530 are set for reel b of window a. Different lookup tables can be used for different windows.

For example, weights for symbol stop positions at target symbols in reels of a first window, second window, and third window can be set so that the likelihood of at least a threshold count of target symbols landing is different between the three windows. Suppose stacks of target symbols are selectively transferred in a downward direction. Also suppose that each weight $w_{a,b,11}$ (for a window a and reel b) corresponds to a symbol stop position at which a full stack of target symbols lands for reel b in window a. Assuming the weights for symbol stop positions for other symbols are the same in the three windows, the weights $w_{1,b,11}$ can be set to have lower values than the weights $w_{2,b,11}$, which can be set to have lower values than the weights $w_{3,b,11}$. In this way, the likelihood of at least a threshold count of target symbols landing can be set to be lower (less likely) in window 1, higher in window 2, and highest in window 3. In some example implementations in which a full stack of target symbols is transferred in a downward direction, the likelihood of a full stack of target symbols landing in window 1 is 1/40, the likelihood of a full stack of target symbols landing in window 2 is 1/25, and the likelihood of a full stack of target symbols landing in window 3 is 1/8. Thus, using different lookup tables for symbol stop positions for different windows, the "hit rate" of landing at least a threshold count of target symbols (so as to trigger transfer of target symbols) can vary between the different windows.

If the direction of transfer is upward or bidirectional, the lookup tables indicating symbol stop positions for different windows can have other weights to compensate for the direction of transfer. In general, the lookup tables can be used to balance RTP and/or volatility depending on the direction of transfer of target symbols (e.g., so that RTP and/or volatility are comparable in each of the windows).

Alternatively, different likelihoods for stacks of target symbols landing in different windows can be set in some other way. For example, with symbol stop positions that are equally likely in a lookup table, reels for a first window can have fewer target symbols, reels for a second window can have more target symbols, and reels for a third window can have the most target symbols. This makes it successively more likely for at least the threshold count of target symbols to land in a reel in the first window, second window, and third window.

3. Example Lookup Tables for Target Symbols.

FIG. 6 shows an example lookup table 610 that indicates options for target symbols for a window. In general, a game processing backend system can select and use lookup tables such as the example lookup table 610 as described with reference to the lookup tables 322A . . . 322N of FIG. 3.

The example lookup table 610 includes multiple entries. Each entry has a count (weight), which corresponds to the weight given to that entry compared to all of the entries of the lookup table. A lower count (smaller weight) indicates a less likely option. A higher count (larger weight) indicates a more likely option. The counts depend on implementation. In FIG. 6, each of the counts (weights) is represented as a value $w_{a,d}$, for a window a and target symbols value d. For example, each value $w_{a,d}$ is an integer greater than or equal to 1. The counts can be different for different entries or, in some cases, the same for different entries.

FIG. 6 shows N possible values for target symbols. The number of possible values for target symbols depends on implementation. For example, the possible values are possible credit values such as 50, 100, 150, 200, 250, 500, 1000, 2000, and 5000.

In the lookup table 610, possible values 620 and corresponding weights 630 are set for window a. Different lookup tables can be used for different windows. For example, suppose that the possible values for target symbols are the same for all windows (all lookup tables), and that target symbols are selectively transferred in a downward direction. Weights for possible values of target symbols in reels of a first window, second window, and third window can be set so that the average value of target symbols is different between the three windows. For example, for possible values of target symbols that are high, the weights $w_{1,d}$ for window 1 can be set to have higher values than the weights $w_{2,d}$ for window 2, which can be set to have higher values than the weights $w_{3,d}$ for window 3. As another example, for possible values of target symbols that are low, the weights $w_{1,d}$ for window 1 can be set to have lower values than the weights $w_{2,d}$ for window 2, which can be set to have lower values than the weights $w_{3,d}$ for window 3. In this way, the average value of target symbols can be set to be highest in window 1 and lowest in window 3. In some example implementations in which a full stack of target symbols is transferred in a downward direction, the average value of target symbols for reels of window 1 is about 900, the average value of target symbols for reels of window 2 is about 250, and the average value of target symbols for reels of window 3 is about 100. Thus, using different lookup tables for possible values of target symbols for different windows, RTP and/or volatility can be controlled between the different windows. In general, such lookup tables can be used to balance RTP and/or volatility depending on the direction of transfer of target symbols (e.g., so that RTP and/or volatility are comparable in each of the windows).

C. Example Screenshots.

Figure 7A:
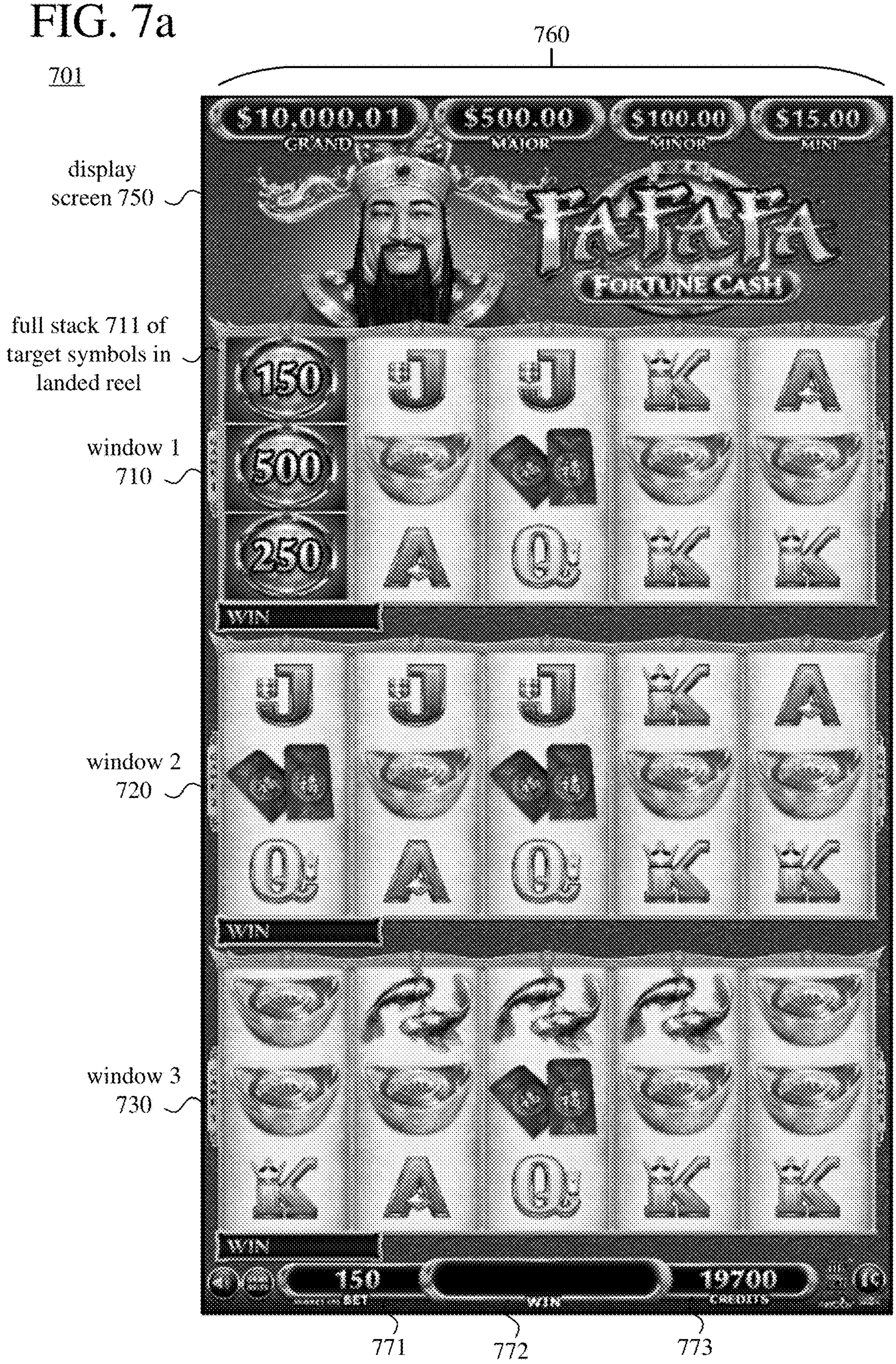
FIGS. 7*a*-7*c* are example screenshots of a display screen of an EGM, showing transfer of target symbols between windows, according to some example implementations.
Figure 7B:
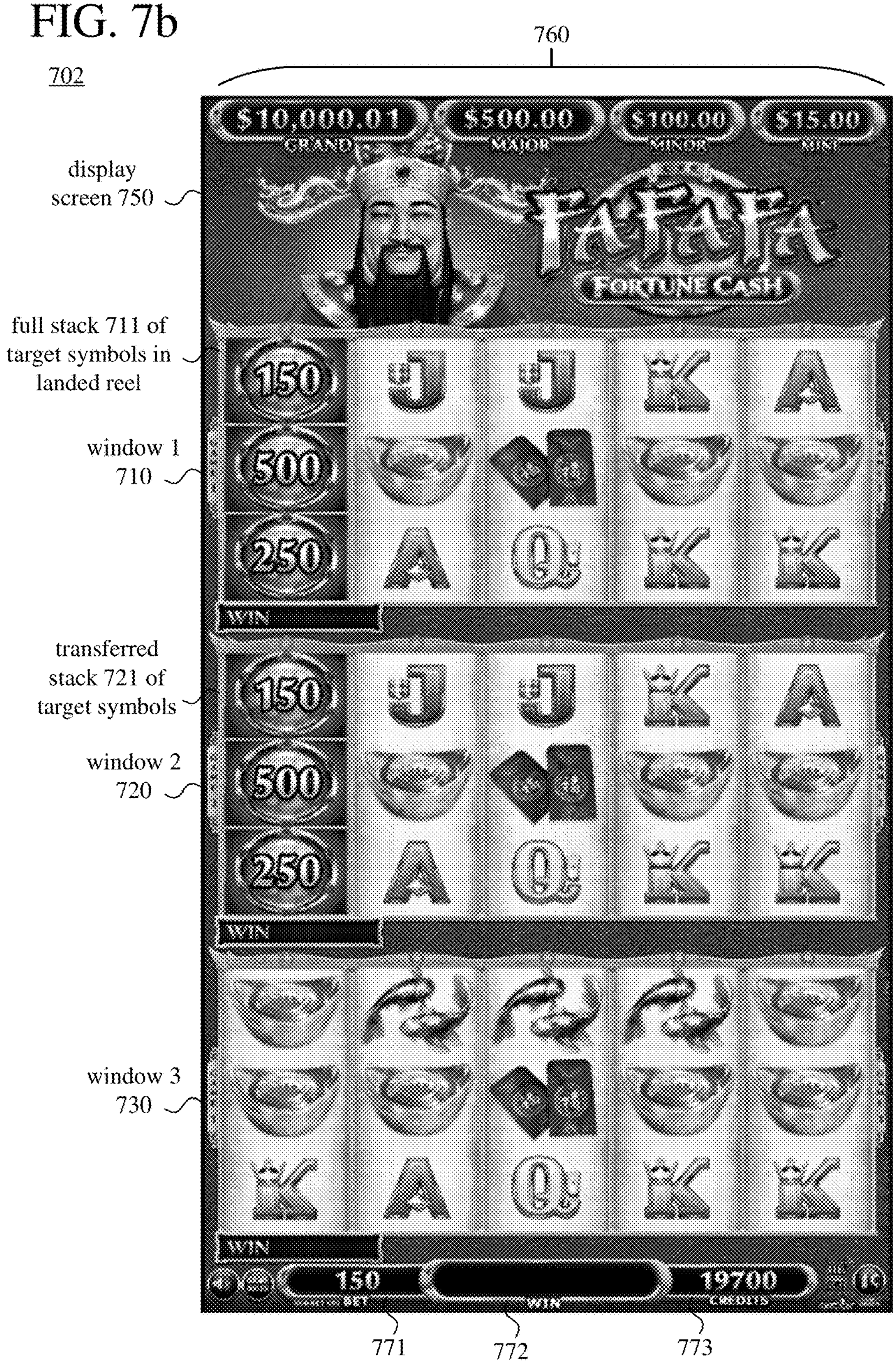
Figure 7C:
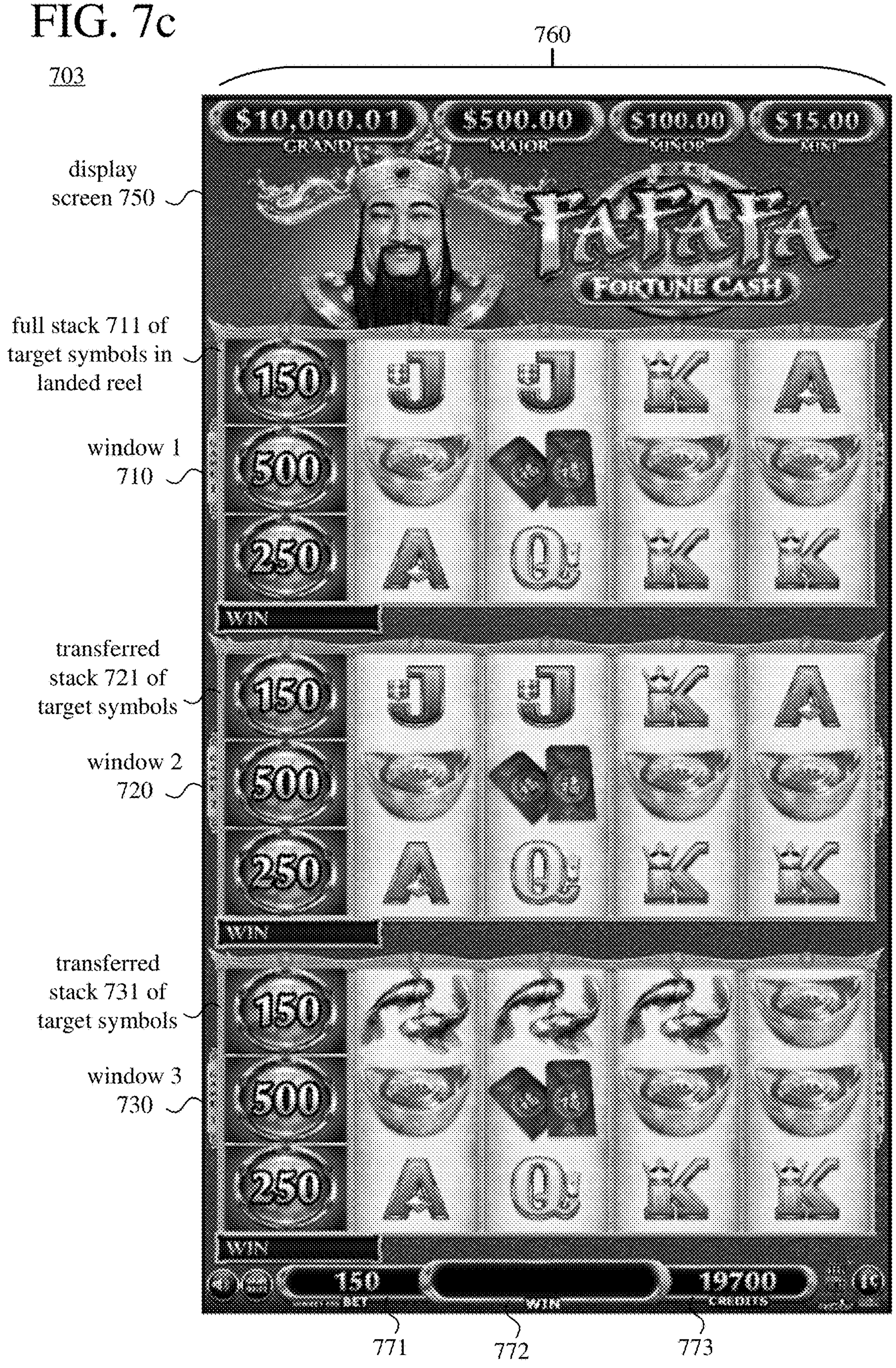

FIGS. 7*a*-7*c* show example screen shots 701, 702, 703 of a display screen 750 of an electronic gaming device such as an EGM, for different stages of transfer of target symbols, according to some example implementations. The example screen shots 701, 702, 703 represent time instances of game play of a base reel game, from the time a full stack of target symbols lands through the time the full stack of target symbols is transferred to other windows.

In FIGS. 7*a*-7*c*, the display screen 750 includes three windows (game windows) 710, 720, 730 as well as a progressive jackpot area 760. Each of the windows 710, 720, 730 spans five reels horizontally and spans three symbols vertically. Below the first reel for each of the windows 710, 720, 730, an area can display a win total for that window. Additional areas at the bottom of the display screen 750 show other information, including an area 771 that shows the current bet level, an area 772 that shows an overall win amount for a play, and an area 773 that shows remaining credits. The border area of the display screen 750 can also display supplemental information such as a base denomination for the game.

In FIGS. 7*a*-7*c*, the target symbols are credit values shown in circular regions or orbs. The other symbols include pictures (e.g., fish, envelopes, gold ingots) and minor symbols (e.g., A, K, Q, J). In general, the symbols in the reels vary depending on implementation.

In the screen shot 701 of FIG. 7*a*, a full stack of 711 of target symbols has landed in the first reel of window 1. The three target symbols show credit values for 150 credits, 500 credits, and 250 credits, respectively. The remaining reels of window 1 have also landed, but do not include any target symbols. In the example shown in FIGS. 7*a*-7*c*, the threshold count for transfer of target symbols is 3 target symbols. As such, the full stack 711 of target symbols transfers to window 2 and window 3.

In the screen shot 702 of FIG. 7*b*, the full stack of 711 of target symbols has landed in the first reel of window 1, and window 2 includes a transferred stack 721 of target symbols in place of the corresponding reel of window 2, but the full stack 711 of target symbols has not yet been transferred to window 3. In the screen shot 703 of FIG. 7*c*, the full stack of 711 of target symbols has landed in the first reel of window 1, window 2 includes a transferred stack 721 of target symbols in place of the corresponding reel of window 2, and window 3 includes a transferred stack 731 of target symbols in place of the corresponding reel of window 3.

In FIGS. 7*a*-7*c*, the reels of window 2 and window 3 are shown as landed. In practice, for some implementations, the reels of window 2 and window 3 are still spinning when the reels of window 1 land, and (aside from the transferred stacks 721,731 of target symbols), the reels of window 2 and window 3 are still spinning before and after the full stack 711 of target symbols is transferred to window 2 and window 3.

D. Example Techniques for Transferring Target Symbols Between Windows.

Figure 8A:
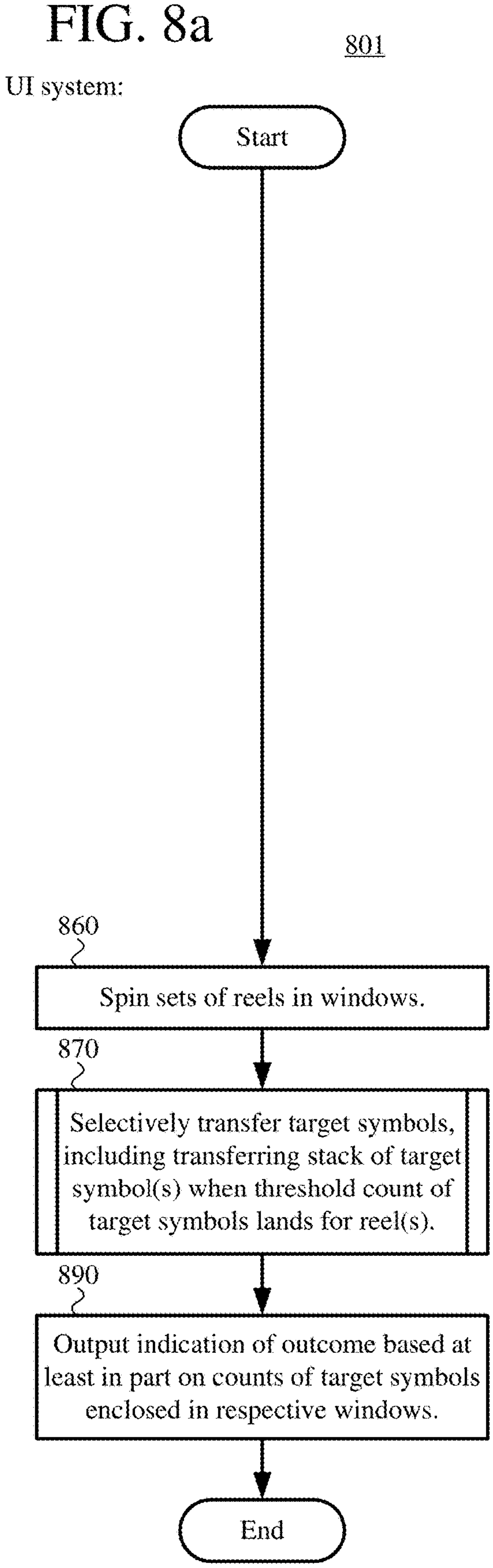
FIGS. 8*a* and 8*b* are flowcharts illustrating example techniques for selectively transferring target symbols between windows, from the perspective of a UI frontend and backend, respectively.
Figure 8B:
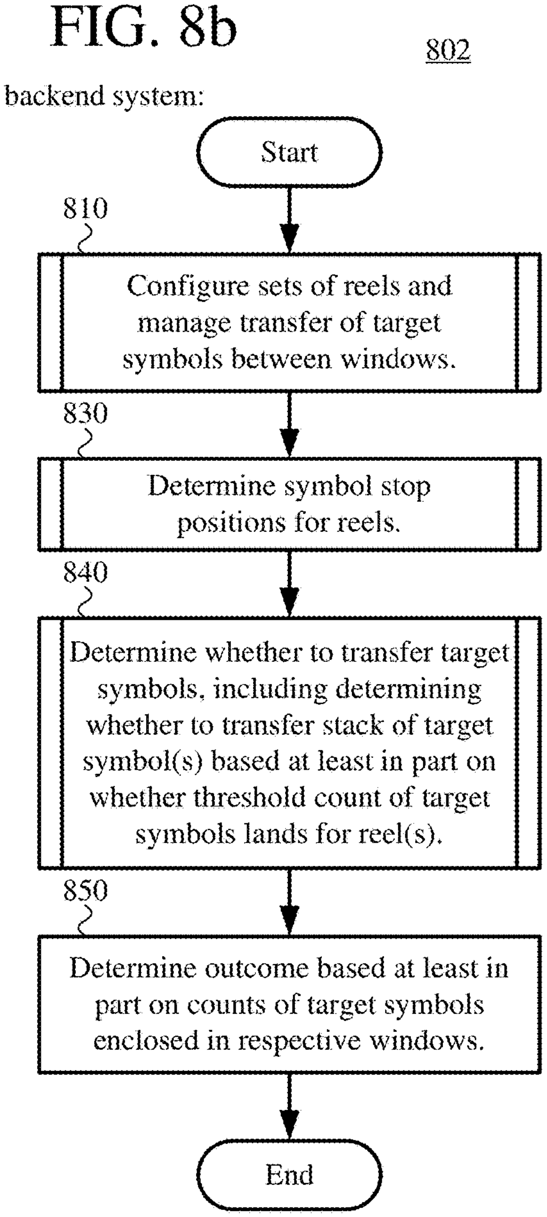
Figure 8E:
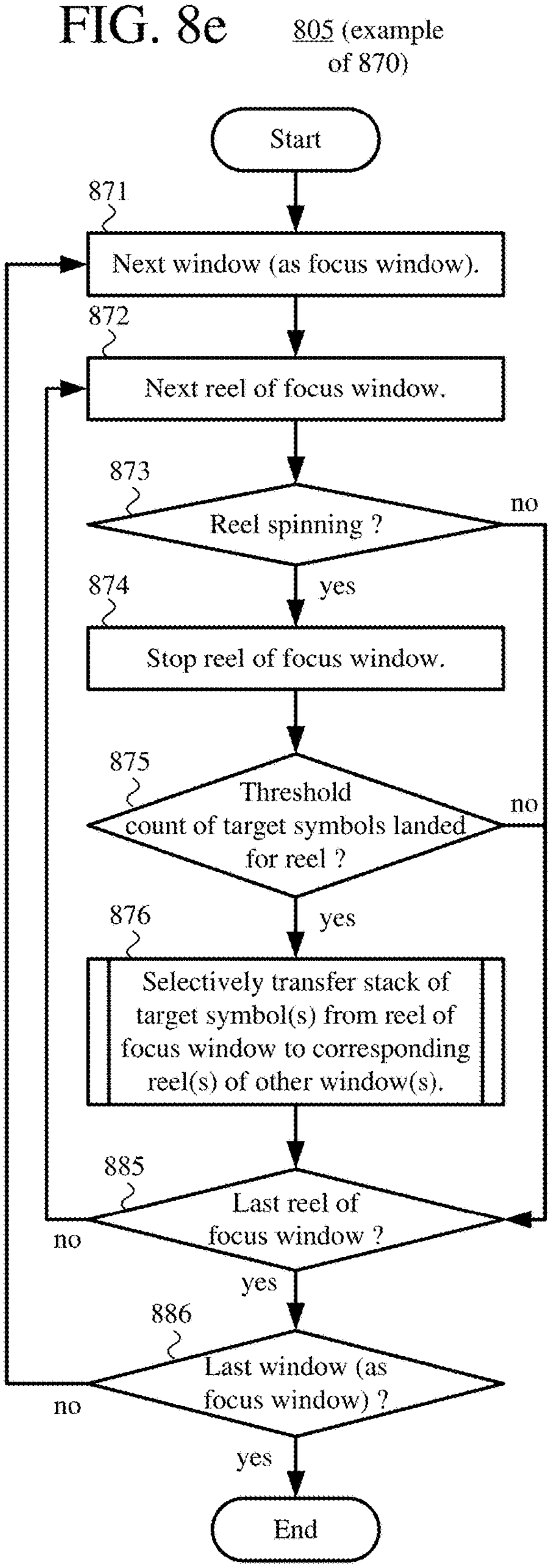
Figure 8F:
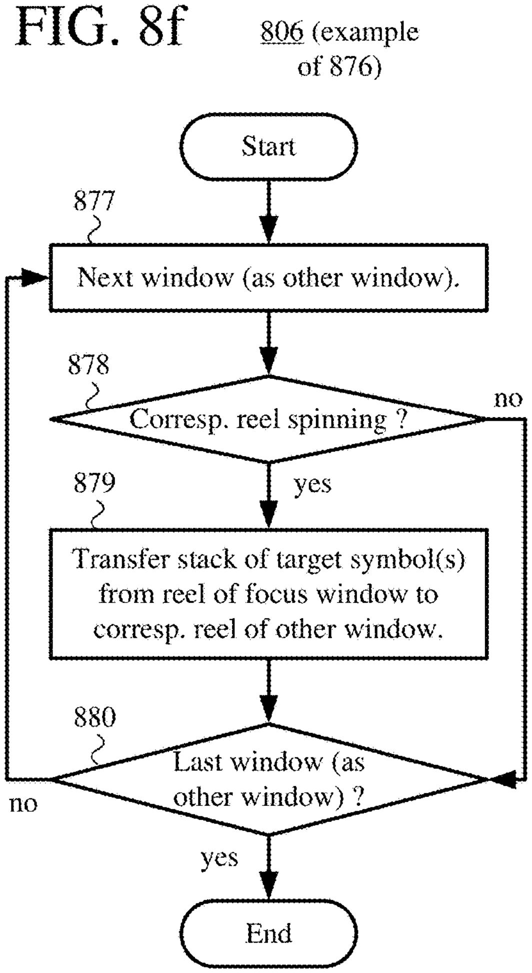
Figure 8G:
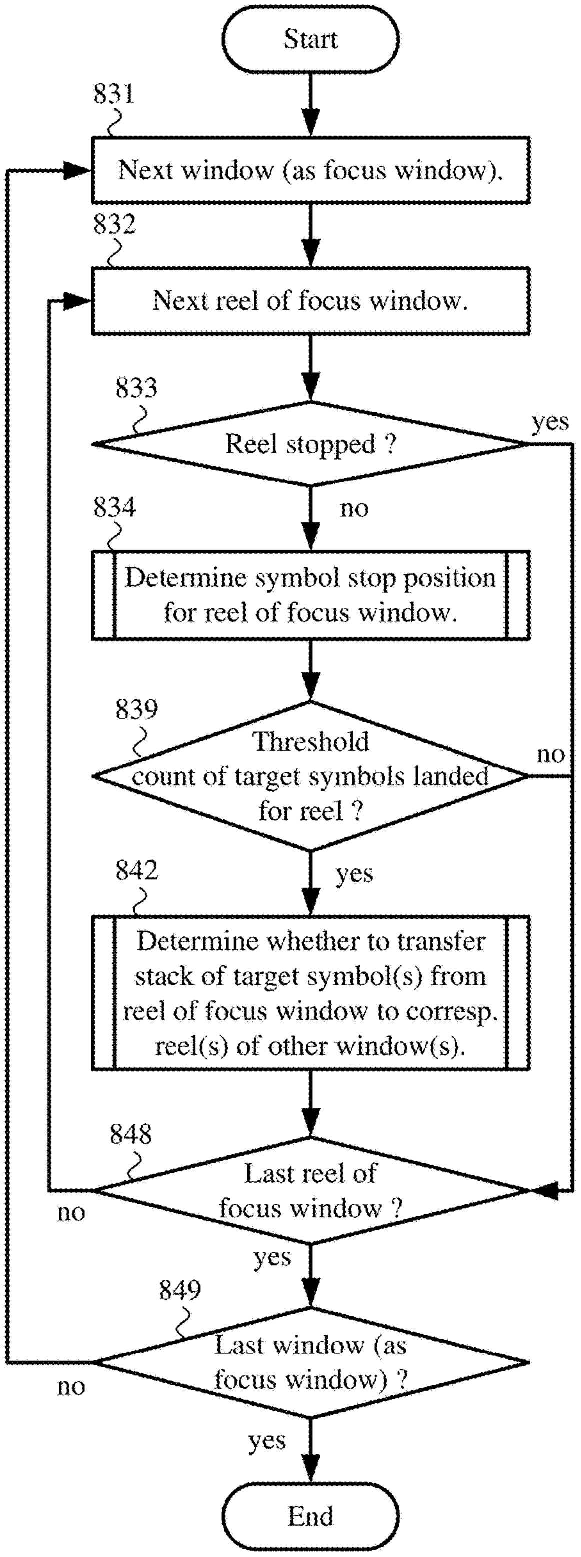
Figure 8H:
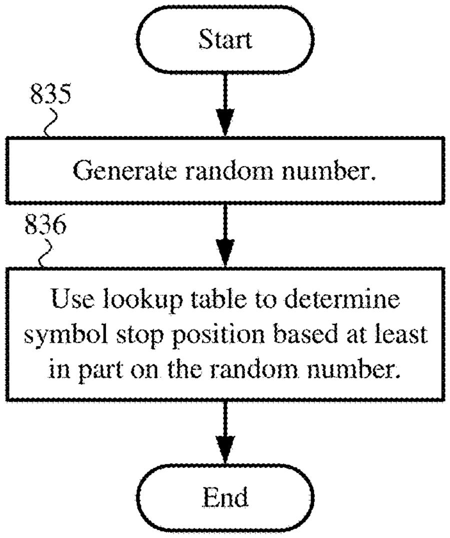
Figure 8I:
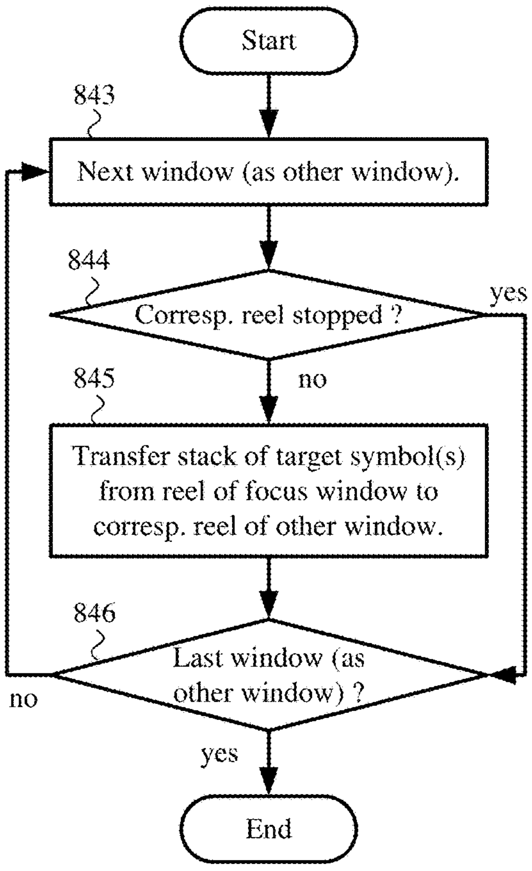

FIGS. 8*a*-8*i* show different aspects of controlling a user interface ("UI") of an electronic gaming device such as an electronic gaming machine ("EGM") to selectively transfer target symbols between windows. For example, target symbols are selectively transferred during a base reel game or bonus reel game. In particular, FIG. 8*a* shows an example technique 801 for selectively transferring target symbols between windows, from the perspective of a UI frontend. Operations of the example technique 801 shown in FIG. 8*a* can be performed, for example, in a UI system 302 explained with reference to FIG. 3. FIG. 8*b* shows an example technique 802 for selectively transferring target symbols between windows, from the perspective of a backend. Operations of the example technique 802 shown in FIG. 8*b* can be performed, for example, in a game processing backend system 314 explained with reference to FIG. 3. FIGS. 8*c* and 8*d* show example techniques for configuration and management operations shown in FIG. 8*b*, which can, for example, be performed in the backend system 314. FIGS. 8*e* and 8*f* show example techniques for selective transfer operations shown in FIG. 8*a*, which can, for example, be performed in the UI system 302. FIGS. 8*g*-8*i* show example techniques for selective transfer operations shown in FIG. 8*b*, which can, for example, be performed in the backend system 314. The game processing backend system and UI system can be implemented using memory and one or more processors that are part of the electronic gaming device and/or part of a gaming system located remotely from the electronic gaming device. Depending on implementation, the backend system and UI system can be implemented by software executable on a CPU, by software controlling special-purpose hardware (e.g., a GPU or other graphics hardware for video acceleration), and/or by special-purpose hardware (e.g., in an ASIC), to process game play instructions in accordance with game play rules, determine outcomes in accordance with game play rules, and/or generate outputs (e.g., to one or more display screens and/or speakers).

With reference to FIGS. 8*a* and 8*b*, a backend system and UI system can start the processes (e.g., during a base reel game or bonus reel game) in response to satisfaction of a start condition. In some example implementations, the start condition is initiation of a play of a base reel game. The UI system can receive user input that indicates actuation of a button of the electronic gaming device (e.g., a "play" button or "spin" button), then cause the backend system and UI system start the processes in response to actuation of the button of the electronic gaming device. Alternatively, the start condition can be defined in some other way (e.g., randomly starting the processes in x % of the plays of a base reel game, or when there is a configuration of special symbols in a game window).

In general, the techniques 801, 802 shown in FIGS. 8*a* and 8*b* use multiple windows on one or more display screens of an electronic gaming device. The multiple windows can be displayed on a single display screen (e.g., main display screen, or secondary display screen). Or, the multiple windows can be split among multiple display screens (e.g., two windows on a first display screen, and a third window on a second display screen). The number of windows depends on implementation. In some example implementations, there are three game windows. Alternatively, there can be more or fewer game windows. As used herein, the term "game window" or "reel area" can be used interchangeably with the term window.

In general, a window spans m reels in a first dimension and spans n symbols in a second dimension orthogonal to the first dimension. The value of m can be 4, 5, 6, 7, 8, or some other number of reels. The value of n can be 2, 3, 4, 5, 6, or some other number of symbols. In some example implementations, the reels in a window are organized in a 5×3 configuration (5 reels, with 3 symbols visible per reel). Typically, the m reels are arranged horizontally in the window from left-to-right, with the m reels spinning vertically and the window showing n symbols of each of the respective reels. Alternatively, the m reels are arranged vertically in the window from top-to-bottom, with the m reels spinning horizontally and the window showing n symbols of each of the respective reels. Also, instead of having the same value of n for all reels across a window, the window can have different numbers of symbols visible for different reels. Thus, the value of n can be different for different reels (e.g., n=3 for a leftmost reel, n=4 for a second reel, n=5 for a center reel, n=4 for a fourth reel, and n=3 for a rightmost reel). Each of the reels has an associated reel strip that is movable through a window upon a spin of the reel.

The target symbols depend on implementation. In some example implementations, the target symbols are credit symbols. The credit symbols have dynamic values, which are assigned when reels are configured. In this way, different credit symbols can have different values but still be counted as target symbols. Alternatively, the target symbols can be credit symbols that have pre-defined values (not dynamic values) that may be different for different target symbols. Or, the target symbols can be credit symbols that have the same value. Or, the target symbols can be wild symbols or some other type of symbol.

In some example implementations, windows are organized vertically, and transferring a stack of one or more target symbols includes transferring the stack of target symbol(s) up and/or down between windows. For example, the stack is a vertical stack of target symbols. Alternatively, windows can be organized horizontally, and a stack of target symbol(s) can be transferred left and/or right between windows. For example, the stack is a horizontal stack of target symbols.

1. Example Backend Operations.

With reference to FIG. 8*b*, at stage 810, a backend system (such as the game processing backend system 314 described with reference to FIG. 3) configures multiple sets of reels and manages transfer of target symbols between windows. Each of the windows has one of the sets of reels. Examples of configuration and management options are described in Section II.D.2.

At stage 830, the backend system determines symbol stop positions for at least some of the reels. At stage 840, the backend system determines whether to transfer target symbols between at least some of the multiple windows. In particular, the backend system determines whether to transfer a stack of one or more target symbols from a focus window (among the multiple windows) to each of one or more other windows (among the multiple windows) based at least in part on whether at least a threshold count of target symbols lands for one or more of the reels within the focus window. The threshold count of target symbols (for whether to transfer target symbols) depends on implementation. For example, the threshold count is 3 symbols (i.e., the count for a "full" stack of target symbols that lands, for a 5×3 reel configuration). Alternatively, the threshold count is some other number of target symbols, indicating a full stack or partial stack of target symbols, or even a single symbol. Or, when the target symbols have credit values or other numerical values associated with them, the threshold count of target symbols can be a total value of the target symbols (e.g., total credit value). The count of target symbols, whether calculated as a number of target symbols or total value of target symbols, can be evaluated per reel, per group of multiple reels, or for all of the reels of a window, collectively (e.g., for a total number of target symbols or total value of target symbols for the window). The backend system can use any of several different approaches to determine the symbol stop positions (at stage 830) and determine whether to transfer target symbols (at stage 840), as described in Section II.D.3.

When a stack of target symbol(s) is transferred from the focus window to a corresponding reel of another window, the transfer operation can be implemented in various ways. For example, the corresponding reel can be obscured or replaced (completely or partially) by the stack of target symbol(s). The stack of target symbols can be a full stack or partial stack, or even a single symbol. Alternatively, the backend system can cause the corresponding reel to stop at a symbol stop position for which the stack of target symbol(s) lands in the other window.

At stage 850, the backend system determines an outcome based at least in part on the counts of target symbols enclosed in the respective windows (considered as individual windows). For example, when the operations shown in FIG. 8*b* are performed as part of a base reel game, for each of the multiple windows, the backend system can determine whether to perform operations of a supplemental feature (such as a hold-and-spin feature for the window or other bonus feature). In particular, the backend system determines whether the window encloses at least a threshold count of target symbols, including any transferred target symbols, in the window. The threshold count of target symbols (for whether to perform operations of the supplemental feature) depends on implementation. For example, the threshold count is 6 symbols (i.e., 6 target symbols enclosed in a given window). Alternatively, the threshold count is some other number of target symbols. Or, when the target symbols have credit values or other numerical values associated with them, the threshold count of target symbols can be a total value of the target symbols (e.g., total credit value). If the supplemental feature is started for a window, the backend system performs operations for the supplemental feature for that window (e.g., determining symbol stop positions for reels, decrementing or resetting a spin counter) and eventually determines an outcome of the supplemental feature. For a hold-and-spin feature, target symbols are held in place in a window while other reels spin. In this way, the backend system determines an outcome, if any, of the supplemental feature for any of the multiple windows that encloses at least the threshold count of target symbols (for triggering the supplemental feature). Alternatively, the backend system determines an outcome based at least in part on the counts of target symbols enclosed in the respective windows in some other way (e.g., determining an award based at least in part on counts of target symbols).

2. Example Configuration and Management Operations.

This section describes examples of operations to configure sets of reels and manage transfer of target symbols (stage 810).

The backend system can perform various operations when configuring sets of reels (at stage 810). For example, as shown in the example technique 804 of FIG. 8*d*, the backend system can dynamically assign target symbols to sets of reels. To configure the sets of reels, the backend system identifies sets of reels for the multiple windows, respectively, at stage 813. For each of the reels, respectively, the backend system replaces any target symbol placeholder on a reel strip for the reel with a target symbol. In the example technique 804 of FIG. 8*d*, the backend system processes the reels on a reel-by-reel basis, and processes the symbol positions of the reel strip for a reel on a position-by-position basis. At stage 814, the backend system gets a next reel to be processed. For that reel (as the current reel), at stage 815, the backend system gets the next symbol position to evaluate. For that symbol position (as the current symbol position), the backend system checks (at stage 816) if there is a target symbol placeholder. If not, the backend system checks (at stage 820) whether the last symbol position has been processed for the reel strip and, if not, gets (at stage 815) the next symbol position to evaluate. Otherwise (there is a target symbol placeholder in the current symbol position), the backend system generates a random number with a random number generator (at stage 817) and uses a lookup table, which includes entries indicating options for different target symbols, to determine a target symbol based at least in part on the random number. For example, the random number is generated using the gaming RNG 318 described with reference to FIG. 3, and the lookup table is one of the lookup tables 322A-322N described with reference to FIG. 3. In particular, the backend system evaluates (at stage 818) the random number against entries in the lookup table and replaces (at stage 819) the target symbol placeholder with the target symbol. The backend system then checks (at stage 820) whether the last symbol position has been processed for the reel strip. After the last symbol position has been evaluated for a reel, the backend system checks (at stage 821) whether the last reel has been evaluated. If not, the backend system continues by getting (at stage 814) the next reel.

Alternatively, the backend system can configure the sets of reels in some other way. For example, the sets of reels can include target symbols that do not change.

The backend system can also perform various operations when managing transfer of target symbols (at stage 810). As shown in the example technique 803 of FIG. 8*c*, for at least some of the windows, the backend system can set (at stage 811) different likelihoods of at least a threshold count of target symbols landing. To set the different likelihoods, the backend system can select different lookup tables for the windows, respectively, where entries of the different lookup tables provide options for the different likelihoods of at least the threshold count of target symbols landing. For example, the sets of reels can include target symbols, and at least some of the entries of the different lookup tables can indicate options for different symbol stop positions. Or, at least some of the entries of the different lookup tables can indicate options for whether or not the threshold count of target symbols lands (e.g., if lookup tables for symbol stop positions are separate from the lookup tables that control whether at least a threshold count of target symbols lands). For example, the lookup tables are selected from among the lookup tables 322A-322N described with reference to FIG. 3.

Alternatively, to set the different likelihoods of at least a threshold count of target symbols landing, the backend system can adjust counts of target symbols in the sets of reels for the multiple windows, respectively. For example, the backend system can add target symbols to one or more sets of reels and/or remove target symbols from one or more sets of reels.

Instead of or in addition to managing the likelihood of at least a threshold count of target symbols landing (stage 811), for at least some of the multiple windows, the backend system can set (at stage 812) different distributions of values of target symbols in the sets of reels. For example, the backend system can select different lookup tables for the multiple windows, respectively, where entries of the different lookup tables provide options for the different distributions of values of target symbols in the sets of reels. For example, the lookup tables are selected from among the lookup tables 322A-322N described with reference to FIG. 3. To replace a target symbol placeholder on a reel strip for a reel with a target symbol, the backend system can generate a random number with a random number generator (e.g., gaming RNG 318) and using one of the different lookup tables to determine the target symbol based at least in part on random number, for example, as described with reference to FIG. 8*d*.

Alternatively, the backend system can manage transfer of target symbols in some other way.

3. Example Operations to Determine Symbol Stop Positions and Determine Whether to Transfer Target Symbols.

This section describes examples of ways to determine symbol stop positions (at stage 830) and determine whether to transfer target symbols (at stage 840).

In one approach to implementing operations for stages 830 and 840, the backend system determines symbol stop positions (stage 830) on a window-by-window basis for each of the multiple windows as the focus window. For the focus window, the backend system successively determines symbol stop positions for any of the reels in the focus window that is not yet stopped. For a stack of target symbol(s) for a stopped reel in the focus window, the backend system can determine whether to transfer the stack of target symbol(s) to any of the one or more other windows having a corresponding reel that is not yet stopped.

More specifically, in the example technique 807 of FIG. 8*g*, the backend system processes the windows on a window-by-window basis, and processes the reels for a window on a reel-by-reel basis. At stage 831, the backend system gets a next window to process (as the “focus” window). The focus window can also be called the “current” window. For the focus window, at stage 832, the backend system gets a next reel to be processed. For that reel, the backend system checks (at stage 833) whether the reel has already been stopped (e.g., because it has been replaced with a stack of target symbol(s)). If so, the backend system checks (at stage 848) whether the last reel has been processed for the focus window and, if not, gets (at stage 832) the next reel to evaluate. Otherwise (the current reel has not already been stopped), the backend system determines (at stage 834) the symbol stop position for the reel of the focus window. For example, as shown in the example technique 808 of FIG. 8*h*, the backend system generates (at stage 835) a random number with a random number generator (e.g., gaming RNG 318) and uses (at stage 836) a lookup table (e.g., one of the lookup tables 322A-322N), which includes entries indicating options for different symbol stop positions, to determine the symbol stop position based at least in part on random number. Alternatively, the backend system determines the symbol stop position for the reel in some other way.

With reference to FIG. 8*g*, for the current reel (for which a symbol stop position was just determined), the backend system evaluates (at stage 839) whether at least a threshold count of target symbols has landed for the reel in the focus window. The backend system can make this decision, for example, by counting how many target symbols are visible in the focus window (given the symbol stop position) or by checking whether the given symbol stop position is designated as meaning that at least the threshold count of target symbols has landed. If the threshold count of target symbols is a total value of the target symbols (e.g., total credit value), the backend system can add up the values of the target symbols. If at least the threshold count of target symbols has landed for the reel in the focus window, the backend system determines (at stage 842) whether to transfer a stack of target symbol(s) from the reel of the focus window to a corresponding reel in each of one or more other windows.

FIG. 8*i* shows one approach 809 to determining (at stage 842) whether to transfer a stack of target symbol(s). In this approach, the backend system only transfers a stack of target symbol(s) to a corresponding reel that is still spinning in another window. The backend system processes the other windows on a window-by-window basis. At stage 843, the backend system gets a next window to process (as the “other” window). For the other window, at stage 844, the backend system checks whether the corresponding reel (in line with the current reel of the focus window) has already stopped. If not, the backend system transfers (at stage 845) the stack of target symbol(s) from the current reel of the focus window to the corresponding reel of the other window. The corresponding reel of the other window is thereafter considered to be stopped. The backend system checks (at stage 846) whether the last other (non-focus) window has been evaluated. If not, the backend system continues by getting (at stage 843) the next window.

Alternatively, the backend system uses another approach to determine (at stage 842) whether to transfer a stack of target symbol(s). In this approach, the backend system transfers a stack of target symbol(s) (for a reel in the focus window) to a corresponding reel in another window regardless of whether the corresponding reel has stopped yet. To do so, the approach accounts for any rules that prevent an award or other win from being “taken away” from a player. For example, the target symbols are wild symbols. In this case, any win that was previously awarded based on a symbol in a stopped corresponding reel is still a win, considering the target symbol (wild symbol) that was transferred to replace a symbol of the corresponding reel. Or, as another example, the backend system can determine outcomes for a base reel game for the respective windows (or otherwise determine outcomes that depend on symbols of corresponding reels that have already stopped) before determining whether to transfer target symbols. In this way, wins that use symbols of corresponding reels that have already stopped are not "taken away" from the player.

Alternatively, the backend system uses some other approach to determine (at stage 842) whether to transfer a stack of target symbol(s).

Returning to FIG. 8*g*, the backend system checks (at stage 848) whether the last reel has been processed for the focus window. After the last reel has been processed for the focus window, the backend system checks (at stage 849) whether the last window has been evaluated. If not, the backend system continues by getting (at stage 831) the next window.

In another approach to implementing operations for stages 830 and 840, the backend system determines symbol stop positions on a window-by-window basis for each of the multiple windows as the focus window, successively determining symbol stop positions for any of the reels in the focus window that is not yet stopped and for which at least the threshold count of target symbols lands in the focus window. Then, after determining whether to transfer target symbols, the backend system determines symbol stop positions on a window-by-window basis for each of the multiple windows as the focus window, successively determining symbol stop positions for any of the reels in the focus window that is not yet stopped. In other words, the backend system first lands reels that have at least the threshold count of target symbols and transfers any stacks of target symbols. After that, the backend system lands the other reels. In this approach, the backend system avoids "taking away" any wins from a player due to the transfer of a stack of target symbol(s) to a reel that has stopped.

4. Example Frontend Operations.

With reference to FIG. 8*a*, at stage 860, a UI system (such as the UI system 302 described with reference to FIG. 3) spins a set of reels in each of multiple windows. For example, for a window, the UI system moves reel strips of at least some of the reels through the window. For a reel, unless target symbols are transferred from another reel, the UI system eventually stops the movement of the reel strip of the reel at a symbol position of the reel strip (the symbol stop position). Alternatively, the UI system performs some other combination of operations to spin at least some of the reels. For a window, the spinning of the reels can stop for successive reels in the window (e.g., with reels successively stopping from left to right in the window).

At state 870, the UI system selectively transfers target symbols between at least some of the multiple windows. In particular, the UI system transfers a stack of one or more target symbols from a focus window (among the multiple windows) to one or more other windows (among the multiple windows) when at least a threshold count of target symbols lands for one or more of the reels within the focus window. The threshold count of target symbols (for whether to transfer target symbols) depends on implementation. For example, the threshold count is 3 symbols (i.e., a "full" stack of target symbols lands, for a 5×3 reel configuration). Alternatively, the threshold count is some other number of target symbols, indicating a full stack or partial stack of target symbols, or even a single symbol. Or, when the target symbols have credit values or other numerical values associated with them, the threshold count of target symbols can be a total value of the target symbols (e.g., total credit value). The count of target symbols, whether calculated as a number of target symbols or total value of target symbols, can be evaluated per reel, per group of multiple reels, or for all of the reels of a window, collectively (e.g., for a total number of target symbols or total value of target symbols for the window). The UI system can use any of several different approaches to selectively transfer target symbols (at stage 870), as described in Section II.D.5.

When a stack of target symbol(s) is transferred from the focus window to a corresponding reel of another window, the transfer operation can be implemented in various ways. For example, the corresponding reel can be obscured or replaced (completely or partially) by the stack of target symbol(s). The stack of target symbols can be a full stack or partial stack, or even a single symbol. Alternatively, the UI system can cause the corresponding reel to stop at a symbol stop position for which the stack of target symbol(s) lands in the other window. The selectively transferring target symbols can happen during the spinning of reels in other windows, before the spinning of reels in other windows starts, or (in some cases) after the spinning of reels in other windows stops. During the transferring the stack of target symbol(s), the UI system can render one or more animations that indicate the transferring the stack of target symbol(s).

The operations shown in FIG. 8*a* can be performed as part of a base reel game. The UI system can selectively perform operations of a supplemental feature (such as a hold-and-spin feature for a window or other bonus feature) for any of the windows that encloses at least a threshold count of target symbols, including any transferred target symbols, in the window (considered as an individual window). The threshold count of target symbols (for whether to perform operations of the supplemental feature) depends on implementation. For example, the threshold count is 6 symbols (i.e., 6 target symbols enclosed in a given window). Alternatively, the threshold count is some other number of target symbols. Or, when the target symbols have credit values or other numerical values associated with them, the threshold count of target symbols can be a total value of the target symbols (e.g., total credit value). Examples of operations of a supplemental feature are described in Section ILE.

At stage 890, the UI system outputs an indication of an outcome, if any, of the supplemental feature for the any of the multiple windows that encloses at least the threshold count of target symbols (for triggering the supplemental feature). For example, the UI system renders a graphic (e.g., image, animation) that indicates the outcome. Alternatively, the UI system outputs an indication of an outcome that is based at least in part on the counts of target symbols enclosed in the respective windows in some other way (e.g., showing an award that is based at least in part on counts of target symbols).

5. Example Operations to Selectively Transfer Target Symbols.

This section describes examples of ways to selectively transfer target symbols (at stage 870).

In one approach to implementing operations for stage 870, on a window-by-window basis for each of the multiple windows as the focus window, the UI system successively stops any of the reels in the focus window that is still spinning. For each stopped reel in the focus window for which at least a threshold count of target symbols lands in the focus window, the UI system transfers a stack of target symbol(s) to any of the one or more other windows having a corresponding reel that is still spinning.

More specifically, in the example technique 805 of FIG. 8*e*, the UI system processes the windows on a window-by-window basis, and processes the reels for a window on a reel-by-reel basis. At stage 871, the UI system gets a next window to process (as the "focus" window). The focus window can also be called the "current" window. For the focus window, at stage 872, the UI system logic gets a next reel to be processed. For that reel, the UI system checks (at stage 873) whether the reel is still spinning (e.g., because it has not been replaced with a stack of target symbol(s)). If the reel is not still spinning, the UI system checks (at stage 885) whether the last reel has been processed for the focus window and, if not, gets (at stage 872) the next reel to evaluate. Otherwise (the current reel still spinning), at stage 874, the UI system stops the reel (at the symbol stop position previously determined for the reel).

For the current reel (which was just stopped), the UI system evaluates (at stage 875) whether at least a threshold count of target symbols has landed for the reel in the focus window. The UI system can make this decision, for example, by counting how many target symbols are visible in the focus window (given the symbol stop position), by checking whether the given symbol stop position is designated as meaning that at least the threshold count of target symbols has landed, or by checking a separate indicator (provided by a backend system) of whether at least a threshold count of target symbols has landed. If at least the threshold count of target symbols has landed for the reel in the focus window, the UI system selectively transfers (at stage 876) a stack of target symbol(s) from the reel of the focus window to a corresponding reel in each of one or more other windows.

FIG. **8*f* shows one approach 806 to selectively transferring (at stage 876) a stack of target symbol(s). In this approach, the UI system only transfers a stack of target symbol(s) to a corresponding reel that is still spinning in another window. The UI system processes the other windows on a window-by-window basis. At stage 877, the UI system gets a next window to process (as the "other" window). For the other window, at stage 878, the UI system checks whether the corresponding reel (in line with the current reel of the focus window) is still spinning. If so, the UI system transfers (at stage 879) the stack of target symbol(s) from the current reel of the focus window to the corresponding reel of the other window. The corresponding reel of the other window is thereafter considered to be stopped. The UI system checks (at stage 880) whether the last other (non-focus) window has been evaluated. If not, the UI system continues by getting (at stage 877**) the next window.

Alternatively, the UI system uses another approach to selectively transfer (at stage 876) a stack of target symbols. For example, in one alternative approach, the UI system transfers a stack of target symbol(s) (for a reel in the focus window) to a corresponding reel in another window regardless of whether the corresponding reel is still spinning. To do so, the approach accounts for any rules that prevent an award or other win from being "taken away" from a player. For example, the target symbols are wild symbols. In this case, any win that was previously awarded based on a symbol in a stopped corresponding reel is still a win, considering the target symbol (wild symbol) that was transferred to replace a symbol in the corresponding reel. Or, as another example, outcomes for a base reel game for the respective windows can be determined (or outcomes that depend on symbols of corresponding reels that have already stopped can otherwise be determined) before target symbols are transferred. In this way, wins that use symbols of corresponding reels that have already stopped are not "taken away" from the player.

Alternatively, the UI system uses some other approach to selectively transfer (at stage 876) a stack of target symbol(s). For example, on a window-by-window basis, the UI system can spin the set of reels for a given window and then selectively transfer target symbols to other windows for which reels have not yet started spinning. Thus, on a window-by-window basis, the UI system can interleave operations to spin reels (at stage 860) and selectively transfer target symbols (at stage 870).

Returning to FIG. **8*e*, the UI system checks (at stage 885) whether the last reel has been processed for the focus window. After the last reel has been processed for the focus window, the UI system checks (at stage 886) whether the last window has been evaluated. If not, the UI system continues by getting (at stage 871**) the next window.

In another approach to implementing operations for stage 870, on a window-by-window basis for each of the multiple windows as the focus window, the UI system successively stops any of the reels in the focus window that is still spinning and for which at least the threshold count of target symbols lands in the focus window. For each stopped reel in the focus window for which at least the threshold count of target symbols lands in the focus window, the UI system transfers the stack of target symbol(s) to each of the one or more other windows. Then, after selectively transferring target symbols, on a window-by-window basis for each of the multiple windows as the focus window, the UI system successively stops any of the reels in the focus window that is still spinning. In other words, the UI system first lands reels that have at least the threshold count of target symbols and transfers any stacks of target symbols. After that, the UI system lands the other reels. In this approach, the UI system avoids "taking away" any wins from a player due to the transfer of a stack of target symbol(s) to a reel that is still spinning 6. Alternatives.

Although FIGS. **8*a* and 8*b* show stages 810, 830, 840, and 850 in a series, and show stages 860, 870, and 890 in a separate series, the backend system and UI system can perform operations for some or all of these stages concurrently. For example, the backend system can concurrently determine symbol stop positions for reels (stage 830) and determine whether to transfer target symbols (stage 840). Or, as another example, the UI system can interleave operations to spin reels (at stage 860) and selectively transfer target symbols (at stage 870**) on a window-by-window basis.

E. Examples of Outcome Determination and Supplemental Features.

The backend system can determine various outcomes and perform operations for various types of supplemental features. The UI system can output indications of those outcomes and perform operations for various types of supplemental features.

In some example implementations, a hold-and-spin feature is activated for any window that encloses at least a threshold count of target symbols. The hold-and-spin feature occurs in a single window. If the hold-and-spin feature is activated for multiple windows, the hold-and-spin feature is performed in those windows consecutively, one window after another. A window not being used for the hold-and-spin feature can be covered or otherwise indicated to be inactive.

During the hold-and-spin feature, reels can include symbols from the same set of symbols as the base reel game. To distinguish from regular gameplay of the base reel game, inactive symbols (symbols other than target symbols) can be displayed differently during the hold-and-spin feature (e.g., with lower brightness). The target symbols remain active during the hold-and-spin feature.

During the hold-and-spin feature, target symbols are held in place (locked) in a window while reels spin for other symbol positions of the window. The hold-and-spin feature can use different reels than the base reel game. For example, each symbol position in a window can have its own reel. Thus, for each of the 15 symbol positions of a window with a 5×3 configuration of reels, the hold-and-spin feature can use a different reel. (But no reel spins in a position when a target symbol is held in that position.) In the reels for the hold-and-spin feature, target symbols can have values assigned as described with reference to FIG. 8*d.*

Initially, a player is given p spins for the hold-and-spin feature in a window. For example, p is 3. Alternatively, p has some other value. When the player actuates a button to spin the reels or otherwise starts a spin of the hold-and-spin feature, all non-locked reels in the window spin and eventually stop, and p is decremented. If any new target symbols land in the window, those new target symbol(s) as well as previous target symbols are held in place (locked) and p is reset to its initial value. Locked target symbols are held until the end of the hold-and-spin feature. When p reaches 0 or all symbol positions are occupied by target symbols, an outcome is determined based on the target symbols (e.g., adding credit values of the target symbols).

Alternatively, another type of supplemental feature can be activated if a window includes at least a threshold count of target symbols.

In addition, in some example implementations, after reels have landed (stopped) in a window, any win conditions can be detected and any win amounts can be awarded to the player (e.g., credited to the player's credit balance). For example, win conditions are defined as pay lines (also called win lines) across at least a portion of a window on a display screen. For a round of play, when a certain combination of symbols appears along a pay line, a win amount corresponding to that combination of symbols and that pay line is awarded. Win amounts can vary according to the combination of symbols and according to the particular pay line along which the combination of symbols appears. Win amounts are typically determined according to a pay table defined for the base reel game, where the pay table comprehends the various combinations of symbols and pay lines, i.e., the win conditions that may occur in the base reel game. (The win conditions for a supplemental feature can be evaluated in the same way as win conditions for a base reel game, with win conditions being more likely in the supplemental feature. Or, win conditions can be evaluated in different ways for the supplemental feature and base reel game.) The win amount for a round of play may be a fraction of an amount wagered for that round of play for certain win conditions. For other win conditions, the win amount may be much larger than the amount wagered.

The number of pay lines and base credit cost to play depends on implementation. In some example implementations, there are 50 pay lines and a 150 credit cost. There are 2×, 3×, 4×, and 5× bet multipliers (also called bet levels), which sets a max bet of 650 credits. Multipliers can also appear as symbols in reels. Alternatively, there could be higher bet multipliers (e.g., up to 8×, with a max bet of 1200 credits), different credit options, and/or a different number of pay lines.

Instead of evaluating win conditions on pay lines across reels in a window, an award can be determined according to a "ways" approach. For example, a player may obtain a win entitlement by selecting a number of reels to play and an amount to wager per reel. Examples of such implementations may be marketed under the trade name "Reel Power" by Aristocrat Leisure Industries Pty Ltd. The selection of a reel means that each displayed symbol of the reel (in the window) can be substituted for a symbol at one or more designated display positions. In other words, all symbols displayed at symbol display positions in the window for a selected reel can be used to form symbol combinations (one symbol per reel in a combination) with any of the symbols displayed at designated, symbol display positions of each of the other reels. For example, if there are five reels and three symbol display positions for each reel in a window (such that the symbol display positions comprise three rows of five symbol display positions), the symbol displayed in the center row is used for a non-selected reel, and the symbols displayed in all three rows are used for a selected reel. Each possible path through the designated (active) symbol display position(s) of the respective reels provides a way to win. As a result, the total number of ways to win is determined by multiplying the number of active display position(s) of each reel, where the active display position(s) for a reel are all display positions in the reel area for a selected reel but only the designated (e.g., center) display position in the reel area of a non-selected reel. As a result, for five reels and fifteen display positions, there are $3^5=243$ ways to win if five reels are selected, 3×3×3×1×1=27 ways to win if three reels are selected, and so on.

F. Example of Integration into Electronic Gaming Devices.

Innovations described in Section II can be implemented in a gaming server 102 and/or gaming device 104A, 104B, 104C, 104X, 200 described with reference to FIGS. 1 and 2. For example, a game controller such as a game controller 202 described with reference to FIG. 2 can perform operations to selectively transfer target symbols between windows. In some example implementations, the game controller 202 performs backend operations as well as frontend UI operations. The game controller 202 manages transfer of target symbols between windows (e.g., loading different lookup tables). For a play, the game controller 202 configures sets of reels for multiple windows. The game controller 202 determines symbol stop positions for reels and spins the sets of reels in the windows. The game controller 202 determines whether to transfer target symbols. In doing so, the game controller 202 determines whether to transfer a stack of target symbol(s) based at least in part on whether at least a threshold count of target symbols lands for a reel. Thus, the game controller 202 selectively transfers target symbols, transferring a stack of target symbol(s) when at least the threshold count of target symbols lands for a reel. The game controller 202 determines an outcome based at least in part on counts of target symbols enclosed in the respective windows. The game controller 202 outputs an indication of the outcome.

As explained with reference to FIG. 2, the gaming device 200 is designed to be a state-based system. In the context of the innovations described herein, for example, when a game controller 202 manages operations to selectively transfer target symbols between windows, the game controller 202 can save information about state in non-volatile memory at various stages. After configuring sets of reels for the respective windows, the game controller 202 can save information in non-volatile memory that indicates the configuration of the reels. After managing transfer of target symbols (e.g., loading different lookup tables), the game controller 202 can save information in non-volatile memory that indicates settings. The non-volatile memory can also store other state information, such as a current bet amount, control level (e.g., current wagering level), an amount of credits remaining, and/or a win amount for a base game. More generally, non-volatile memory can store state information such as positions of the respective reels, in addition to storing information that indicates the configuration of reel strips of the reels. On a window-by-window basis, the game controller 202 can update the values in non-volatile memory that indicate the symbol stop positions of the respective reels.

Alternatively, state information in non-volatile memory can be updated in a more fine-grained way. After target symbols have been transferred, the non-volatile memory can store an indication of which corresponding reels of windows have been replaced with target symbols, or otherwise store information that indicates the transferred target symbols. After finishing a base reel game or supplemental feature, the game controller 202 can store information in non-volatile memory that indicates an outcome (e.g., award amount) or status.

Innovations described in Section II can be implemented in a game processing pipeline that follows the example game processing architecture 300 described with reference to FIG. 3. As described with reference to FIG. 3, RNG conversion engine 320 utilizes one or more lookup tables 322A-322N. In the context of the innovations described herein, for example, one or more of the lookup tables 322A-322N can be used to determine symbol stop positions for reels associated with windows. Different lookup tables can be used for different windows, so as to set (on a window-by-window basis) the likelihood of at least a threshold count of target symbols landing in the respective windows. As another example, one or more of the lookup tables 322A-322N can be used to determine which target symbols to use in the respective sets of reels. Different lookup tables can be used for different windows, so as to change (on a window-by-window basis) the average value of target symbols for the respective windows.

In general, the example game processing architecture 300 shown in FIG. 3 can be used to process game play instructions and generate outcomes as follows. In some example implementations, the example game processing architecture 300 implements a game processing pipeline for a process (e.g., base reel game or bonus reel game) that includes transferring target symbols between windows. In response to a start condition (e.g., for a spin of the reels in multiple windows), the game play UI 304 (or bonus game play UI 308) of the UI system 302 makes one or more RNG calls to the game processing backend system 314. In response, the backend system 314 performs various operations. For example, using a gaming RNG 318, the RNG engine 316 generates one or more random numbers, which are passed to the RNG conversion engine 320. The RNG conversion engine 320, using one or more of the random number(s) and one or more of the lookup tables 322A . . . 322N, replaces any target symbol placeholders in sets of reels with target symbols. In this way, different sets of reels for different windows can include different target symbols (e.g., having different average value for target symbols). As another example, using the gaming RNG 318, the RNG engine 316 determines more random numbers, which the RNG conversion engine 320 uses (along with one or more of the lookup tables 322A . . . 322N) to determine symbol stop positions for the respective reels of the windows. Different lookup tables can be used for different windows, to change the likelihood of at least a threshold count of target symbols landing. The backend system 314 can stop the reels on a window-by-window basis, selectively transferring any stack of target symbol(s) from a window in which reels have just stopped. If a stack of target symbol(s) is transferred, the backend system 314 can replace at least part of the corresponding reel in another window with the transferred stack of target symbol(s). After determining symbol stop positions for the reels of the windows, the backend system 314 can determine the outcome of the spin (e.g., calculating whether any win conditions exist on pay lines in the respective windows, determining whether to start a supplemental feature in a window based at least in part on the count of target symbols in the window).

The backend system 314 returns the generated results to the game play UI 304 (or bonus game play UI 308) of the UI system 302, which spins reels in the respective windows and selectively transfers target symbols between windows. The generated results returned by the backend system 314 can include game-related information (such as symbol stop positions for the respective reels, transferred target symbols, outcomes) as well as animation effects not related to game parameters. Alternatively, the game play UI 304 (or bonus game play UI 308) can make one or more separate RNG calls to the backend system 314 to determine animation effects. In response, the backend system 314 can use the gaming RNG 318 and/or one or more of the non-gaming RNGs 319A . . . 319N to generate random numbers, which the RNG conversion engine 320 uses (with one or more of the lookup tables 322A . . . 322N) to determine animation effects. The game play UI 304 (or bonus game play UI 308) can perform operations consistent with the animation effects, which are returned from the backend system 314.

Eventually, the game play UI 304 (or bonus game play UI 308) stops the spinning of the reels at the symbol stop positions returned for the respective reels, and selectively transfers target symbols between windows. Finally, the game play UI 304 (or bonus game play UI 308) outputs an indication of the outcome of the spin (e.g., showing any win conditions on pay lines in the respective windows, showing an animation to start a supplemental feature in a window).

G. Example Technical Effects.

In terms of technical effects, innovative features of selectively transferring target symbols between windows represent improvements in the technical area of EGM software and provide new technology, in that they improve usability of EGMs by enhancing the user experience for players, extending player time on the EGMs, and maintaining the interest of current players in the EGMs. In some example implementations, the transfer of target symbols is visible to players. In particular, the transfer of target symbols may provide a build up to higher award amounts, which may occur as a reward to players for extended play on the gaming device 200. These embodiments are thus not merely new game rules or new display patterns.

III. STARTING A SUPPLEMENTAL FEATURE DEPENDING ON TARGET SYMBOL COUNT

This section describes various innovations in UI features of EGMs, as well as innovations in features of backend processing for EGMs to implement the UI features. For example, an EGM can start a supplemental feature (such as a bonus feature or special mode) in multiple windows based at least in part on a count of target symbols in the windows, collectively. When at least a threshold count of target symbols lands in the windows, collectively, the supplemental feature is performed. Checking whether windows, collectively, enclose at least a threshold count of target symbols provides another way to achieve a desired game volatility while maintaining a designated level of RTP for a game.

For example, in one implementation, a base reel game uses three sets of reels in three windows, respectively, on a display screen of an EGM. Each set of reels has 5 reels, with 3 full symbols of a reel being visible in a window at a time. The three windows—top, middle, and bottom—are arranged vertically. When a wager is placed for the base reel game, the sets of reels in all three windows spin. After the reels in all three windows have landed, a supplemental feature (specifically, a hold-and-spin feature for all three windows) is selectively started (that is, activated, triggered, etc.) depending on a count of target symbols in the three windows, collectively. The target symbols represent credits. If the three windows collectively enclose at least a threshold count of target symbols (e.g., at least 12 target symbols anywhere within the three windows), the supplemental feature is started within the three windows. For the hold-and-spin feature, the three windows can be merged into a single window, and the sets of reels for the three windows can be replaced with a set of reels for the single window.

The supplemental feature activation mechanism can be implemented in many other ways. For example, the supplemental feature activation mechanism can use some other number of windows (e.g., 2, 4, or 5). Windows can be arranged horizontally instead of vertically. Windows can be split across multiple display screens instead of being displayed on a single display screen. These variations and many other variations of the supplemental feature activation feature are described herein.

A supplemental feature activation mechanism described in Section III can be used in combination with a target symbol transfer mechanism described in Section II. Or, a supplemental feature activation mechanism described in Section III can be used without a target symbol transfer mechanism described in Section II. A target symbol transfer mechanism described in Section II can be used without a supplemental feature activation mechanism described in Section III.

A. Example Game Windows and Start Conditions.

Figure 9:
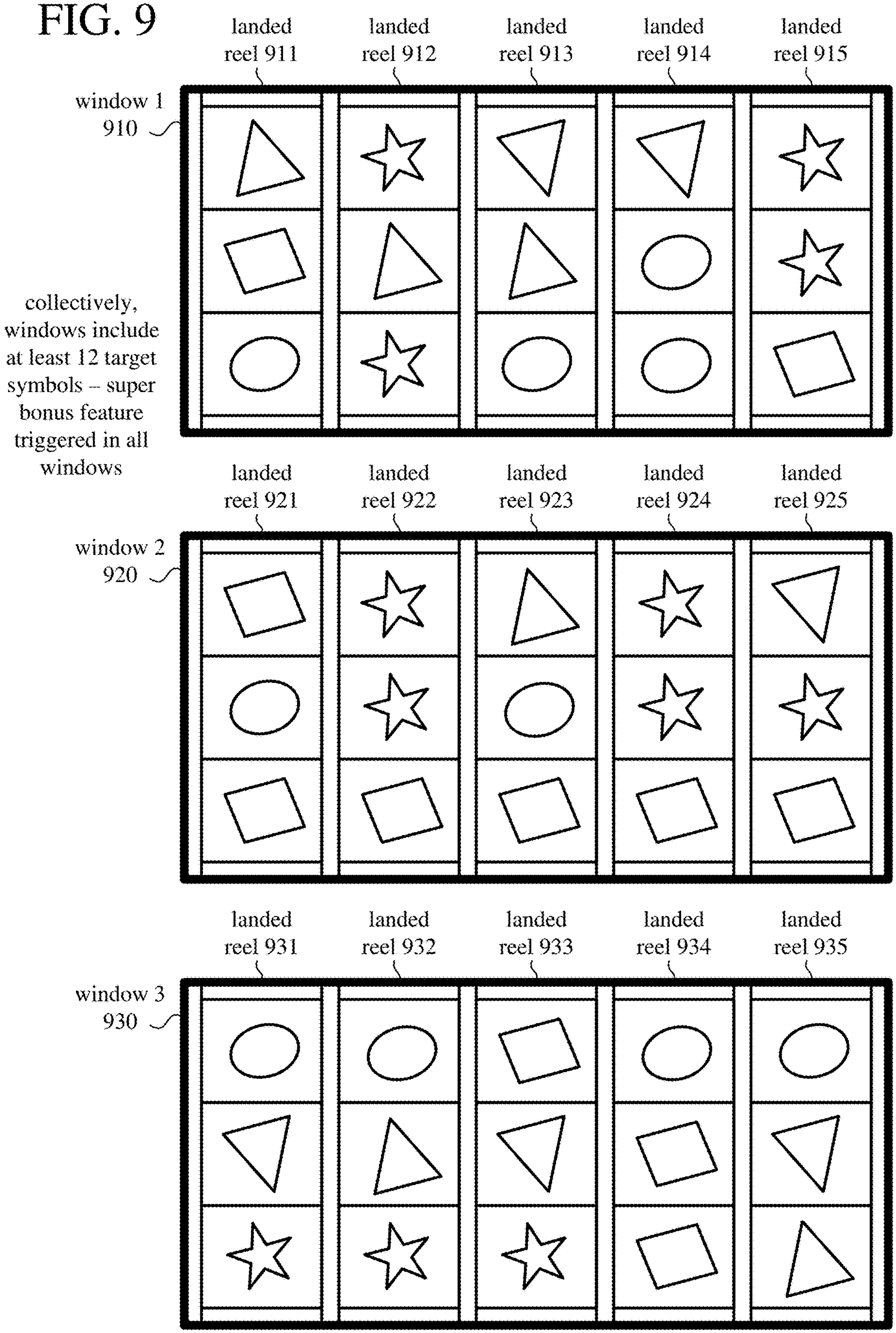
FIG. 9 is a diagram illustrating an example screen shot of a display screen of an EGM, showing a condition for starting a supplemental feature in multiple windows based at least in part on a count of target symbols in the windows, collectively, according to some example implementations.

FIG. 9 is a diagram that represents an example screen shot of a display screen of an electronic gaming device such as an EGM, when a supplemental feature is triggered, according to some example implementations. The screen shot may be rendered on a main display screen, secondary display screen, or other display screen of an electronic gaming device such as an EGM. In FIG. 9, the display screen includes three windows 910, 920, 930.

1. Simplified Example.

FIG. 9 shows the windows 910, 920, 930 after all reels 911-915, 921-925, 931-935 have landed in the windows 910, 920, 930, respectively. Some of the landed reels include target symbols, which are shown as star symbols. For example, the second landed reel 912 and fifth landed reel 915 in window 1 each have two target symbols within window 1. Collectively, the three windows 910, 920, 930 enclose 12 target symbols. In the example shown in FIG. 9, the threshold count of target symbols to start a supplemental feature is 12 target symbols. Therefore, the supplemental feature is triggered for the three windows.

2. Options for Windows, Reels, and Symbols.

Each of the three windows 910, 920, 930 encloses viewable portions of a set of reels associated with the window. Each of the windows 910, 920, 930 can be associated with a different set of reels or the same set of reels. In FIG. 9, each of the windows 910, 920, 930 encloses viewable portions of five reels. For each of the five reels, the viewable portion of the reel include three positions of symbols, which span a window. Thus, each window 910, 920, 930 is a matrix of symbols on the display screen, and may be highlighted graphically to emphasize reels and symbols within the window. More generally, the number of windows depends on implementation and can be 2, 4, 5, or some other number of windows. Similarly, the number of reels and dimensions of a window depend on implementation, as described with reference to FIGS. 4*a*-4*d*. For each of the reels, a reel strip includes x positions along a one-dimensional strip of symbols, where x depends on implementation. The reels can be configured as described with reference to FIGS. 4*a*-4*d*. The symbol set for the reels can have various types of symbols, as described with reference to FIGS. 4*a*-4*d*.

In the example shown in FIG. 9, windows are arranged vertically. Alternatively, windows can be arranged horizontally or in some other configuration.

The threshold count of target symbols depends on implementation. The threshold count can be set to manage volatility and/or RTP for a game. For example, the threshold count can be increased to make activation of the supplemental feature less likely, or the threshold count can be decreased to make activation of the supplemental feature more likely. The threshold count can be different depending on whether target symbols are selectively transferred between windows. For example, the threshold count is increased if target symbols are selectively transferred between windows. Volatility and/or RTP can also be managed by setting target symbols in the set of reels used for the supplemental feature.

B. Example Techniques for Starting a Supplemental Feature Based at Least in Part on Target Symbol Count.

Figure 10A:
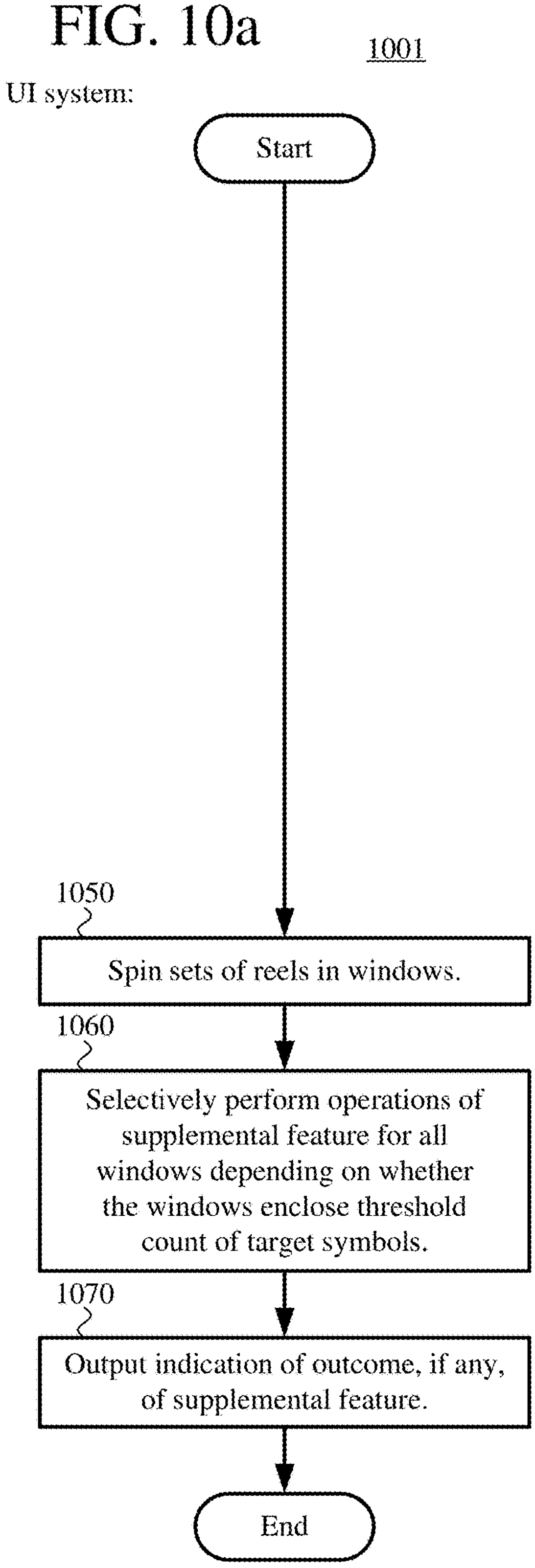
FIGS. 10*a* and 10*b* are flowcharts illustrating example techniques for selectively starting a supplemental feature in windows based at least in part on a count of target symbols in the windows, collectively, from the perspective of a UI frontend and backend, respectively.
Figure 10B:
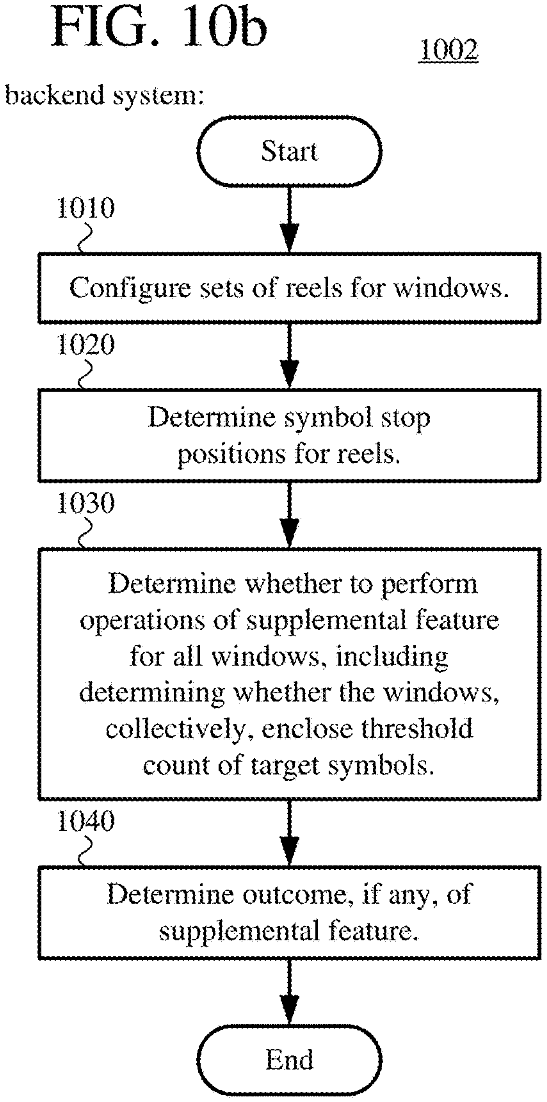

FIGS. 10*a* and 10*b* show different aspects of controlling a user interface ("UI") of an electronic gaming device such as an electronic gaming machine ("EGM") to selectively start a supplemental feature in windows based at least in part on a count of target symbols in the windows, collectively. In particular, FIG. 10*a* shows an example technique 1001 for selectively starting a supplemental feature in windows based at least in part on a count of target symbols in the windows, collectively, from the perspective of a UI frontend. Operations of the example technique 1001 shown in FIG. 10*a* can be performed, for example, in a UI system 302 explained with reference to FIG. 3. FIG. 10*b* shows an example technique 1002 for selectively starting a supplemental feature in windows based at least in part on a count of target symbols in the windows, collectively, from the perspective of a backend. Operations of the example technique 1002 shown in FIG. 10*b* can be performed, for example, in a game processing backend system 314 explained with reference to FIG. 3. The game processing backend system and UI system can be implemented using memory and one or more processors that are part of the electronic gaming device and/or part of a gaming system located remotely from the electronic gaming device. Depending on implementation, the backend system and UI system can be implemented by software executable on a CPU, by software controlling special-purpose hardware (e.g., a GPU or other graphics hardware for video acceleration), and/or by special-purpose hardware (e.g., in an ASIC), to process game play instructions in accordance with game play rules, determine outcomes in accordance with game play rules, and/or generate outputs (e.g., to one or more display screens and/or speakers).

With reference to FIGS. 10*a* and 10*b*, a backend system and UI system can start the processes (e.g., during a base reel game) in response to satisfaction of a start condition. In some example implementations, the start condition is initiation of a play of a base reel game. The UI system can receive user input that indicates actuation of a button of the electronic gaming device (e.g., a "play" button or "spin" button), then cause the backend system and UI system start the processes in response to actuation of the button of the electronic gaming device. Alternatively, the start condition can be defined in some other way.

In general, the techniques 1001, 1002 shown in FIGS. 10*a* and 10*b* use multiple windows on one or more display screens of an electronic gaming device. The multiple windows can be displayed on a single display screen (e.g., main display screen, or secondary display screen). Or, the multiple windows can be split among multiple display screens (e.g., two windows on a first display screen, and a third window on a second display screen). The number of windows depends on implementation. In some example implementations, there are three game windows. Alternatively, there can be more or fewer game windows. As used herein, the term "game window" or "reel area" can be used interchangeably with the term window.

In general, a window spans m reels in a first dimension and spans n symbols in a second dimension orthogonal to the first dimension. The value of m can be 4, 5, 6, 7, 8, or some other number of reels. The value of n can be 2, 3, 4, 5, 6, or some other number of symbols. In some example implementations, the reels in a window are organized in a 5×3 configuration (5 reels, with 3 symbols visible per reel). Typically, the m reels are arranged horizontally in the window from left-to-right, with the m reels spinning vertically and the window showing n symbols of each of the respective reels. Alternatively, the m reels are arranged vertically in the window from top-to-bottom, with the m reels spinning horizontally and the window showing n symbols of each of the respective reels. Also, instead of having the same value of n for all reels across a window, the window can have different numbers of symbols visible for different reels. Thus, the value of n can be different for different reels (e.g., n=3 for a leftmost reel, n=4 for a second reel, n=5 for a center reel, n=4 for a fourth reel, and n=3 for a rightmost reel). Each of the reels has an associated reel strip that is movable through a window upon a spin of the reel.

The target symbols depend on implementation. In some example implementations, the target symbols are credit symbols. The credit symbols have dynamic values, which are assigned when reels are configured. In this way, different credit symbols can have different values but still be counted as target symbols. Alternatively, the target symbols can be credit symbols that have pre-defined values (not dynamic values) that may be different for different target symbols. Or, the target symbols can be credit symbols that have the same value. Or, the target symbols can be wild symbols or some other type of symbol.

1. Example Backend Operations.

With reference to FIG. **10*b*, at stage 1010, a backend system (such as the game processing backend system 314 described with reference to FIG. 3**) configures multiple sets of reels for windows. Each of the windows has one of the sets of reels. Examples of configuration options are described in Section II.D.2.

At stage 1020, the backend system determines symbol stop positions for at least some of the reels. At stage 1030, the backend system determines whether to perform operations of a supplemental feature for all of the windows. In particular, the backend system determines whether the windows, collectively, enclose at least a threshold count of target symbols in the windows. The threshold count of target symbols (for whether to start the supplemental feature) depends on implementation. For example, the threshold count is 12 symbols. Alternatively, the threshold count is some other number of target symbols. Or, when the target symbols have credit values or other numerical values associated with them, the threshold count of target symbols can be a total value of the target symbols (e.g., total credit value). The count of target symbols, whether calculated as a number of target symbols or total value of target symbols, is evaluated for all of the reels of the windows, collectively (e.g., for a total number of target symbols or total value of target symbols for the windows).

At stage 1040, the backend system determines an outcome, if any, of the supplemental feature. If the supplemental feature is started for the windows, the backend system performs operations for the supplemental feature for the windows (e.g., determining symbol stop positions for reels, decrementing or resetting a spin counter) and eventually determines an outcome of the supplemental feature. For the supplemental feature, multiple windows from a base reel game can be merged into a single window. Alternatively, the multiple windows can remain separated. For the supplemental feature, the backend system can replace the sets of reels for the multiple windows, respectively, with other reels. Alternatively, the same sets of reels can be used for a base reel game and supplemental feature. For a hold-and-spin feature, target symbols are held in place in a window while other reels spin.

2. Example Frontend Operations.

With reference to FIG. **10*a*, at stage 1050, a UI system (such as the UI system 302 described with reference to FIG. 3**) spins a set of reels in each of multiple windows. For example, for a window, the UI system moves reel strips of at least some of the reels through the window. For a reel, the UI system eventually stops the movement of the reel strip of the reel at a symbol position of the reel strip (the symbol stop position). Alternatively, the UI system performs some other combination of operations to spin at least some of the reels. For a window, the spinning of the reels can stop for successive reels in the window (e.g., with reels successively stopping from left to right in the window).

At stage 1060, the UI system selectively performs operations of a supplemental feature for all of the windows depending on whether the windows, collectively, enclose at least a threshold count of target symbols in the multiple windows. The threshold count of target symbols (for whether to start the supplemental feature) depends on implementation. For example, the threshold count is 12 symbols. Alternatively, the threshold count is some other number of target symbols. Or, when the target symbols have credit values or other numerical values associated with them, the threshold count of target symbols can be a total value of the target symbols (e.g., total credit value). The count of target symbols, whether calculated as a number of target symbols or total value of target symbols, is evaluated for all of the reels of the windows, collectively (e.g., for a total number of target symbols or total value of target symbols for the windows). For the supplemental feature, multiple windows from a base reel game can be merged into a single window. Alternatively, the multiple windows can remain separated. For the supplemental feature, the sets of reels for the multiple windows, respectively, can be replaced with other reels. Alternatively, the same sets of reels can be used for a base reel game and supplemental feature. For a hold-and-spin feature, target symbols are held in place in a window while other reels spin.

At stage 1070, the UI system outputs an indication of an outcome, if any, of the supplemental feature. For example, the UI system renders a graphic (e.g., image, animation) that indicates the outcome.

3. Alternatives.

Although FIGS. **10*a* and 10*b* show stages 1010, 1020, 1030, and 1040 in a series, and show stages 1050, 1060, and 1070** in a separate series, the backend system and UI system can perform operations for some or all of these stages concurrently.

C. Examples of Outcome Determination and Supplemental Features.

The backend system can determine various outcomes and perform operations for various types of supplemental features. The UI system can output indications of those outcomes and perform operations for various types of supplemental features.

In some example implementations, a hold-and-spin feature is activated for all windows if the windows, collectively, enclose at least a threshold count of target symbols. The hold-and-spin feature occurs in the multiple windows. During the hold-and-spin feature, reels can include symbols from the same set of symbols as the base reel game. To distinguish from regular gameplay of the base reel game, inactive symbols (symbols other than target symbols) can be displayed differently during the hold-and-spin feature (e.g., with lower brightness). The target symbols remain active during the hold-and-spin feature.

During the hold-and-spin feature, target symbols are held in place (locked) in the windows while reels spin for other symbol positions of the windows. The hold-and-spin feature can use different reels than the base reel game. For example, each symbol position in the windows can have its own reel. Thus, for each of the 45 symbol positions of three windows having a 5×3 configuration of reels per window, the hold-and-spin feature can use a different reel. (But no reel spins in a position when a target symbol is held in that position.) In the reels for the hold-and-spin feature, target symbols can have values assigned as described with reference to FIG. 8*d*.

Initially, a player is given p spins for the hold-and-spin feature in the windows. For example, p is 3. Alternatively, p has some other value. When the player actuates a button to spin the reels or otherwise starts a spin of the hold-and-spin feature, all non-locked reels in the windows spin and eventually stop, and p is decremented. If any new target symbols land in any of the windows, those new target symbol(s) as well as previous target symbols are held in place (locked) and p is reset to its initial value. Locked target symbols are held until the end of the hold-and-spin feature. When p reaches 0 or all symbol positions are occupied by target symbols, an outcome is determined based on the target symbols (e.g., adding credit values of the target symbols).

Alternatively, another type of supplemental feature can be activated if all windows, collectively, enclose at least a threshold count of target symbols.

In addition, in some example implementations, after reels have landed (stopped) in a window, any win conditions can be detected and any win amounts can be awarded to the player (e.g., credited to the player's credit balance), as described in Section II.E.

D. Example Screenshots.

Figure 11A:
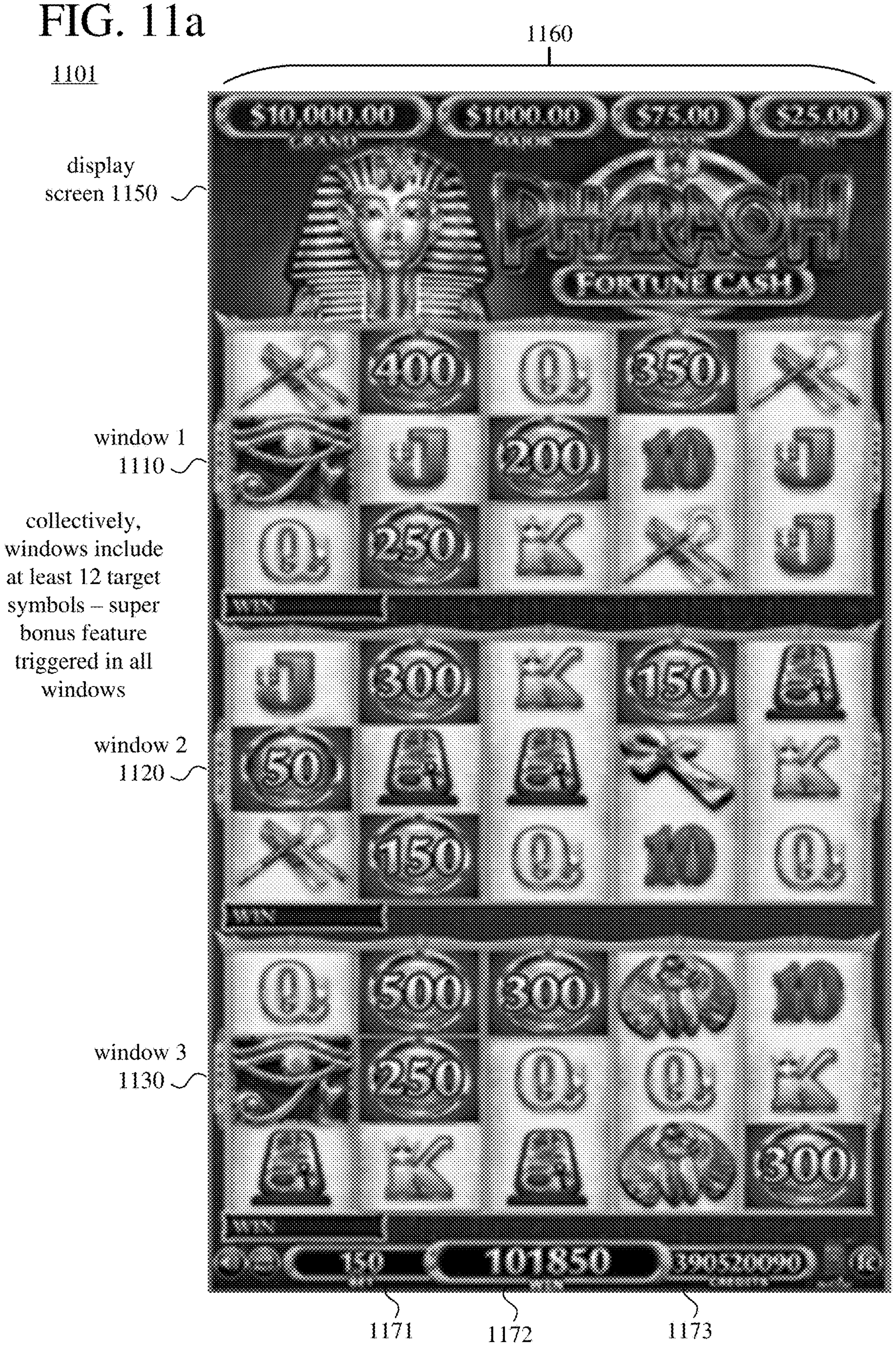
FIGS. 11*a*-11*c* are example screenshots of a display screen of an EGM, showing operations for a supplemental feature in multiple windows, according to some example implementations
Figure 11B:
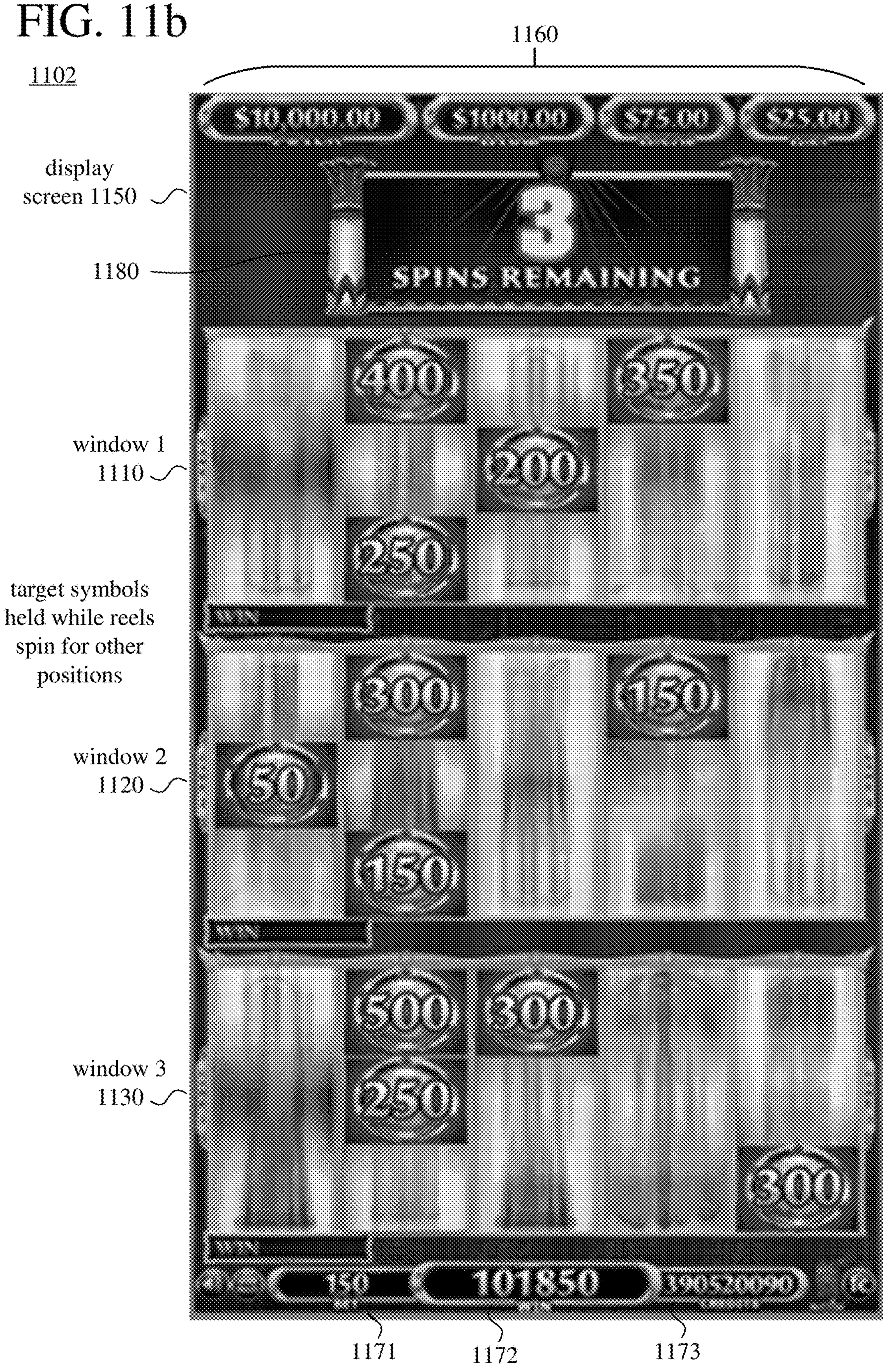
Figure 11C:
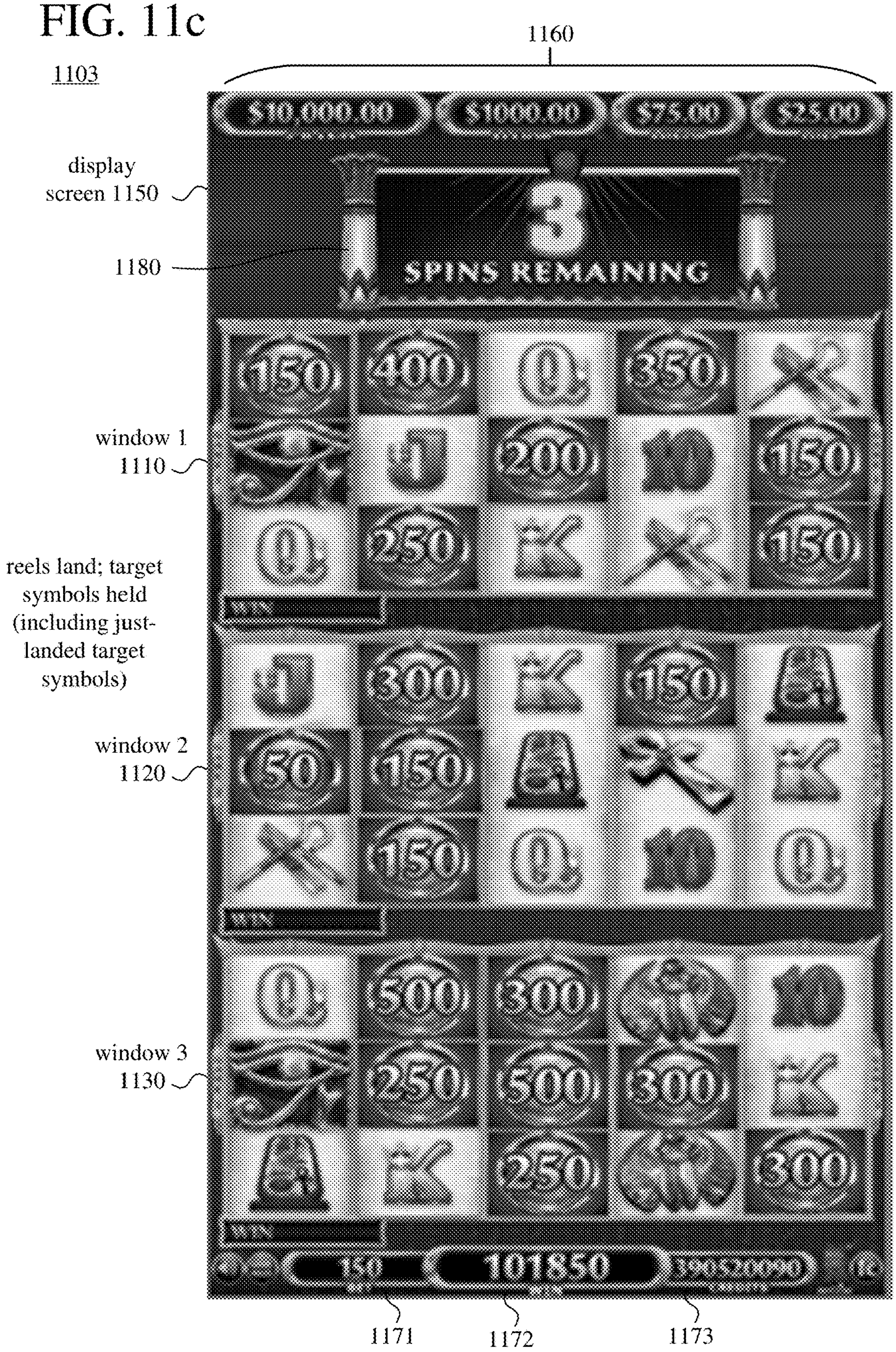

FIGS. 11*a*-11*c* show example screen shots 1101, 1102, 1103 of a display screen 1150 of an electronic gaming device such as an EGM, illustrating operations for a supplemental feature, according to some example implementations. The example screen shot 1101 represents a time instance of game play of a base reel game, when a supplemental feature is activated for all windows. The example screen shots 1102, 1103 represent time instances of game play of the supplemental feature.

In FIGS. 11*a*-11*c*, the display screen 1150 includes three windows (game windows) 1110, 1120, 1130 as well as a progressive jackpot area 1160. Each of the windows 1110, 1120, 1130 spans five reels horizontally and spans three symbols vertically. Below the first reel for each of the windows 1110, 1120, 1130, an area can display a win total for that window. Additional areas at the bottom of the display screen 1150 show other information, including an area 1171 that shows the current bet level, an area 1172 that shows an overall win amount for a play, and an area 1173 that shows remaining credits. The border area of the display screen 1150 can also display supplemental information such as a base denomination for the game.

In FIGS. 11*a*-11*c*, the target symbols are credit values shown in circular regions or orbs. The other symbols include pictures (e.g., Egyptian artifacts) and minor symbols (e.g., A, K, Q, J). In general, the symbols in the reels vary depending on implementation.

In the screen shot 1101 of FIG. 11*a*, the three windows 1110, 1120, 1130 collectively include 12 target symbols. In the example shown in FIGS. 11*a*-11*c*, the threshold count for activation of the supplemental feature is 12 target symbols. As such, the supplemental feature is activated for all reels.

In the screen shot 1102 of FIG. 11*b*, target symbols are held in place (locked) while reels spin for other symbol positions in all three of the windows 1110, 1120, 1130. A spin counter 1180 tracks the number of spins remaining for the supplemental feature. In the screen shot 1103 of FIG. 11*c*, the spinning reels have stopped in the three windows 1110, 1120, 1130. Multiple new target symbols have landed. The target symbols, including the just-landed target symbols, are held in place. The spin counter 1180, after being decremented for the spin, is reset to the initial number of spins (3) since at least one new target symbol has landed. The supplemental feature continues in this manner until the number of spins remaining is zero or target symbols have landed in all symbol positions.

E. Examples of Integration into Electronic Gaming Devices.

Innovations described in Section III can be implemented in a gaming server 102 and/or gaming device 104A, 104B, 104C, 104X, 200 described with reference to FIGS. 1 and 2. For example, a game controller such as a game controller 202 described with reference to FIG. 2 can perform operations to selectively start a supplemental feature based at least in part on count of target symbols in multiple windows, collectively. In some example implementations, the game controller 202 performs backend operations as well as frontend UI operations. For a play, the game controller 202 configures sets of reels for multiple windows. The game controller 202 determines symbol stop positions for reels and spins the sets of reels in the windows. The game controller 202 determines whether to perform operations of a supplemental feature for the windows. In doing so, the game controller 202 checks whether the windows, collectively, enclose at least a threshold count of target symbols. The game controller 202 selectively performs operations of the supplemental feature in the windows and determines an outcome, if any, of the supplemental feature. The game controller 202 outputs an indication of the outcome. The game controller 202 also determine an outcome of the play and outputs an indication of the output.

As explained with reference to FIG. 2, the gaming device 200 is designed to be a state-based system. In the context of the innovations described herein, for example, when a game controller 202 manages operations to start a supplemental feature based at least in part on count of target symbols in multiple windows, collectively, the game controller 202 can save information about state in non-volatile memory at various stages. After configuring sets of reels for the respective windows, the game controller 202 can save information in non-volatile memory that indicates the configuration of the reels. The non-volatile memory can also store other state information, such as a current bet amount, control level (e.g., current wagering level), an amount of credits remaining, and/or a win amount for a base game. More generally, non-volatile memory can store state information such as positions of the respective reels, in addition to storing information that indicates the configuration of reel strips of the reels. On a window-by-window basis, the game controller 202 can update the values in non-volatile memory that indicate the symbol stop positions of the respective reels. Alternatively, state information in non-volatile memory can be updated in a more fine-grained way. During a supplemental feature, the game controller 202 can store information in non-volatile memory that indicates intermediate results for the supplemental feature (e.g., which target symbols are held in place in a hold-and-spin feature). After finishing a base reel game or supplemental feature, the game controller 202 can store information in non-volatile memory that indicates an outcome (e.g., award amount) or status.

Innovations described in Section III can be implemented in a game processing pipeline that follows the example game processing architecture 300 described with reference to FIG. 3. As described with reference to FIG. 3, RNG conversion engine 320 utilizes one or more lookup tables 322A-322N. In the context of the innovations described herein, for example, one or more of the lookup tables 322A-322N can be used to determine symbol stop positions for reels associated with windows. As another example, one or more of the lookup tables 322A-322N can be used to determine which target symbols to use in the respective sets of reels.

In general, the example game processing architecture 300 shown in FIG. 3 can be used to process game play instructions and generate outcomes as follows. In some example implementations, the example game processing architecture 300 implements a game processing pipeline for a process (e.g., base reel game) that selectively starts a supplemental feature based at least in part on count of target symbols in multiple windows, collectively. In response to a start condition (e.g., for a spin of the reels in multiple windows), the game play UI 304 of the UI system 302 makes one or more RNG calls to the game processing backend system 314. In response, the backend system 314 performs various operations. For example, using a gaming RNG 318, the RNG engine 316 generates one or more random numbers, which are passed to the RNG conversion engine 320. The RNG conversion engine 320, using one or more of the random number(s) and one or more of the lookup tables 322A . . . 322N, replaces any target symbol placeholders in sets of reels with target symbols. As another example, using the gaming RNG 318, the RNG engine 316 determines more random numbers, which the RNG conversion engine 320 uses (along with one or more of the lookup tables 322A . . . 322N) to determine symbol stop positions for the respective reels of the windows. After determining symbol stop positions for the reels of the windows, the backend system 314 can determine the outcome of the spin (e.g., calculating whether any win conditions exist on pay lines in the respective windows, determining whether to start a supplemental feature in the windows based at least in part on the count of target symbols in the windows, collectively). When the supplemental feature is started, the backend system 314 can also determine an outcome of the supplemental feature (e.g., symbol stop positions for reels spinning for the supplemental feature, award amount for the supplemental feature)

The backend system 314 returns the generated results to the game play UI 304 (and/or bonus game play UI 308) of the UI system 302, which spins reels in the respective windows. The generated results returned by the backend system 314 can include game-related information (such as symbol stop positions for the respective reels, outcomes) as well as animation effects not related to game parameters. Alternatively, the game play UI 304 (or bonus game play UI 308) can make one or more separate RNG calls to the backend system 314 to determine animation effects. In response, the backend system 314 can use the gaming RNG 318 and/or one or more of the non-gaming RNGs 319A . . . 319N to generate random numbers, which the RNG conversion engine 320 uses (with one or more of the lookup tables 322A . . . 322N) to determine animation effects. The game play UI 304 (or bonus game play UI 308) can perform operations consistent with the animation effects, which are returned from the backend system 314.

Eventually, the game play UI 304 stops the spinning of the reels at the symbol stop positions returned for the respective reels, and selectively starts a supplemental feature based at least in part on count of target symbols in multiple windows, collectively. If the supplemental feature starts, the game play UI 304 can show an animation indicating the start of the supplemental feature in the windows, and the bonus game play UI 308 can perform operations for the supplemental feature. Finally, the game play UI 304 (or bonus game play UI 308) outputs an indication of the outcome, if any, of the supplemental feature. The game play UI 304 can also output an indication of an outcome of the spin (e.g., showing any win conditions on pay lines in the respective windows).

F. Example Technical Effects.

In terms of technical effects, innovative features of selectively starting a supplemental feature based at least in part on count of target symbols in multiple windows, collectively represent improvements in the technical area of EGM software and provide new technology, in that they improve usability of EGMs by enhancing the user experience for players, extending player time on the EGMs, and maintaining the interest of current players in the EGMs. In some example implementations, the landing of target symbols in the multiple windows is visible to players. In particular, the successive landing of target symbols may provide a build up to higher award amounts, which may occur as a reward to players for extended play on the gaming device 200. Also, in some example implementations, even if a supplemental feature is not performed for an individual window (e.g., because a threshold count of target symbols is not reached for that individual window), a supplemental feature may be performed if the windows, collectively, enclose enough target symbols, which potentially provides a reward to players for extended play on the gaming device 200. These embodiments are thus not merely new game rules or new display patterns.

IV. ALTERNATIVES AND VARIATIONS

Numerous embodiments are described in this disclosure, and are presented for illustrative purposes only. The described embodiments are not, and are not intended to be, limiting in any sense. The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments. Headings of sections provided in this disclosure are for convenience only, and are not to be taken as limiting the disclosure in any way.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise.

For the sake of presentation, the detailed description uses terms like "determine" and "select" to describe computer operations in a computer system. These terms denote operations performed by a computer, and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to insure privacy and prevent fraud in any of a variety of ways well known in the art.

It will be readily apparent that the various methods and algorithms described herein may be implemented by, e.g., appropriately programmed general-purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application, but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

Aside from the innovative features recited in the claims, innovative features of the present disclosure include, but are not limited to the following.

| | |
|---|---|
| | Controlling transfer of target symbols between windows, with a supplemental feature triggered depending on count of target symbols (including transferred target symbols) |
| A1. | A method of controlling a user interface of an electronic gaming device, the method comprising:<br>managing transfer of target symbols between multiple windows on one or more display screens of the electronic gaming device, each of the multiple windows having one of multiple sets of reels;<br>determining symbol stop positions for at least some of the reels;<br>determining whether to transfer target symbols between at least some of the multiple windows, including determining whether to transfer a stack of one or more target symbols from a focus window, among the multiple windows, to each of one or more other windows, among the multiple windows, based at least in part on whether at least a first threshold count of target symbols lands for one or more of the reels within the focus window;<br>for each of the multiple windows, determining whether to perform operations of a supplemental feature, including determining whether the window encloses a second threshold count of target symbols, including any transferred target symbols, in the window; and<br>determining an outcome, if any, of the supplemental feature for any of the multiple windows that encloses the second threshold count of target symbols. |

-continued

A2. The method of A1, wherein the configuring includes:
identifying the sets of reels for the multiple windows, respectively; and
for each of the reels, respectively, replacing any target symbol placeholder on a reel strip for the reel with a target symbol, including:
generating a random number with a random number generator; and
using a lookup table, which includes entries indicating options for different target symbols, to determine target symbol based at least in part on random number.

A3. The method of A1, wherein the determining the symbol stop positions for at least some of the reels includes, for a given reel of the reels:
generating a random number with a random number generator; and
using a lookup table, which includes entries indicating options for different symbol stop positions, to determine symbol stop position based at least in part on random number.

A4. The method of A1, wherein the determining the symbol stop positions is performed on a window-by-window basis for each of the multiple windows as the focus window, including successively determining symbol stop positions for any of the reels in the focus window that is not yet stopped, and wherein the determining whether to transfer the stack of one or more target symbols is performed for a stopped reel in the focus window to any of the one or more other windows having a corresponding reel that is not yet stopped.

A5. The method of A1, wherein the determining the symbol stop positions is performed on a window-by-window basis for each of the multiple windows as the focus window, including successively determining symbol stop positions for any of the reels in the focus window that is not yet stopped, and wherein the determining whether to transfer the stack of one or more target symbols is performed for a stopped reel in the focus window regardless of whether any corresponding reels of the one or more other windows are stopped yet.

A6. The method of A5, wherein the target symbols are wild symbols.

A7. The method of A5, further comprising, before the determining whether to transfer target symbols:
determining outcomes of a base game for the multiple windows, respectively.

A8. The method of A1, wherein:
the determining the symbol stop positions is performed on a window-by-window basis for each of the multiple windows as the focus window, including successively determining symbol stop positions for any of the reels in the focus window that is not yet stopped and for which at least the first threshold count of target symbols lands in the focus window; and
after the determining whether to transfer target symbols, the determining the symbol stop positions is performed on a window-by-window basis for each of the multiple windows as the focus window, including successively determining symbol stop positions for any of the reels in the focus window that is not yet stopped.

A9. The method of Al, wherein transferring the stack of one or more target symbols from the focus window to the one or more other windows includes, for each other window among the one or more other windows:
obscuring or replacing at least part of a corresponding reel in the other window; or
causing the corresponding reel to stop at a symbol stop position for which the stack of one or more target symbols lands in the other window.

A10. The method of Al, wherein the multiple windows are three windows, the set of reels for each of the three windows has five reels, three symbols are visible for each of the five reels, the target symbols have the same credit value or different credit values, and the supplemental feature is a hold-and-spin feature during which target symbols are held in place while other reels spin.

Transferring target symbols between windows, with management to balance volatility and/or RTP between windows B1. A method of controlling a user interface of an electronic gaming device, the method comprising:
in each of multiple windows on one or more display screens of the electronic gaming device, spinning a set of reels;
selectively transferring target symbols between at least some of the multiple windows, including transferring a stack of one or more target symbols from a focus window, among the multiple windows, to each of one or more other windows, among the multiple windows, when at least a first threshold count of target symbols lands for one or more of the reels within the focus window, wherein:
for at least some of the multiple windows, there are different likelihoods of at least the threshold count of target symbols landing; and/or
for at least some of the multiple windows, there are different distributions of values of target symbols in the sets of reels; and
outputting an indication of an outcome that is based at least in part on counts of target symbols enclosed in the multiple windows, respectively.

B2. The method of B1, wherein the different likelihoods have been set by:
selecting different lookup tables for the multiple windows, respectively, wherein entries of the different lookup tables provide options for the different likelihoods of at least the threshold count of target symbols landing in the multiple windows, respectively; or
adjusting counts of target symbols in the sets of reels for the multiple windows, respectively.

-continued

| | |
|---|---|
| B3. | The method of B2, wherein:<br>the sets of reels include target symbols, and at least some of the entries of the different lookup tables indicate options for different symbol stop positions; or<br>at least some of the entries of the different lookup tables indicate options for whether or not the threshold count of target symbols lands. |
| B4. | The method of B1, wherein the different distributions have been set by selecting different lookup tables for the multiple windows, respectively, and wherein entries of the different lookup tables provide options for the different distributions of values of target symbols in the sets of reels. |
| B5. | The method of B1, further comprising:<br>on a window-by-window basis for each of the multiple windows as the focus window, successively stopping any of the reels in the focus window that is still spinning, wherein, for each stopped reel in the focus window for which at least the first threshold count of target symbols lands in the focus window, the transferring the stack of one or more target symbols is performed to any of the one or more other windows having a corresponding reel that is still spinning. |
| B6. | The method of B1, further comprising:<br>on a window-by-window basis for each of the multiple windows as the focus window, successively stopping any of the reels in the focus window that is still spinning, wherein, for each stopped reel in the focus window for which at least the first threshold count of target symbols lands in the focus window, the transferring the stack of one or more target symbols is performed to each of the one or more other windows regardless of whether any corresponding reels in the other window are still spinning. |
| B7. | The method of B6, wherein:<br>the target symbols are wild symbols; or<br>outcomes of a base game for the multiple windows, respectively, are determined before the selectively transferring. |
| B8. | The method of B1, further comprising:<br>on a window-by-window basis for each of the multiple windows as the focus window, successively stopping any of the reels in the focus window that is still spinning and for which at least the first threshold count of target symbols lands in the focus window, wherein, for each stopped reel in the focus window for which at least the first threshold count of target symbols lands in the focus window, the transferring the stack of one or more target symbols is performed to each of the one or more other windows; and<br>after the selectively transferring, on a window-by-window basis for each of the multiple windows as the focus window, successively stopping any of the reels in the focus window that is still spinning. |
| B9. | The method of B1, wherein the transferring the stack of one or more target symbols from the focus window to the one or more other windows includes, for each other window among the one or more other windows:<br>obscuring or replacing at least part of a corresponding reel in the other window; or<br>causing the corresponding reel to stop at a symbol stop position for which the stack of one or more target symbols lands in the other window. |
| B10. | The method of B1, wherein:<br>the transferring the stack of one or more target symbols happens during the spinning of reels in the one or more other windows;<br>the transferring the stack of one or more target symbols happens before the spinning of reels in the one or more other windows starts; or<br>the transferring the stack of one or more target symbols happens after the spinning of reels in the one or more other windows stops. |
| B11. | The method of B1, further comprising:<br>during the transferring the stack of one or more target symbols, rendering one or more animations that indicate the transferring the stack of one or more target symbols. |

Starting a supplemental feature in multiple windows based at least in part on count of target symbols in the windows, collectively

| | |
|---|---|
| C1. | A method of controlling a user interface of an electronic gaming device, the method comprising:<br>in each of multiple windows on one or more display screens of the electronic gaming device, spinning a set of reels;<br>selectively performing operations of a supplemental feature for all of the multiple windows depending on whether the multiple windows, collectively, enclose at least a threshold count of target symbols in the multiple windows; and<br>outputting an indication of an outcome, if any, of the supplemental feature. |
| C2. | The method of C1, wherein the threshold count of target symbols is a first threshold count of target symbols, the method further comprising:<br>selectively transferring target symbols between at least some of the multiple windows, including transferring a stack of one or more target symbols from a focus window, among the multiple windows, to each of one or more other windows, among the multiple windows, when at least a second threshold count of target symbols lands for one or more of the reels within the focus window; and<br>selectively performing operations of another supplemental feature for any of the multiple windows that encloses a third threshold count of target symbols, including any transferred target symbols, in the window. |
| C3. | The method of C2, wherein the third threshold count is greater than the second threshold count, and wherein the first threshold count is greater than the third threshold count. |

-continued

| | |
|---|---|
| C4. | The method of C1, wherein the supplemental feature includes one or more of: merging the multiple windows into a single window; and replacing the sets of reels for the multiple windows, respectively, with other reels. |
| C5. | The method of C1, wherein the multiple windows are three windows, the set of reels for each of the three windows has five reels, three symbols are visible for each of the five reels, the target symbols have the same credit value or different credit values, and the supplemental feature is a hold-and-spin feature during which target symbols are held in place while other reels spin. |
| | Controlling the start a supplemental feature in multiple windows based at least in part on count of target symbols in the windows, collectively |
| D1. | A method of controlling a user interface of an electronic gaming device, the method comprising: configuring sets of reels for multiple windows, respectively, on one or more display screens of the electronic gaming device; determining symbol stop positions for at least some of the reels; determining whether to perform operations of a supplemental feature for all of the multiple windows, including determining whether the multiple windows, collectively, enclose at least a threshold count of target symbols in the multiple windows; and determining an outcome, if any, of the supplemental feature. |
| D2. | The method of D1, wherein the threshold count of target symbols is a first threshold count of target symbols, the method further comprising: determining whether to transfer target symbols between at least some of the multiple windows, including determining whether to transfer a stack of one or more target symbols from a focus window, among the multiple windows, to each of one or more other windows, among the multiple windows, based at least in part on whether at least a second threshold count of target symbols lands for one or more of the reels within the focus window; and for each of the multiple windows, determining whether to perform operations of another supplemental feature, including determining whether the window encloses a third threshold count of target symbols, including any transferred target symbols, in the window. |
| D3. | The method of D2, wherein the third threshold count is greater than the second threshold count, and wherein the first threshold count is greater than the third threshold count. |
| D4. | The method of D1, wherein the supplemental feature includes one or more of: merging the multiple windows into a single window; and replacing the sets of reels for the multiple windows, respectively, with other reels. |
| D5. | The method of D1, wherein the multiple windows are three windows, the set of reels for each of the three windows has five reels, three symbols are visible for each of the five reels, the target symbols have the same value or different values, and the supplemental feature is a hold-and-spin feature during which target symbols are held in place while other reels spin. |
| | Computer-readable media |
| E1. | One or more non-transitory computer-readable media having stored thereon computer-executable instructions for causing one or more processors, when programmed thereby, to perform the method of any of A1 to A10, B1 to B11, C1 to C5, and D1 to D5. |
| | Systems |
| F1. | A computer system comprising one or more processors and memory readable by the one or more processors, the memory having stored thereon computer-executable instructions for causing the one or more processors, when programmed thereby, to perform operations for the method of any of A1 to A10, B1 to B11, C1 to C5, and D1 to D5. |
| F2. | The computer system of F1, wherein the computer system is the electronic gaming device or an electronic gaming server, the computer system further comprising one or more of: a cabinet; the one or more display screens; one or more input buttons; a credit input device; and a network interface configured to facilitate communication between the electronic gaming server and the electronic gaming device. |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processors and memory readable by the one or more processors, the memory having stored thereon computer-executable instructions for causing the one or more processors, when programmed thereby, to perform operations to control an electronic gaming device, the operations comprising:

managing transfer of target symbols between multiple windows on one or more display screens of the electronic gaming device, each of the multiple windows having one of multiple sets of reels, wherein the target symbols are credit symbols that represent credit values, the target symbols having the same credit value or different credit values;

determining symbol stop positions for at least some of the reels, wherein a likelihood of a target symbol in the symbol stop position is based on a count of target symbols established in each of the reels;

determining whether to transfer target symbols between at least some of the multiple windows, including determining whether to transfer one or more target symbols from a focus window, among the multiple windows, to each of one or more other windows, among the multiple windows, based at least in part on whether at least a threshold count of target symbols lands for one or more of the reels within the focus window, wherein the managing the transfer of the target symbols includes, for at least some of the multiple windows, setting different likelihoods of at least the threshold count of target symbols landing, wherein the likelihood increases with each transfer; and determining an outcome based at least in part on the target symbols, including any transferred target symbols, enclosed in the multiple windows, respectively, wherein the determining the outcome includes:

determining a payout of credit values for the target symbols enclosed in at least one of the multiple windows; and evaluating winning symbol combinations in the multiple windows, respectively, wherein, for a given target symbol among the target symbols, the given target symbol contributes as a wild symbol to a given one of the winning symbol combinations.

2. The computer system of claim 1, the managing the transfer of the target symbols further including:

selecting different lookup tables for the multiple windows, respectively, wherein entries of the different lookup tables provide options for the different likelihoods of at least the associated threshold count of target symbols landing; or adjusting counts of target symbols in the sets of reels for the multiple windows, respectively.

3. The computer system of claim 2, wherein different lookup tables are selected for the multiple windows, respectively, and wherein:

the sets of reels include target symbols, and at least some of the entries of the different lookup tables indicate options for different symbol stop positions; or at least some of the entries of the different lookup tables indicate options for whether or not the associated threshold count of target symbols lands.

4. The computer system of claim 1, wherein the managing the transfer of the target symbols includes, for at least some of the multiple windows, setting different distributions of values of target symbols in the sets of reels, and wherein entries of different lookup tables for the multiple windows, respectively, provide options for the different distributions of values of target symbols in the sets of reels.

5. The computer system of claim 1, wherein the determining the symbol stop positions is performed on a window-by-window basis for each of the multiple windows as the focus window, including successively determining symbol stop positions for any of the reels in the focus window that is not yet stopped, wherein the determining whether to transfer the one or more target symbols is performed for each stopped reel in the focus window regardless of whether any corresponding reels of the one or more other windows are stopped yet.

6. The computer system of claim 1, wherein the multiple windows are three windows, the set of reels for each of the three windows has five reels, three symbols are visible for each of the five reels, and the operations are performed as part of a base game or supplemental feature.

7. A method of controlling an electronic gaming device, the method comprising:

in each of multiple windows on one or more display screens of the electronic gaming device, spinning a set of reels, each of the reels having an associated reel strip that is movable upon a spin of the reel, wherein the spinning is initiated in response to actuation of a button of the electronic gaming device, wherein the spinning includes, for each of at least some of the reels, moving the reel strip of the reel through one of the multiple windows, and wherein a likelihood of target symbols present in each of multiple windows is based on a count of target symbols established in each of the reels, and wherein each window has threshold count;

selectively transferring target symbols between at least some of the multiple windows, wherein the target symbols are credit symbols that represent credit values, the target symbols having the same credit value or different credit values, and wherein the selectively transferring includes transferring one or more target symbols from a focus window, among the multiple windows, to each of one or more other windows, among the multiple windows, when at least the threshold count of target symbols lands for one or more of the reels within the focus window, for at least some of the multiple windows, setting different likelihoods of at least the threshold count of target symbols landing, wherein the likelihood increases with each transfer; and outputting an indication of an outcome that is based at least in part on target symbols, including any transferred target symbols, enclosed in the multiple windows, respectively, wherein the outputting the indication of the outcome includes rendering a graphic that indicates the outcome on at least one of the one or more display screens of the electronic gaming device, and wherein the outcome includes:

a payout of credit values for the target symbols enclosed in at least one of the multiple windows; and a payout for winning symbol combinations in the multiple windows, respectively, wherein, for a given target symbol among the target symbols, the given target symbol contributes as a wild symbol to a given one of the winning symbol combinations.

8. The method of claim 7, further comprising:

for at least some of the multiple windows, setting different distributions of values of target symbols in the sets of reels.

9. The method of claim 7, further comprising:

selectively performing a supplemental feature for any of the multiple windows that encloses another threshold count of target symbols, including any transferred target symbols, in the window.

10. The method of claim 7, further comprising:

on a window-by-window basis for each of the multiple windows as the focus window, successively stopping any of the reels in the focus window that is still spinning, wherein, for each stopped reel in the focus window for which at least the associated threshold count of target symbols lands in the focus window, the transferring the one or more target symbols is performed to each of the one or more other windows regardless of whether any corresponding reels in the other window are still spinning.

11. The method of claim 7, wherein the transferring the one or more target symbols from the focus window to the one or more other windows includes, for each other window among the one or more other windows:

obscuring or replacing at least part of a corresponding reel in the other window; or causing the corresponding reel to stop at a symbol stop position for which the one or more target symbols lands in the other window.

12. The method of claim 7, wherein the one or more target symbols are in a full vertical stack of target symbols, the multiple windows are organized vertically on the one or more display screens, and the transferring the one or more target symbols includes transferring the one or more target symbols up and/or down between windows.

13. A computer system comprising one or more processors and memory readable by the one or more processors, the memory having stored thereon computer-executable instructions for causing the one or more processors, when programmed thereby, to perform operations to control an electronic gaming device, the operations comprising:

managing transfer of target symbols between multiple windows on one or more display screens of the electronic gaming device to balance return to player ("RTP") between the multiple windows, each of the multiple windows having one of multiple sets of reels and threshold count, wherein the target symbols are credit symbols that represent credit values, the target symbols having the same credit value or different credit values, and for at least some of the multiple windows, setting different likelihoods of at least the threshold count of target symbols landing, wherein the likelihood increases with each transfer;

determining symbol stop positions for at least some of the reels as part of a base game, wherein a likelihood of a target symbol in the symbol stop position is based on a count of target symbols established in each of the reels;

determining whether to transfer target symbols between at least some of the multiple windows, including determining whether to transfer one or more target symbols from a focus window, among the multiple windows, to each of one or more other windows, among the multiple windows, based at least in part on whether at least the threshold count of target symbols lands for one or more of the reels within the focus window;

for each of the multiple windows, performing operations of a hold-and-spin feature, including determining whether the window encloses at least the threshold count of target symbols, including any transferred target symbols, in the window, wherein for the hold-and-spin feature for a given window, among the multiple windows, target symbols enclosed in the given window are held in place while other reels spin for the given window; and determining an outcome, if any, of the hold-and-spin feature for any of the multiple windows that encloses at least the threshold count of target symbols, wherein the outcome, for the given window, is based on credit values for the target symbols enclosed in the given window.

14. The computer system of claim 13, wherein setting different likelihoods of at least the associated threshold count of target symbols landing by selecting different lookup tables for the multiple windows, respectively, or by adjusting counts of target symbols in the sets of reels for the multiple windows, respectively; or setting different distributions of values of target symbols in the sets of reels.

15. The computer system of claim 13, wherein the hold-and-spin feature includes, for the given window:

setting a spin counter p to an initial value greater than zero; and for each spin of the hold-and-spin feature until p reaches zero or all symbol positions of the given window are occupied by target symbols:

determining symbol stop positions for any non-locked reels in the given window while holding in place any target symbols enclosed in the given window; and if any new target symbols land in the given window for the spin, resetting the spin counter p to the initial value, but otherwise decrementing p.

16. The computer system of claim 13, wherein the determining the symbol stop positions is performed on a window-by-window basis for each of the multiple windows as the focus window, including successively determining symbol stop positions for any of the reels in the focus window that is not yet stopped, and wherein the determining whether to transfer the one or more target symbols is performed for a stopped reel in the focus window to any of the one or more other windows having a corresponding reel that is not yet stopped.

17. The computer system of claim 13, wherein the determining the symbol stop positions is performed on a window-by-window basis for each of the multiple windows as the focus window, including successively determining symbol stop positions for any of the reels in the focus window that is not yet stopped, and wherein the determining whether to transfer the one or more target symbols is performed for a stopped reel in the focus window regardless of whether any corresponding reels of the one or more other windows are stopped yet.

18. The computer system of claim 17, wherein the target symbols are wild symbols.

19. The computer system of claim 17, wherein the operations further comprise, before the determining whether to transfer target symbols:

determining outcomes of the base game for the multiple windows, respectively.

20. The computer system of claim 13, wherein:

the determining the symbol stop positions is performed on a window-by-window basis for each of the multiple windows as the focus window, including successively determining symbol stop positions for any of the reels in the focus window that is not yet stopped and for which at least the threshold count of target symbols lands in the focus window; and after the determining whether to transfer target symbols, the determining the symbol stop positions is performed on a window-by-window basis for each of the multiple windows as the focus window, including successively determining symbol stop positions for any of the reels in the focus window that is not yet stopped.

* * * * *